United States Patent [19]

Egawa

[11] Patent Number: 5,625,559
[45] Date of Patent: Apr. 29, 1997

[54] TRANSPORT MANAGEMENT CONTROL APPARATUS AND METHOD FOR UNMANNED VEHICLE SYSTEM

[75] Inventor: Takami Egawa, Ise, Japan

[73] Assignee: Shinko Electric Co., Ltd., Tokyo, Japan

[21] Appl. No.: 493,783

[22] Filed: Jun. 22, 1995

Related U.S. Application Data

[63] Continuation of Ser. No. 220,541, Mar. 30, 1994, abandoned.

[30] Foreign Application Priority Data

| Apr. 2, 1993 | [JP] | Japan | 5-077244 |
| Dec. 10, 1993 | [JP] | Japan | 5-310931 |
| Dec. 10, 1993 | [JP] | Japan | 5-310932 |

[51] Int. Cl.[6] .................................................. B62D 6/04
[52] U.S. Cl. ............................................................ 364/436
[58] Field of Search .................... 246/3, 5; 364/436, 364/426.05, 424.02; 318/587; 395/500; 455/39

[56] References Cited

U.S. PATENT DOCUMENTS

| 4,023,753 | 5/1977 | Dobler | 246/5 |
| 4,361,300 | 11/1982 | Rush | 246/5 |
| 4,974,259 | 11/1990 | Takahashi et al. | 455/39 |
| 5,038,290 | 8/1991 | Minami | 364/436 |
| 5,257,363 | 10/1993 | Shapiro et al. | 395/500 |
| 5,297,049 | 3/1994 | Gurmu et al. | 364/424.02 |

FOREIGN PATENT DOCUMENTS

| 0213939 | 8/1986 | European Pat. Off. . |
| 0367527 | 7/1988 | European Pat. Off. . |
| 0341889 | 5/1989 | European Pat. Off. . |
| 3930425 | 9/1989 | Germany . |
| 4013188 | 4/1990 | Germany . |

OTHER PUBLICATIONS

Patent Abstracts of Japan, vol. 17, No. 189 (P-1521) 13 Apr. 1993 & JP-A-04 340 607 (English abstract enclosed).

Patent Abstracts of Japan, vol. 15, No. 99 (P-1177) 11 Mar. 1991 & JP-A-02 309 406 (English abstract enclosed).

*Primary Examiner*—Kevin J. Teska
*Assistant Examiner*—Dan Fiul
*Attorney, Agent, or Firm*—Darby & Darby

[57] ABSTRACT

The present invention provides a transport management method and apparatus for controlling the transport of a plurality of unmanned vehicles traveling over a travel grid formed from a plurality of nodes provided at stationary positions, and connection routes connecting the intervals between these nodes. The transport management apparatus according to the present invention has a first function for searching for a travel route for each unmanned vehicle in which an unmanned vehicle does not travel in the opposite direction over the same connection route as another unmanned vehicle and a second function for solving the progression impossibility of an unmanned vehicle using a node passing sequence change process; detour route search process or passing route search process, in the case when a progression impossibility of any unmanned vehicle is detected following simulation of the timed movements of each unmanned vehicle based on travel routes obtained by means of the aforementioned first function. As a result, the carrier efficiency therein is improved.

6 Claims, 49 Drawing Sheets

| CART | DEPARTURE NODE | MOVEMENT ROUTE | TARGET NODE |
|---|---|---|---|
| #1 | 2 | →3→4→5→6→7→8→9→10→11→12→ | 13 |
| #2 | 7 | →6→5→4→3→ | 2 |
| #3 | 9 | →8→22→21→20→19→18→17→16→ | 15 |
| #4 | 13 | →12→26→25→24→23→22→21→20→19→18→17→16→ | 15 |
| #5 | 15 | →1→2→3→4→5→6→7→8→ | 9 |

LADDER-SHAPED TRAVEL GRID

SQUARE LATTICE-SHAPED TRAVEL GRID

FIG. 10

NODE DATA (28 NODES)

| No | COORDINATES (mm) | No | COORDINATES (mm) | No | COORDINATES (mm) | No | COORDINATES (mm) | No | COORDINATES (mm) |
|---|---|---|---|---|---|---|---|---|---|
| 1 | (1000, 1000) | 2 | (4000, 1000) | 3 | (5500, 1000) | 4 | (8500, 1000) | 5 | (10000, 1000) |
| 6 | (14500, 1000) | 7 | (16000, 1000) | 8 | (20500, 1000) | 9 | (22000, 1000) | 10 | (26500, 1000) |
| 11 | (28000, 1000) | 12 | (32500, 1000) | 13 | (34000, 1000) | 14 | (35500, 1000) | 15 | (1000, 2000) |
| 16 | (5500, 2000) | 17 | (7000, 2000) | 18 | (8500, 2000) | 19 | (13000, 2000) | 20 | (14500, 2000) |
| 21 | (19000, 2000) | 22 | (31000, 2000) | 23 | (25000, 2000) | 24 | (26500, 2000) | 25 | (31000, 2000) |
| 26 | (32500, 2000) | 27 | (34000, 2000) | 28 | (35500, 2000) | | | | |

FIG. 11

SCENE DATA (34 SCENES)

| No | INITIAL-POINT NODE | FINAL-POINT NODE | DIREC-TION | VELO-CITY (mm/sec) | No | INITIAL-POINT NODE | FINAL-POINT NODE | DIREC-TION | VELO-CITY (mm/sec) | No | INITIAL-POINT NODE | FINAL-POINT NODE | DIREC-TION | VELO-CITY (mm/sec) |
|---|---|---|---|---|---|---|---|---|---|---|---|---|---|---|
| 1 | 1 | 2 | 0 | 1000 | 2 | 2 | 3 | 0 | 1000 | 3 | 3 | 4 | 0 | 1000 |
| 4 | 4 | 5 | 0 | 1000 | 5 | 5 | 6 | 0 | 1000 | 6 | 6 | 7 | 0 | 1000 |
| 7 | 7 | 8 | 0 | 1000 | 8 | 8 | 9 | 0 | 1000 | 9 | 9 | 10 | 0 | 1000 |
| 10 | 10 | 11 | 0 | 1000 | 11 | 11 | 12 | 0 | 1000 | 12 | 12 | 13 | 0 | 1000 |
| 13 | 13 | 14 | 0 | 1000 | 14 | 15 | 16 | 0 | 1000 | 15 | 16 | 17 | 0 | 1000 |
| 16 | 17 | 18 | 0 | 1000 | 17 | 18 | 19 | 0 | 1000 | 18 | 19 | 20 | 0 | 1000 |
| 19 | 20 | 21 | 0 | 1000 | 20 | 21 | 22 | 0 | 1000 | 21 | 22 | 23 | 0 | 1000 |
| 22 | 23 | 24 | 0 | 1000 | 23 | 24 | 25 | 0 | 1000 | 24 | 25 | 26 | 0 | 1000 |
| 25 | 26 | 27 | 0 | 1000 | 26 | 27 | 28 | 0 | 1000 | 27 | 1 | 15 | 0 | 300 |
| 28 | 3 | 16 | 0 | 300 | 29 | 4 | 18 | 0 | 300 | 30 | 6 | 20 | 0 | 300 |
| 31 | 8 | 22 | 0 | 300 | 32 | 10 | 24 | 0 | 300 | 33 | 12 | 26 | 0 | 300 |
| 34 | 14 | 28 | 0 | 300 | | | | | | | | | | |

| No. | SHORTEST ROUTE (TOTAL COST = 37.833) |
|---|---|
| 1 | 1→2→3→4→5→6→7→8→9→10→11→12→3→14→28 |
| 2 | 1→2→3→4→5→6→7→8→9→10→11→12→26→27→28 |
| 3 | 1→2→3→4→5→6→7→8→9→10→24→25→26→27→28 |
| 4 | 1→2→3→4→5→6→7→8→22→23→24→25→26→27→28 |
| 5 | 1→2→3→4→5→6→20→21→22→23→24→25→26→27→28 |
| 6 | 1→2→3→4→18→19→20→21→22→23→24→25→26→27→28 |
| 7 | 1→2→3→16→17→18→19→20→21→22→23→24→25→26→27→28 |
| 8 | 1→15→16→17→18→19→20→21→22→23→24→25→26→27→28 |

FIG. 14

NODE DATA (28 NODES)

| No | COORDI-NATES[m] | No | COORDI-NATES[m] | No | COORDI-NATES[m] | No | COORDI-NATES[m] | No | COORDI-NATES[m] | No | COORDI-NATES[m] | No | COORDI-NATES[m] |
|---|---|---|---|---|---|---|---|---|---|---|---|---|---|
| 1 | (0,0) | 2 | (0,1) | 3 | (0,2) | 4 | (0,3) | 5 | (0,4) | 6 | (0,5) | 7 | (0,6) |
| 8 | (0,7) | 9 | (0,8) | 10 | (0,9) | 11 | (1,0) | 12 | (1,1) | 13 | (1,2) | 14 | (1,3) |
| 15 | (1,4) | 16 | (1,5) | 17 | (1,6) | 18 | (1,7) | 19 | (1,8) | 20 | (1,9) | 21 | (2,0) |
| 22 | (2,1) | 23 | (2,2) | 24 | (2,3) | 25 | (2,4) | 26 | (2,5) | 27 | (2,6) | 28 | (2,7) |
| 29 | (2,8) | 30 | (2,9) | 31 | (3,0) | 32 | (3,1) | 33 | (3,2) | 34 | (3,3) | 35 | (3,4) |
| 36 | (3,5) | 37 | (3,6) | 38 | (3,7) | 39 | (3,8) | 40 | (3,9) | 41 | (4,0) | 42 | (4,1) |
| 43 | (4,2) | 44 | (4,3) | 45 | (4,4) | 46 | (4,5) | 47 | (4,6) | 48 | (4,7) | 49 | (4,8) |
| 50 | (4,9) | 51 | (5,0) | 52 | (5,1) | 53 | (5,2) | 54 | (5,3) | 55 | (5,4) | 56 | (5,5) |
| 57 | (5,6) | 58 | (5,7) | 59 | (5,8) | 60 | (5,9) | 61 | (6,0) | 62 | (6,1) | 63 | (6,2) |
| 64 | (6,3) | 65 | (6,4) | 66 | (6,5) | 67 | (6,6) | 68 | (6,7) | 69 | (6,8) | 70 | (6,9) |
| 71 | (7,0) | 72 | (7,1) | 73 | (7,2) | 74 | (7,3) | 75 | (7,4) | 76 | (7,5) | 77 | (7,6) |
| 78 | (7,7) | 79 | (7,8) | 80 | (7,9) | 81 | (8,0) | 82 | (8,1) | 83 | (8,2) | 84 | (8,3) |
| 85 | (8,4) | 86 | (8,5) | 87 | (8,6) | 88 | (8,7) | 89 | (8,8) | 90 | (8,9) | 91 | (9,0) |
| 92 | (9,1) | 93 | (9,2) | 94 | (9,3) | 95 | (9,4) | 96 | (9,5) | 97 | (9,8) | 98 | (9,7) |
| 99 | (9,8) | 100 | (9,9) | | | | | | | | | | |

FIG. 24

| UNMANNED VEHICLE | CONFLICTING VEHICLE | INVERSE DIRECTION INTERVAL | COST | TOTAL COST |
|---|---|---|---|---|
| #1 | #2 | 2→3→4→5→6→7 | 12,000 | |
| | #3 | 8→9 | 1,500 | |
| | #4 | 12→13 | 1,500 | 15,000 |
| #2 | #1 | 7→6→5→4→3→2 | 12,000 | |
| | #5 | 7→6→5→4→3→2 | 12,000 | 24,000 |
| #3 | #1 | 9→8 | 1,500 | |
| | #5 | 9→8 | 1,500 | 3,000 |
| #4 | #1 | 13→12 | 1,500 | 1,500 |
| #5 | #2 | 2→3→4→5→6→7 | 12,000 | |
| | #3 | 8→9 | 1,500 | 13,500 |

FIG. 29
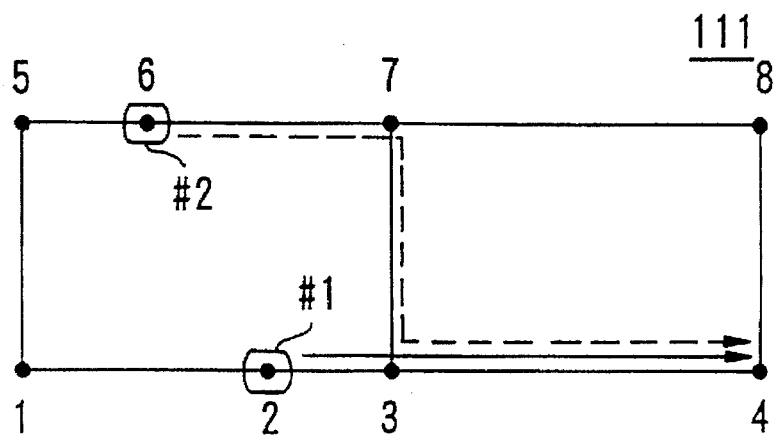
FIG. 30
| UNMANNED VEHICLE | DEPARTURE POINT | TARGET POINT | STANDARD ROUTE [TRAVEL TIME:SECONDS] |
|---|---|---|---|
| #1 | 2 | 4 | 2[1]→3[3]→4 |
| #2 | 6 | 4 | 6[2]→7[4]→3[3]→4 |
FIG. 31
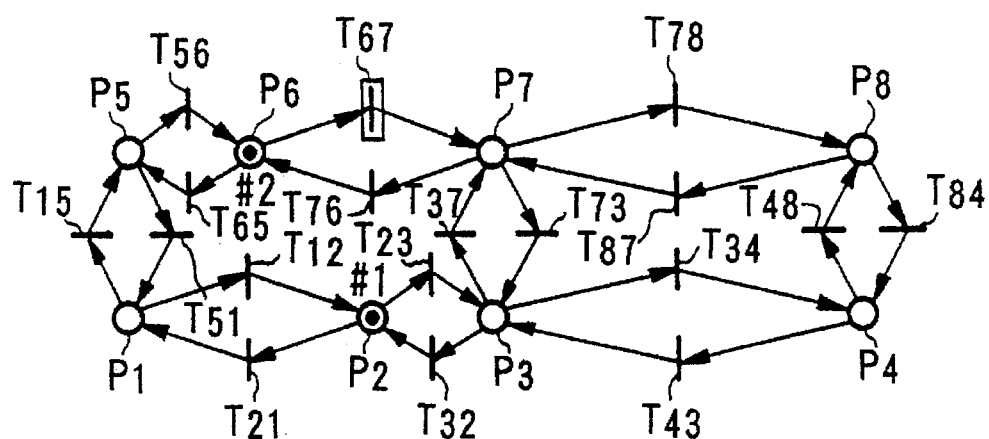

FIG. 37

| UNMANNED VEHICLE | OBSTRUCTIVE UNMANNED VEHICLES | OPEN NODE |
|---|---|---|
| #1 | #2 | 6 |
| #2 | #4, #1, #3 | --- |
| #3 | #2 | 19 |
| #4 | #6 | 2 |
| #5 | #6, #3 | --- |
| #6 | #5 | 15 |

FIG. 39

| ROBOT | ROUTE |
|---|---|
| #1 | 6→5→(4) |
| #2 | 5→(4)→3→16 |
| #3 | 17→18→(4)→3 |
| #4 | 2→3→(16)→17→18 |
| #5 | 16→(17)→18→18→19 |
| #6 | 15→16→17 |

FIG. 40

| NODE | NODE RESERVATION SEQUENCE |
|---|---|
| 2 | #4 |
| 3 | #4, #2, #3 |
| 4 | #2, #3, #1 |
| 5 | #2, #1 |
| 6 | #1 |
| 15 | #6 |
| 16 | #5, #4, #6, #2 |
| 17 | #3, #5, #4, #6 |
| 18 | #3, #5, #4 |
| 19 | #5 |

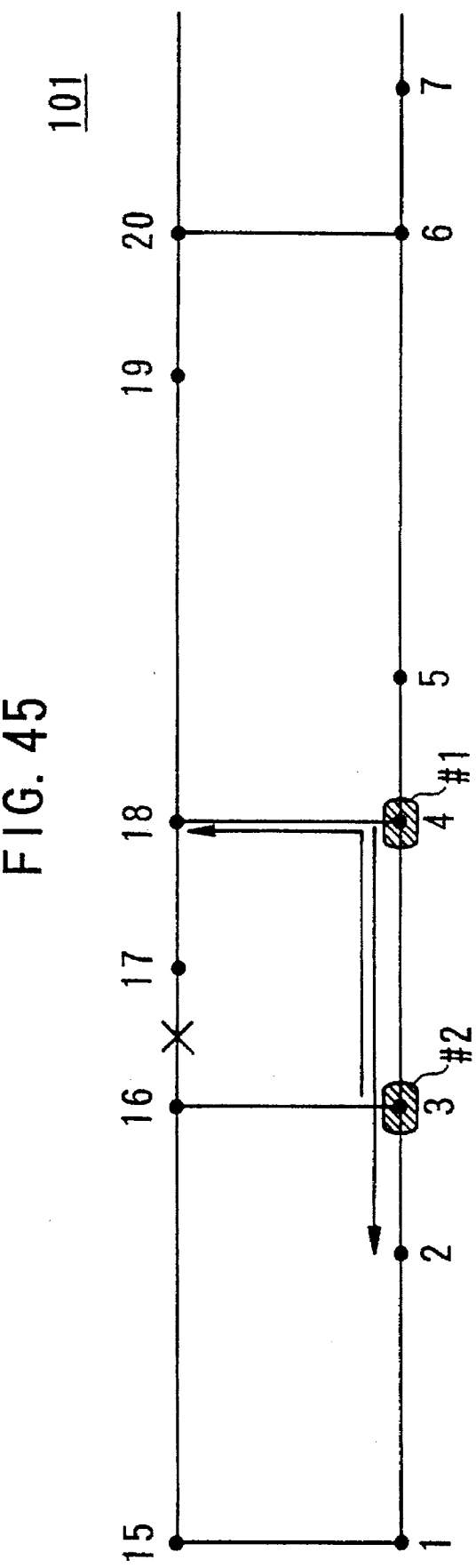
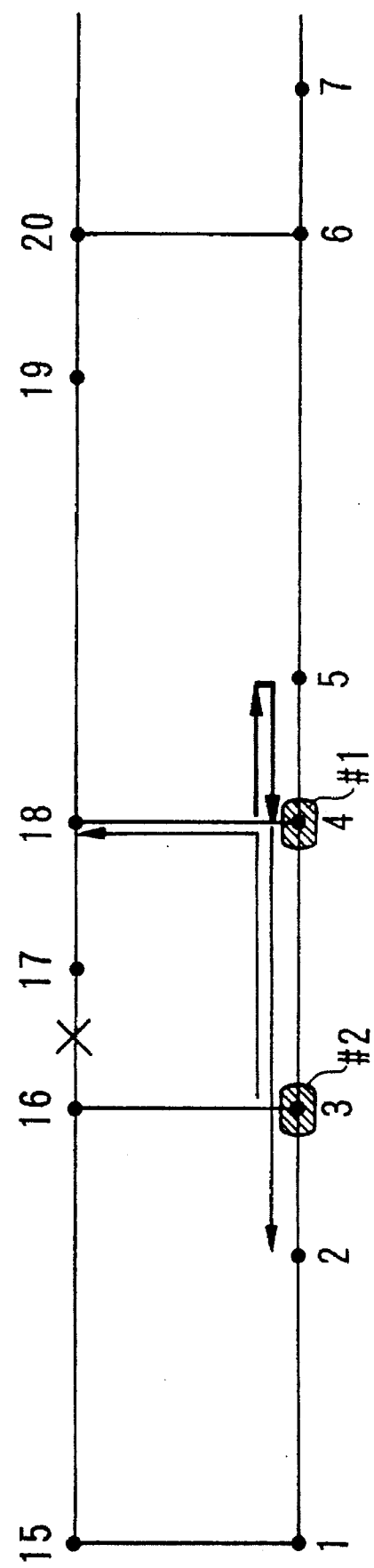

| NODE | RESERVING UNMANNED VEHICLE |
|---|---|
| 2 | #1 |
| 3 | #1, #2 |
| 4 | #1, #2 |
| 6 | #2 |
| 7 | #2 |
| 8 | #1 |

FIG. 59

| UNMANNED VEHICLE | DEPARTURE POINT | TARGET POINT |
|---|---|---|
| #1 | 19 | 20 |
| #2 | 21 | 26 |
| #3 | 3 | 20 |
| #4 | 17 | 10 |
| #5 | 11 | 8 |
| #6 | 2 | 19 |
| #7 | 20 | 1 |

FIG. 60

| UNMANNED VEHICLE | STANDARD ROUTE |
|---|---|
| #1 | 19→20 |
| #2 | 21→22→23→24→25→26 |
| #3 | 3→16→17→18→19→20 |
| #4 | 17→18→4→5→6→7→8→9→10 |
| #5 | 11→10→9→8 |
| #6 | 2→1→15→16→17→18→19 |
| #7 | 20→6→5→4→3→2→1 |

FIG. 61

| UNMANNED VEHICLE | FINAL ROUTE |
|---|---|
| #1 | 19→20→6 |
| #2 | 21→22→23→24→25→26 |
| #3 | 3→16→17→18→19→20 |
| #4 | 17→18→4→5→6→7→8→9→10 |
| #5 | 11→10→9→8 |
| #6 | 2→1→15→16→17→18→19 |
| #7 | 20→6→5→4→3→2→1 |

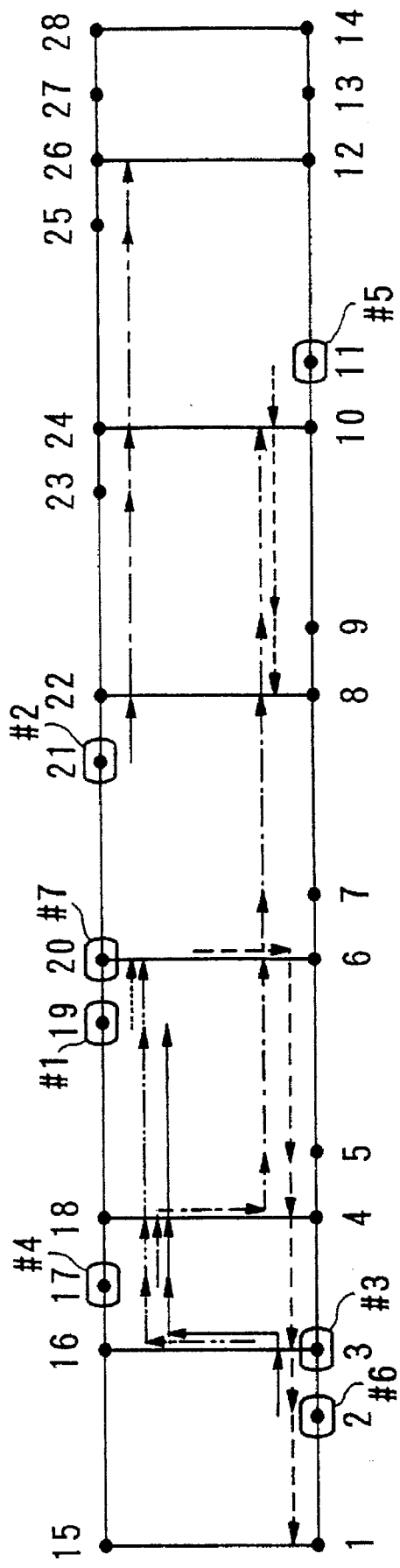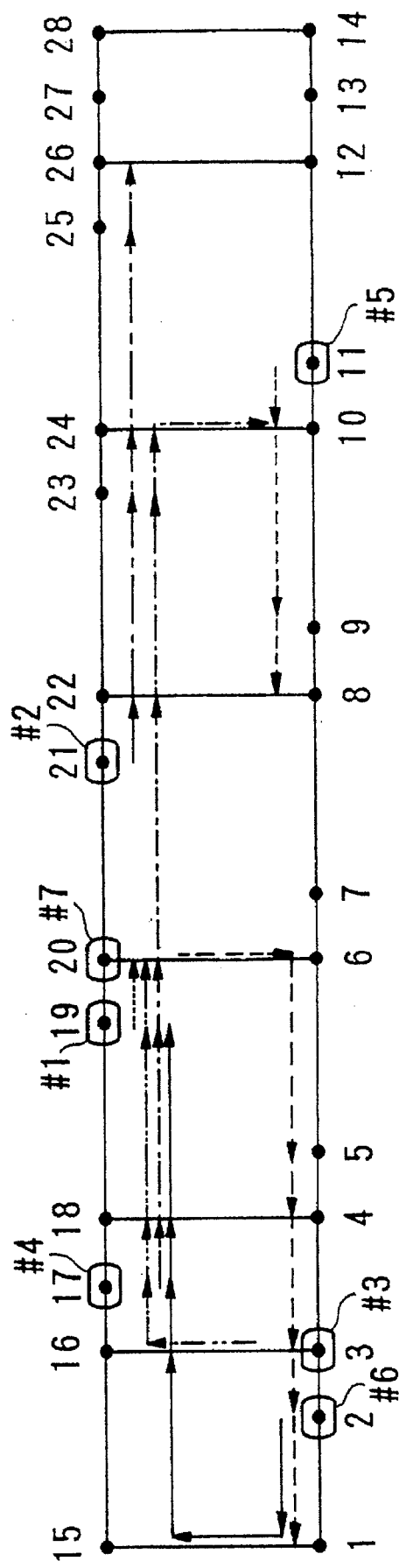

FIG. 66

| UNMANNED VEHICLE | STANDARD ROUTE |
|---|---|
| #1 | 19→20 |
| #2 | 21→22→23→24→25→26 |
| #3 | 3→16→17→18→19→20 |
| #4 | 17→18→19→20→6→7→8→22→23→24→10 |
| #5 | 11→10→9→8 |
| #6 | 2→1→15→16→17→18→19 |
| #7 | 20→6→5→4→3→2→1 |

FIG. 67

| UNMANNED VEHICLE | FINAL ROUTE |
|---|---|
| #1 | 19→20→6→5 |
| #2 | 21→22→23→24→25→26 |
| #3 | 3→16→17→18→19→20 |
| #4 | 17→18→19→20→6→7→8→22→23→24→10 |
| #5 | 11→10→9→8→22→23→24→10→9 |
| #6 | 2→1→15→16→17→18→19 |
| #7 | 20→6→5→4→3→2→1 |

T12(28)····ANGULAR POTENTIAL COST

C12(28)····ADDED COST

TRANSPORT MANAGEMENT CONTROL APPARATUS AND METHOD FOR UNMANNED VEHICLE SYSTEM

This is a continuation of application Ser. No. 08/220,541, filed Mar. 30, 1994, now abandoned.

BACKGROUND OF THE INVENTION

1. Field if the Invention

The present invention relates to a transport management control apparatus and method for the same which in a unmanned carrier system such as that found in factories and the like, maintains the transport of unmanned carrier vehicles, and also determines the carrier route.

2. Background Art

FIG. 1 shows a constructional outline of an automated carrier system possessing a plurality of unmanned vehicles. In this figure, a transport management control apparatus 100 for conducting management of an unmanned carrier system, a passage type travel grid 101, and unmanned vehicles #1 to #5 are provided. In addition, on travel grid 101, a plurality of nodes 1, 2 . . . 28 exist, at which unmanned vehicles #1 to #5 stop, change directions, and unload their contents. In addition, each of unmanned vehicles #1 to #5 possesses a function for determining its travel route up until its individual target point (hereafter referred to as "target node"); these unmanned vehicles move over their individually-determined routes to their target nodes which are determined by means of transport management control apparatus 100. The detail description with respect to a technique for determining optimal route will be given later.

In the following, an example of this unmanned carrier system will be explained.

Initially, move designations are sent from transport management control apparatus 100 to unmanned vehicles #1 to #5 as shown in FIG. 1. These unmanned vehicles #1 to #5 then follow the optimal travel routes to respective target destinations. In this determination of the optimal route, the costs of each of the travel intervals (arcs) linking neighboring nodes are used, and the route which provides the minimum total cost value is selected. In the formation of this travel route, the travel routes of other unmanned vehicles are not taken into consideration; in other words, the optimal travel route of one unmanned vehicle is determined without considering the existence of other unmanned vehicles. In addition, the aforementioned costs represent characteristics such as the time required for transit of each arc, and the like. FIG. 2 shows the cost involved in travel grid 101; in this figure, the cost for each arc is shown in ().

FIGS. 3 and 4 show the travel route of each unmanned vehicle #1 to #5 formed at this time; FIG. 3 is a transport diagram showing the travel routes of each of unmanned vehicles #1 to #5 using a solid line, dotted line, short-dashed line, single-dotted chain line, and double-dotted chain line, respectively; FIG. 4 shows the aforementioned routes in node series.

Subsequently, unmanned vehicles #1 to #5 each independently send to transport management control apparatus 100 the node numbers on their respective traveling routes, in movement order, and the reservation of the nodes is then carried out. Transport management control apparatus 100 then examines in order the node series requested in the aforementioned (FIG. 4), and allows reservations from other unmanned vehicles in the case when nodes are not previously reserved. Unmanned vehicles #1 to #5 then move up to the allowable nodes. By means of this aforementioned control, collisions between the unmanned vehicles are avoided.

Given the scenario in which unmanned vehicles #1 to #5 have progressed to nodes 4, 6, 20, 22, and 3, respectively, FIG. 5 is a transport diagram showing the present positions and subsequent travel routes of each unmanned vehicle #1 to #5 at this time. However, at the time of the subsequent movement over the travel grid in the above-mentioned state, a competition for travel routes is generated in which unmanned vehicles #1 and #2 move in opposite directions on the same travel route. In this case, unless one of these unmanned vehicles changes routes, neither will be able to reach the desired target. In addition, at this time, neither of unmanned vehicles #1 and #2 will be allowed to reserve the node of their subsequent destination.

At this point, unmanned vehicle #1 finds a detour route (node $4 \geq 18 \geq 19 \geq 20 \geq 12 \geq \ldots$) and reserves node 18 and then moves to the reserved node. In this manner, it is then possible for unmanned vehicles #2 to move along its original route; however, another competition for travel routes is then generated between unmanned vehicles #1 and #3. FIG. 6 is a transport diagram showing the routes of unmanned vehicles #1 to #5 at this time. Accordingly, unmanned vehicle #3 locates a detour route (node $20 \geq 6 \geq 5 \geq 4 \geq 3 \geq 16 \geq 15$), and then reserves and moves to node 6.

In the aforementioned manner, this competition for travel routes as well as search for detour routes is repeated, and unmanned vehicles #1 to #5 are then respectively moved to their desired destinations.

However, due to the change in movement routes resulting from competition for travel routes, wasteful movements and waiting periods are generated such as repeated searches for detour routes and the like. In addition, a significant problem exists in that as the number of vehicles increases, the carrier efficiency is drastically reduced.

Next, the description will be given with respect to the technique for determining an optimal route connecting a departure point and a target point in an unmanned carrier system.

The applicant of the present invention has previously proposed the method employing the structure shown in FIG. 7 (Japanese Patent Application No. Hei 3-141373) as an optimal route determining apparatus, in which at least the data establishment is complete, in unmanned carrier systems.

FIG. 7 shows the composition of an unmanned carrier vehicle; reference 16 indicates a map data memory which stores map data of the travel grid, and data relating to the nodes on the travel grid at which the unmanned carrier vehicle can stop, the coordinates thereof, or connection relationships are stored therein. Furthermore, reference numeral 17 indicates an unmanned vehicle data memory which stores data relating to the speed and the like of the unmanned carrier vehicles.

Furthermore, reference numeral 18 indicates a graph generator, which creates the graph GO shown below.

$$GO = (N, A, CO) \qquad (1)$$

Here, $N = \{n_1, n_2, \ldots, n_m\}$ indicates a set of all numbered nodes based on the mapped data: m indicates the node number.

$A = \{a_1, a_2, \ldots, a_n\}$ indicates a set of all arcs $a_k = \{n_i, n_j\}$, numbered in order, connecting 2 freely selected adjoining nodes $n_i$ and $n_j$ which are used as an initial point and a final point, and between which travel is possible; n represents the are number.

CO represents a set of costs calculated based on cost calculation characteristics, such as the distance between nodes and the like, with respect to each are $a_k=\{n_i, n_j\}$.

Reference 19 indicates an optimal route generator; it determines the departure node and target node from the carrying directive supplied to the unmanned carrier vehicles from a control unit, which is not depicted in the Figure. Next, this generator generates an optimal route which minimizes estimated costs based on the graph GO determined in the graph generator 18 and on the unmanned carrier vehicle data and map data.

Here, the cost calculation characteristics with respect to each are $a_k=\{n_i, n_j\}$ can include consideration of: (a) the distance between nodes, (b) the movement time between nodes, and in addition, (c) the directionality of the route.

In the case of (a), the cost $B_{ij}$ of the arc from the node i to the node j is determined as shown in formula (2) below.

$$B_{ij}=d_{ij} \qquad (2)$$

$d_{ij}$ represents the straight line distance (mm) between the initial point node i and the final point node j, and is expressed by:

$$d_{ij}=((x_j-x_i)^2+(y_j-y_i)^2)^{1/2} \qquad (3).$$

Here, $x_i$ and $y_i$ indicate the x and y coordinates (mm) of node 1, while $x_j$ and $y_j$ indicate the x and y coordinates (mm) of node j.

In the case of (b), the cost $B_{ij}$ of the arc from node i to node j is determined by means of the formula (4) below.

$$B_{ij}=d_{ij}/v_{ij} \qquad (4)$$

The distance $d_{ij}$ is determined as shown above, while $v_{ij}$ represents the movement speed (m/sec) from node i to node j, so that $B_{ij}$ has an amount in correspondence with the movement time between the nodes.

In the case of (c), the cost $B_{ij}$ of the are from node i to node j is determined in accordance with the formula (5) as shown below.

$$B_{ij}=(d_{ij}/v_{ij})\times(1-p_{ij}) \qquad (5)$$

Distance $d_{ij}$ and velocity $v_{ij}$ are determined as shown above, while $P_{ij}$ is a penalty coefficient expressing the "desirability" in accordance with the directionality of the route. For example, if the direction from node i to node j is an "undesirable" direction (opposite direction), then $P_{ij}$ is a negative number and the costs are raised, while when this direction is a "desirable" direction (normal direction) then $P_{ij}$ has a positive value, and it is possible to reduce the costs. The absolute value of the coefficient $P_{ij}$ is set within a range of "0–1" in accordance with the degree of desirability.

If appropriate penalty coefficients are established for all arcs, then it becomes possible to determine a single route having the smallest estimated costs (hereinbelow referred to as the shortest route) in the case in which 2 freely selected points (the departure point and the target point) are connected.

However, in order to appropriately establish penalty coefficients for all arcs, it was necessary to seriously consider the effects exerted on the route search by the penalty coefficient, and it was thus extremely complicated to establish such coefficients. However, when costs were calculated by means of the formulas (2) or (4), in which penalty coefficients were not considered, the following problems occurred.

Normally, travel grids have considerable regularity, such as the ladder shape shown in FIG. 8, or the square lattice shown in FIG. 9.

The lattice shaped travel grid shown in FIG. 8 is constructed from the node labeled "28". FIG. 10 shows the (x,y) coordinate data for each node.

FIG. 11 represents a compilation of the node numbers of the initial point and the final point, the direction, and the velocity data with respect to all scenes which are capable of adjoining movement in this lattice shaped travel grid. Herein, the directionality of the route is not considered and all directional data have a value of "0".

In addition, the movement velocity differs in the horizontal direction and the vertical direction, so that costs are calculated by means of formula (4), which takes account of movement velocity.

FIG. 12 shows the results of the calculation at the side of each arc. Herein, the costs of arcs in which the initial point and the final point are opposite is equal, so that for example, the costs of the arcs leading to nodes 1 and 2 are calculated by means of the following formula:

$$B_{12} = d_{12}/v_{12}$$
$$= ((4000-1000)^2+(0-0)^2)^{1/2}/(1000/1000)$$

and are thus calculated to be "3000". Here, the reason why the velocity was divided by "1000" was in order to bring it in line with the units of formula (4). An identical calculation is performed with respect to the other arcs.

In order to determine the shortest route from node 1 to node 28 based on this data, the costs should be estimated for each arc along which travel is conducted and the route having the smallest total cost should be selected. However, here, as shown in FIG. 13, there are 8 shortest routes having equal total costs.

Furthermore, the ladder shaped travel grid shown in FIG. 9 is constructed from the node numbered "100". FIG. 14 shows the (x, y) coordinate data for each node.

Here, the movement velocity between the nodes is set to (1000 mm/sec) in all cases, and the scene data are omitted. Furthermore, the distance between adjoining nodes is set to 1 meter in all cases, so that the costs for each arc as calculated by means of formulas (2) or (4) have an identical value of (1000) in all cases.

Commonly, in ladder shaped travel grids having a number of columns p and a number of rows q, the number of shortest routes from the node at the lower left to the node at the upper right is determined by the following formula:

$$N(p,q)={}_{p+q-2}C_{p-1} \qquad (6)$$

When the shortest route from node 1 to node 100 in the travel grid shown in FIG. 9 is calculated by means of this formula, then a number of routes shown by the following formula, which have identical conditions, are selected:

$$N(10, 10) = (18!)/(9! \times 9!)$$
$$= (18 \times 17 \times \ldots \times 1)/\{(9 \times 8 \times \ldots \times 1) \times (9 \times 8 \times \ldots \times 1)\}$$
$$= 48620 \text{ routes}$$

When a calculation method is employed which is based solely on the distance between the nodes comprising each arc, or on the movement time, in this manner, than routes including directions which are normally undesirable, routes requiring frequent changes in direction, or the like, are all selected as identical conditions. Accordingly, it is difficult to determine the route which is optimal in actuality.

SUMMARY OF THE INVENTION

In consideration of the aforementioned, it is a first object of the present invention to provide a transport management control apparatus and method for the same in which a plurality of unmanned vehicles can be efficiently moved to their target destinations.

According to a first aspect of the present invention, there is provided a transport management control apparatus is provided which controls the transport of a plurality of unmanned vehicles traveling along a travel route comprising a plurality of nodes constituting stopping positions, and connecting routes connecting these nodes. The transport management control apparatus comprises:

route search means, which searches, for each unmanned vehicle, an optimal travel route which connects a present node of the unmanned vehicle to a target node of the unmanned vehicle and has a minimum cost, and route arrangement means, which, based on the searched result by the route search means, controls the route search means so that a travel interval having a specified moving direction is not searched as a part of optimal travel routes, and causes the route search means to search the optimal routes in order to obtain the final optimal travel routes which have no conflict.

Furtheremore, there is provided a transport management control apparatus which has first means for simulating the movements of the unmanned vehicles by using a simulation model and for detecting whether the unmanned vehicles meet a deadlock problem, based on the simulation result, and second means for resolving the deadlock problem.

Furtheremore, there is provided a transport management control method for controlling the transport of a plurality of unmanned vehicles traveling along a travel route comprising a plurality of nodes comprising stopping positions and connecting routes connecting these nodes. The transport management control method has the steps of:

a first step, in which the optimal travel route of each of a plurality of unmanned carrier vehicles is determined;

a second step, in which, in the plurality of optimal travel routes obtained by means of the first step, opposite direction intervals comprising travel routes having mutually opposite directions are found;

a third step, in which processing is halted in the case in which opposite direction intervals are not present, and in other cases, costs of the opposite direction intervals are estimated;

a fourth step, in which a direction is applied to the opposite direction interval having the highest cost so that this interval has one direction;

a fifth step, in which, in the traveling routes to which a direction has been applied, the optimal traveling routes of all unmanned carrier vehicles are again determined; and in determining, by means of the repetition of steps 3 through 5, optimal travel routes having no conflict.

Furtheremore, there is provided a transport management control method for controlling the transport of a plurality of unmanned vehicles traveling over a travel route formed from a plurality of node provided at stationary positions, and connecting routes connecting the intervals between said nodes. The transport management apparatus has the steps of:

a. searching for a travel route for each unmanned vehicle in which an unmanned vehicle does not travel in the opposite direction over the same connection route as another unmanned vehicle;

b. simulating the movement of the unmanned vehicle in the travel grid;

c. adding a relief route to the route of an unmanned vehicle which has already completed its travel, in the case when the simulation result teaches that any unmanned vehicle meets a deadlock problem;

d. changing the travel sequence of an unmanned vehicle in the case when the deadlock problem cannot be solved by said step c;

e. adding a detour route to the route of an unmanned vehicle in the case when the deadlock problem cannot be solved by means of said step d; and f. adding a passing route to the route of an unmanned vehicle in the case when the deadlock problem cannot be solved by means of said step e.

Furtheremore, there is provided an optimal route determination apparatus. The apparatus comprises:

first cost calculation means, in which, with respect to a set of travel intervals connecting a first and second node which Join one another and between which travel is possible, among a plurality of nodes on a travel route, calculates a first cost for each travel interval, based on the distance between the nodes and the movement time;

second cost calculation means, which, when the target nodes are directed, calculates the angular difference between the direction of the first node, as seen from the target node, and a prespecified direction, and calculates the angular difference between the direction of the second node, as seen from the target node, and a prespecified direction, and based on these angular differences, calculates a second cost for each travel interval;

addition means for adding the results of the cost calculation of the first and second cost calculation means for each travel interval; and route generation means, which, based on the added costs calculated by means of the addition means, selects the case in which the estimated value of the added costs of each travel interval has the smallest value as the optimal route from the departure node to the target node.

BRIEF DESCRIPTION OF THE DRAWINGS

FIG. 10 shows the (x, y) coordinate data for each node in the travel grid shown in FIG. 8.

FIG. 11 shows compilation of the node numbers of the initial point and the final point, the direction, and the velocity data with respect to all scenes in the travel grid shown in FIG. 8.

FIG. 14 shows the (x, y) coordinate data for each node in the travel grid shown in FIG. 9.

FIG. 24 shows oposite direction intervals in travel routes and the results of the ectimates of the costs.

FIG. 29 is a transport diagram for use in describing an operation using a Petri net.

FIG. 30 shows departure nodes and target nodes of unmanned vehicle shown in FIG. 29.

FIG. 31 is a Petri net diagram which models the transport diagram shown in FIG. 29.

FIG. 37 shows results of an examination conduced in the deadlock recognition procedure.

FIG. 39 is a transport diagram showing an example of the operations of an ignition sequence adjusting procedure.

FIG. 40 shows a node reservation sequence.

FIGS. 45 and 46 are transport diagrams showing an operational example of the passing route search procedure.

FIG. 59 shows an initial designation of Operational Example 1 of transport management control apparatus 102.

FIG. 60 shows a standard routing of the same.

FIG. 61 shows a final routing of the same.

FIG. 62 shows the initial routing of the same.

FIG. 63 shows the standard routing of the same.

FIG. 66 show the standard routing of Operational Example 2 of transport management apparatus 102.

FIG. 67 shows the final routing of Operational Example 2 of transport management control apparatus 102.

PREFERRED EMBODIMENTS

In the following, an embodiment of the present invention will be explained with reference to the figures.

Figure 15:
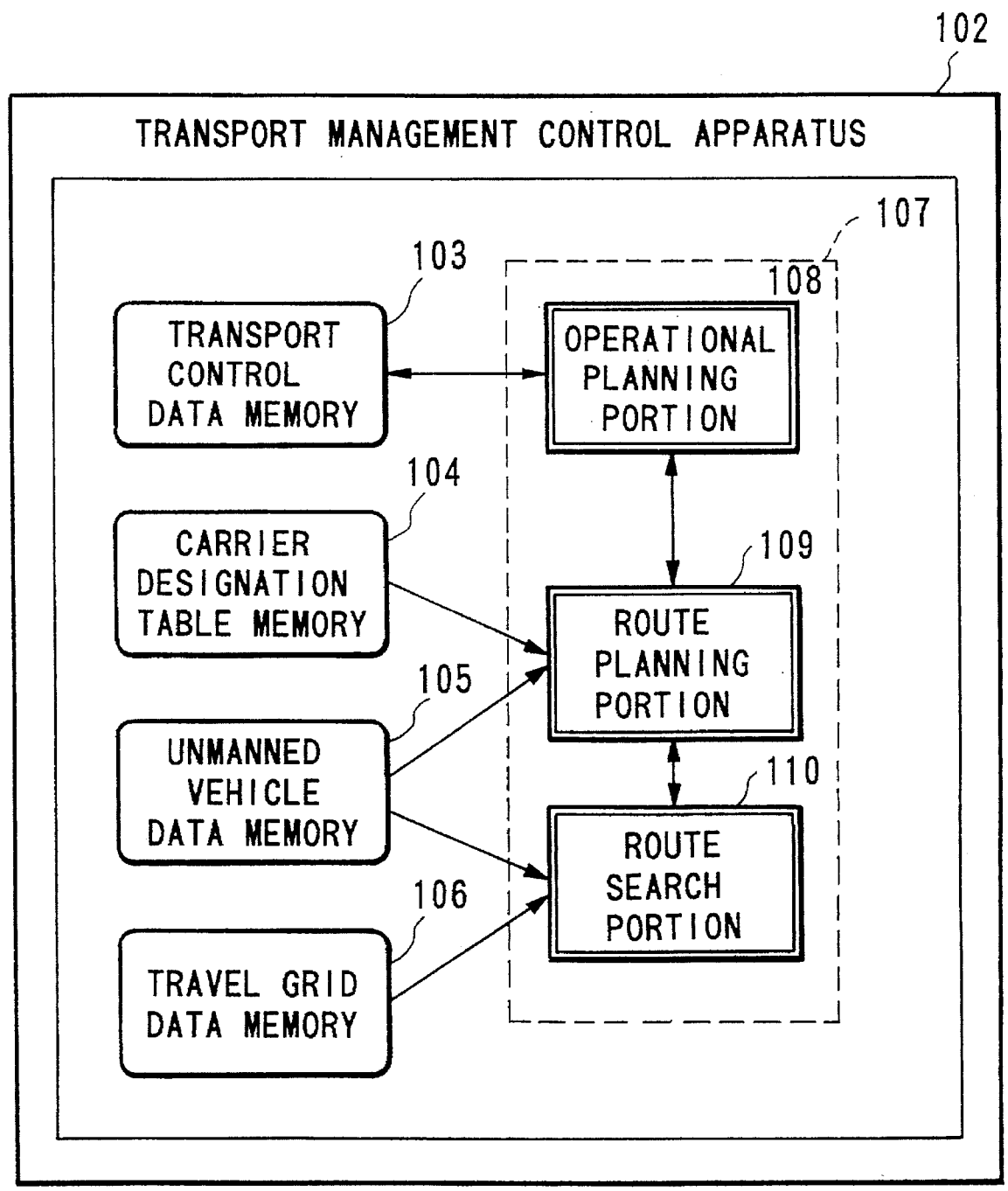
FIG. 15 is a block diagram showing a transport management control apparatus according to an embodiment of the present invention.

FIG. 15 is a block diagram showing the construction of a transport management control apparatus 102 according the present embodiment. In this figure, a transport control data memory 103 is provided for recording the movement routes of each unmanned vehicle as well as the node reservation sequence; a carrier designation table memory 104 for recording the position and carrier destinations of the items to be transported; an unmanned vehicle data memory 105 for recording states, such as the present position, movement direction, and the like of each unmanned vehicle; a travel grid data memory 106 for recording the coordinates of each node along the travel grid, as well as the connection relationships and costs therein (FIG. 2); and a controller 107 for determining the optimum travel route and operational sequence of the unmanned vehicles, are provided. The aforementioned controller 107 is formed by means of a CPU or the like, and can be functionally divided into operational planning portion 108, route planning portion 109, and route search portion 110.

In the following, the aforementioned operational planning portion 108, route planning portion 109, and route search portion 110 will be explained.

A: Explanation of the processing conducted by route search portion 110

When a route search directive is sent from route planning portion 109, then route search portion 110 first determines the route from the departure node to the target node. Next, the costs of each route are estimated from the costs which are stored in travel grid data memory 106, and the route having the smallest costs is selected as the optimal route.

Figure 2:
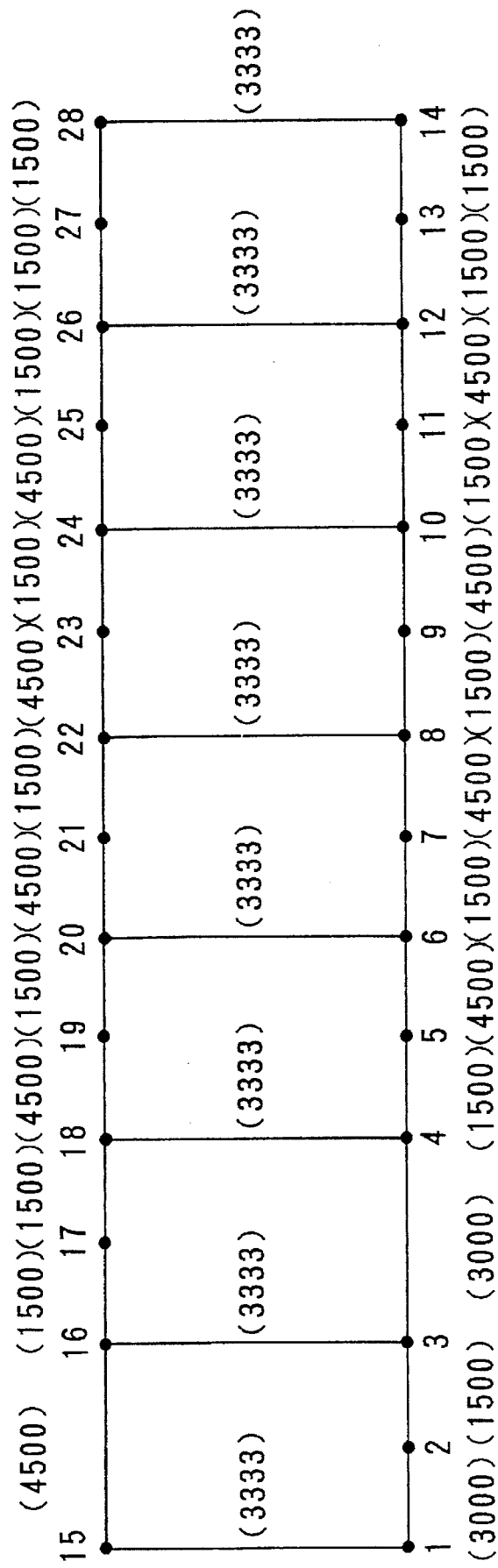
FIG. 2 shows the costs on a travel grid 101 of the conventional example shown in FIG. 1.

Travel grid data memory 106 stores the costs of each arc of travel grid 101 as shown in FIG. 2. In FIG. 2, the numbers within the parentheses show the costs of each arc; for example, the costs between nodes 1 and 2 is "3000". Here, in the case in which the departure node is 1 and the target node is 4, the estimated costs of the route along nodes 1≧2≧3≧4 is the smallest, at "7500", and this route is thus selected as the optimal route. However, in the case in which the directional information discussed hereinbelow is contained in the route search directive, routes having a direction opposite to this applied direction are not selected.

Route search portion 110 outputs the routes determined by means of the above method, and the costs thereof, to route planning portion 109. However, the routes created here are the optimal routes only in the case in which there is no conflict on the travel grid.

B: Explanation of the Processing Conducted by the Route Planning Portion 109

In route planning portion 109, the final travel grids are determined using a tree search method. The "tree" to be discussed herein has a structure such as that shown in FIG. 16, in which branching is conducted in a downward direction. Here, references N1, N2, ... indicate branching points at which branching conditions are introduced, and among these, branching point N1 is the root branching point at which branching is initiated. Furthermore, for example, if branching point N2 is taken to be the present branching point, then branching point N1 is the master branching point of branching point N2, and branching points N3 and N4 are subsidiary branching points of branching point N2. The search is fundamentally conducted from the upper branching points in the direction of the lower branching points; however, in cases in which the search becomes impossible, the master branching point is temporarily returned to (hereinbelow, this is termed "backtracking") and branching is conducted to other branching points. The detail description with respect to the above method using the tree will be given later.

Figure 17:
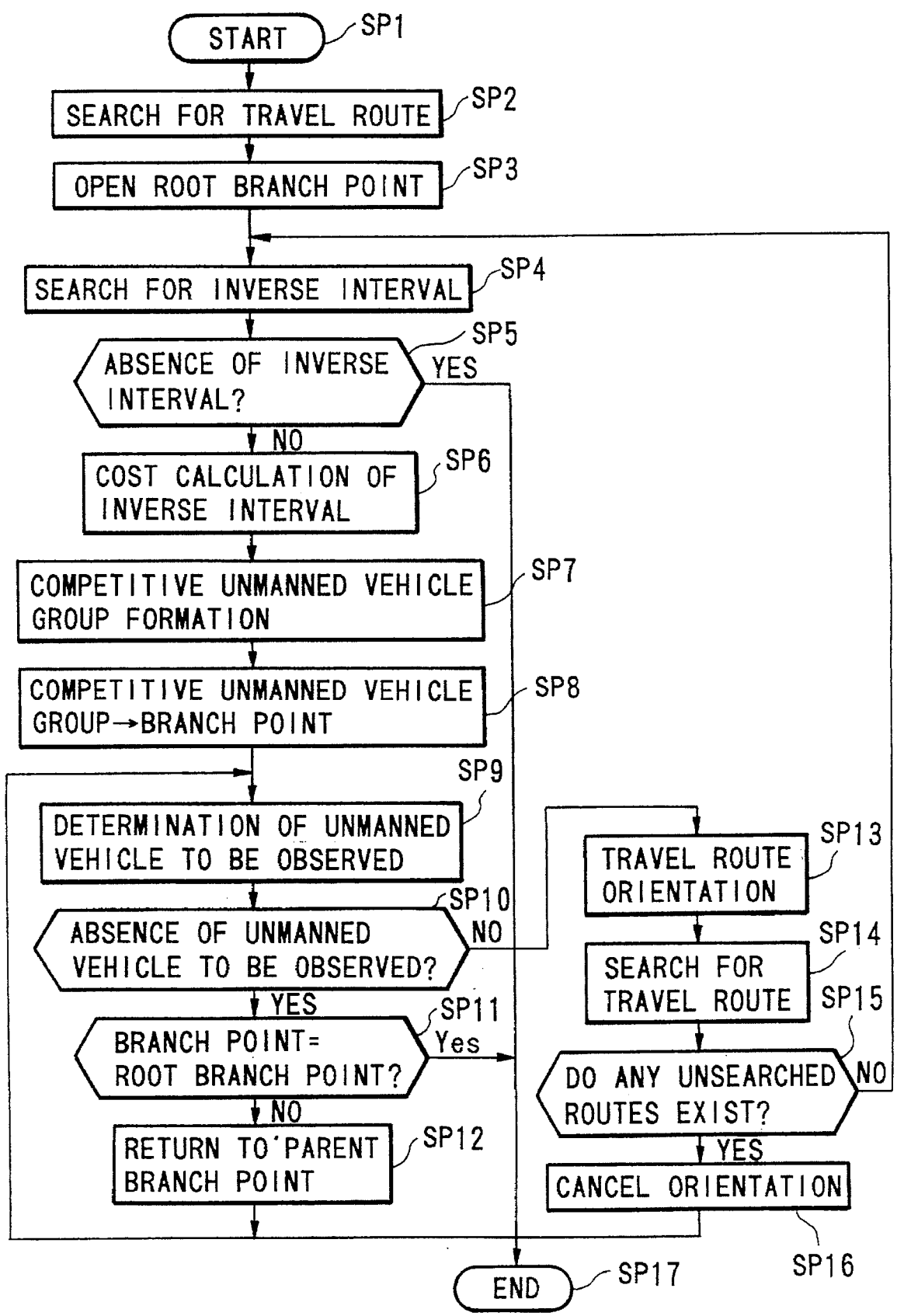
FIG. 17 is a flow chart showing the route planning process of route planning portion 109.

FIG. 17 is a flow chart showing the processing conducted by route planning portion 109; the explanation hereinbelow will be conducted on the basis of this Figure.

When processing is initiated (step SP1), in step SP2, a search directive is sent to route search portion 110, and the traveling routes of each unmanned carrier vehicle are determined. Here, the route search portion 110, which has received a search directive, searches for the route by means of the method described above, and outputs the results to route planning portion 109. In this search directive, the target nodes of the unmanned carrier vehicles, which are determined by means of the data which is stored in carrying directive table memory 103, are contained.

In step SP3, the root branching point of the tree is cleared.

In step SP4, a freely selected interval in which the movement of two unmanned carrier vehicles is conducted so as to be in opposite directions (opposite direction interval) is found, based on the traveling route of each unmanned carrier vehicle which is supplied from route search portion 110, and this is conducted for all combinations of unmanned carrier vehicles.

In step SP5, if no opposite direction intervals are present in the results of step SP4, processing is terminated (step SP16), and in the case in which opposite direction intervals are present, control proceeds to the following step SP6. Furthermore, in the ease in which opposite direction intervals are not present, the traveling routes at this time becomes the final traveling routes.

In step SP6, the costs of the opposite direction intervals of the routes of each unmanned carrier vehicle are estimated. Here, the costs of the opposite direction intervals are read out from travel grid data memory 106. Furthermore, in the ease in which a conflict arises in a certain opposite direction interval between a plurality of other routes, the cost per occurrence of conflict is estimated.

In step SP7, a conflicted unmanned carrier vehicle set is created in the order of increasing costs of the traveling routes and listed by number attached to the unmanned carrier vehicles.

In step SP8, a branching point having this conflicted unmanned carrier vehicle set is appended below the master branching point. In the case in which this step SP8 is initially conducted, the conflicted unmanned carrier vehicle set is established in the root branching point.

In step SP9, an unmanned carrier vehicle to be observed is determined from the conflicted unmanned carrier vehicle set. This unmanned carrier vehicle to be observed is selected, in order, from the first unmanned carrier vehicle in the conflicted unmanned carrier vehicle set which is listed in order of increasing cost. Furthermore, in the case in which there is no succeeding unmanned carrier vehicle, a determination is made that there is no unmanned carrier vehicle to be observed.

In step SP10, in the case in which an unmanned carrier vehicle to be observed was not present in the processing of the previous step SP9, control proceeds to the following step SP11, while in the case in which an unmanned carrier vehicle to be observed was present, branching is conducted to step SP13.

In step SP11, an investigation is made into whether the present branching point is prior to the root branching or not, and in the case in which the present branching point is not the root branching point, control passes to the following step SP12, while in the case in which the present branching point is the root branching point, that is to say, in the case in which route management has failed in all of the conflicted unmanned carrier vehicle sets of the route branching point, all processing is terminated as a result of route management failure (step SP17).

In step SP12, the processing of the present branching point is passed to the master branching point (backtracking) and control returns to the processing of step SP9. Furthermore, the directional application which was conducted at the time of the branching to the present branching point is canceled at this point.

In step SP13, in the travel grid, opposite direction intervals on the route of the unmanned carrier vehicle to be observed have a direction which is opposite to the direction of movement of the unmanned carrier vehicle applied thereto (the route is made unidirectional), and this is added to the directional information.

In step SP14, a search directive is sent to route search unit 108, and all the routes of the unmanned carrier vehicles in the travel grid to which a direction has been applied are predetermined.

In step SP15, an investigation is made as to whether routes which were not determined in the route search of the previous step SP14 are present or not, and in the case in which such routes are present, control passes to the following step SP16, while in the case in which such routes are not present, control returns to step SP4.

In step SP16, the directional application of the travel grid which was conducted in step SP13 is canceled, and then control returns to step SP9.

In the processing of the route planning portion 109 described above, in the case in which no other routes connecting to adjoining points on the travel grid are present, this interval is not included in the opposite direction interval.

B-1: Operational Example 1

Hereinbelow, an operation example of the transport management control apparatus 102 will be explained. FIGS. 18 to 23 are transport diagrams showing the carrying route of each unmanned carrier vehicle; portions therein corresponding to portions in FIG. 3 have identical reference numbers, and an explanation thereof will omitted here. In addition, in this operational example, the departure nodes and target nodes of each unmanned carrier vehicle #1 through #5 are identical to those in FIG. 3.

Figure 18:
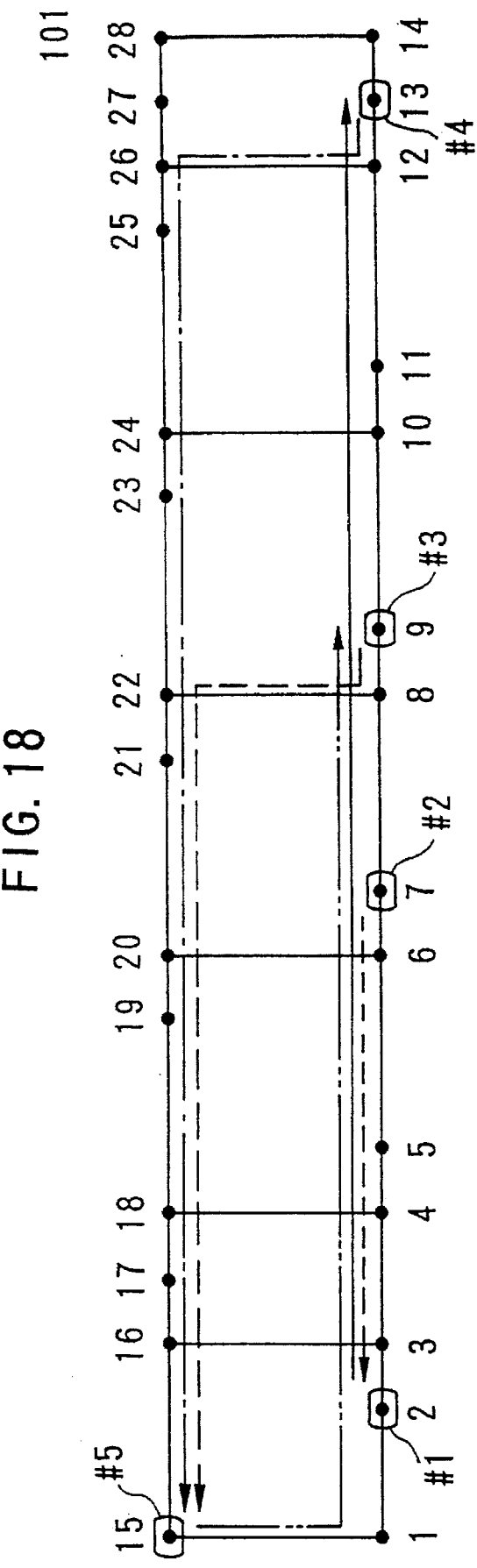
FIGS. 18 to 23 are transport diagrams showing a first example of the operation involved in an operational planning process.

First, route planning portion 109 determines the target node of the movement of unmanned carrier vehicles #1 through #5, based on the carrying directives stored in carrying directive table memory 104, and a search directive is conducted with respect to route search portion 110. Route search portion 110 finds the respective traveling routes of unmanned carrier vehicles #1 through #5 in accordance with the search directive, and the results thereof are outputted to route planning portion 109 (FIG. 18).

Route planning portion 109 finds the opposite direction interval, and the carriers involved in the conflict, from the traveling routes (initial routes) supplied from route search portion 110, and estimates the cost of the opposite direction intervals. FIG. 24 shows the opposite direction intervals and the results of the estimates of the costs thereof. Next, the results of the estimate are listed in order of increasing cost, and the conflicted unmanned carrier vehicle set shown below is created. Unmanned carrier vehicle composition= (#2, #1, #5, #3, #4)

Figure 16:
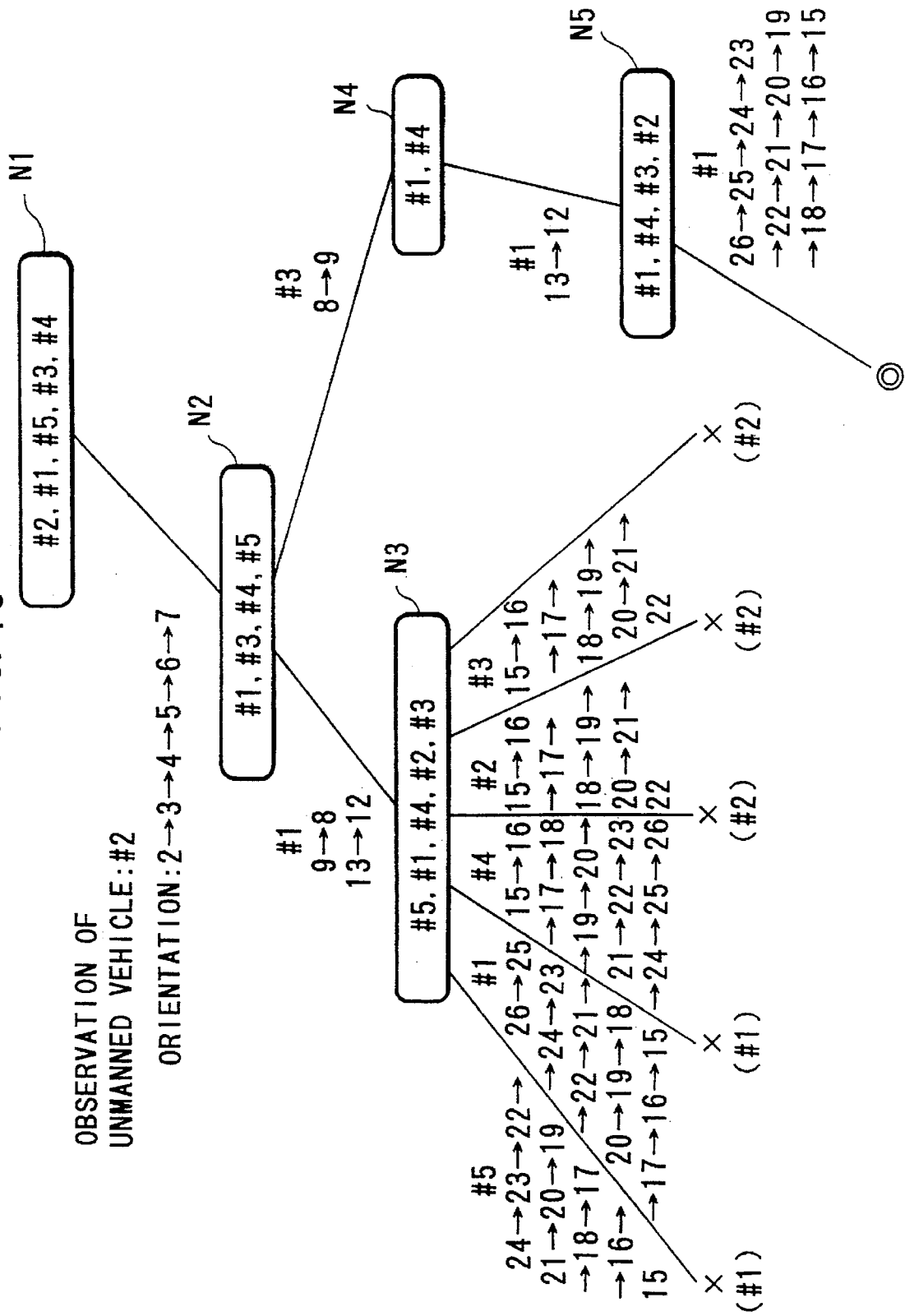
FIG. 16 shows a "tree" diagram used in route planning.

Next, route planning portion 109 establishes the conflicted unmanned carrier vehicle set in the root branching point N1 shown in FIG. 16, and the first unmanned carrier vehicle #2 is selected as the unmanned carrier vehicle to be observed. Next, directional application in a direction opposite to the direction of movement of unmanned carrier vehicle #2 (making this interval unidirectional) is conducted with respect to the opposite direction interval of the route of unmanned carrier vehicle #2, and in the subsequent route search, the movement is limited to the direction nodes $2 \geq 3 \geq 4 \geq 5 \geq 6 \geq 7$.

Figure 19:
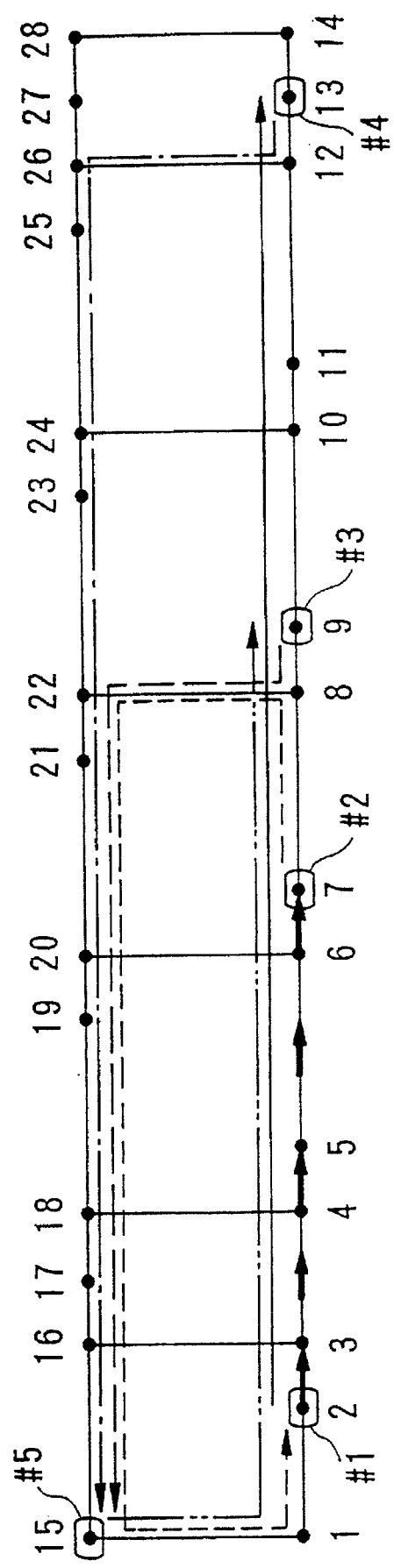

Next, route planning portion 109 outputs a search directive containing directional information, and route search portion 110 again conducts a route search based on the directional information. FIG. 19 is a transport diagram showing the results of this search, in the diagram, the interval to which direction has been applied is indicated by the thick arrows. Based on these results, route planning portion 109 again conducts an estimate of the costs of each route, and the set (#1, #3, #4, #5) is created. Next, a branching point N2 is appended below the branching point N1 of the tree (FIG. 16), and the conflicted unmanned carrier vehicle set described above is established in branching point N2. In addition, the unmanned carrier vehicle #2 of branching point N1 is connected with branching point N2.

Figure 20:
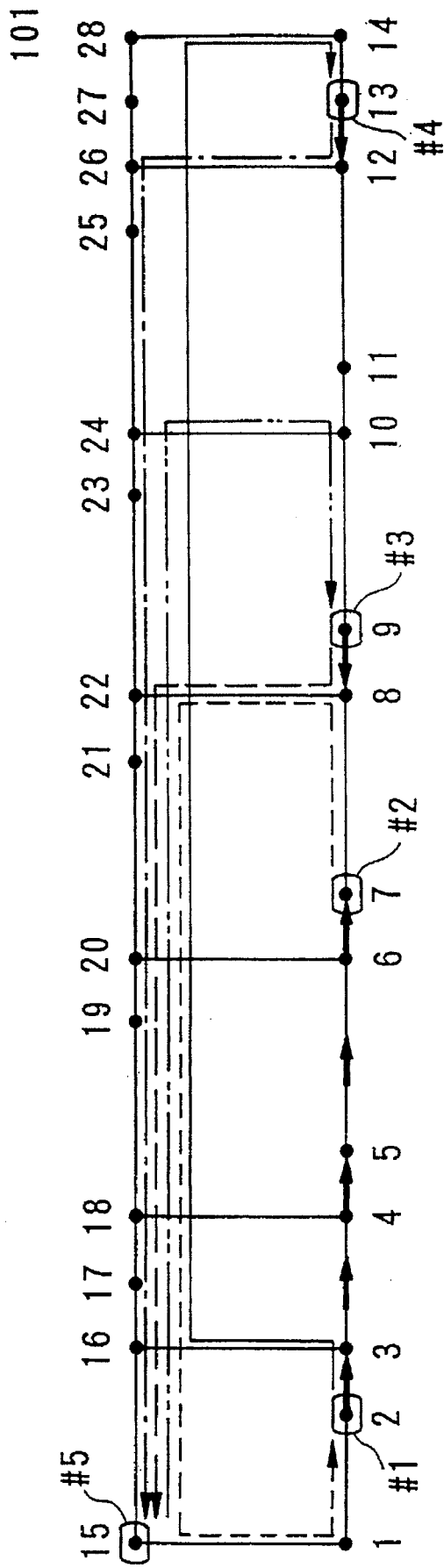
Figure 21:
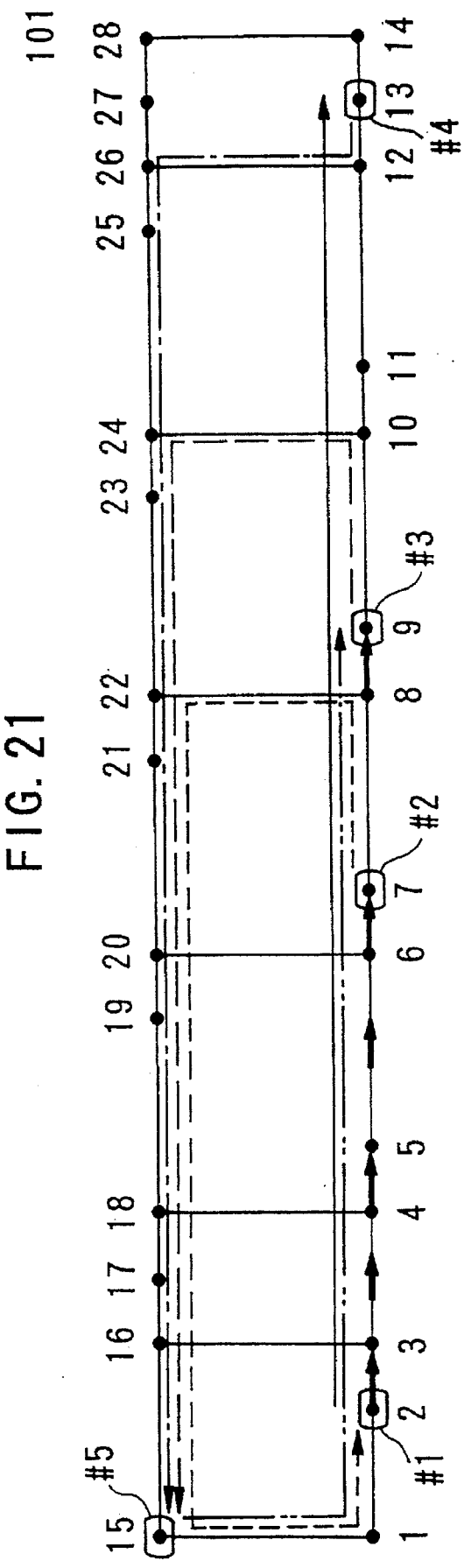

Next, the unmanned carrier vehicle #1, which stands at the head of the set of the branching point N2, is selected as the unmanned carrier vehicle to be observed, the directional application of the opposite direction intervals is conducted, and this is appended to the previous directional application. Next, when the route is predetermined in route search portion 110, the search results shown in FIG. 20 are obtained. Next, nodes $9 \geq 8$ and $13 \geq 12$ are again made unidirectional. Route planning portion 109 again conducts a cost estimate, creates the conflicted unmanned carrier vehicle set (#5, #4, #2, and #3), and establishes this conflicted unmanned carrier vehicle set in branching point N3 below branching point N2 in the conflict tree.

Then, unmanned carrier vehicle #5 becomes the unmanned carrier vehicle to be observed, and identical processing is conducted. As a result thereof, a directional application (nodes $24 \geq 23 \geq 22 \geq 21 \geq 20 \geq 19 \geq 18 \geq 17 \geq 16 \geq 15$) is further added to the previous directional application, so that in the route search, the route of unmanned carrier vehicle #1 cannot be obtained. This state indicates a failure of route alignment (the x symbol in FIG. 16), and at this time, the directional application of the routes which was established is canceled.

Next, the unmanned carrier vehicle which is to be observed is changed to the following unmanned carrier vehicle #1 in the conflicted unmanned carrier vehicle set of branching point N3, and identical processing is conducted; however, here as well, a route could not be obtained for the unmanned carrier vehicle #1. Next, the unmanned carrier vehicles are selected in order from the same conflicted unmanned carrier vehicle set as the unmanned carrier vehicle which is to be observed, and identical processing is conducted; however, all route alignments fail.

Figure 22:
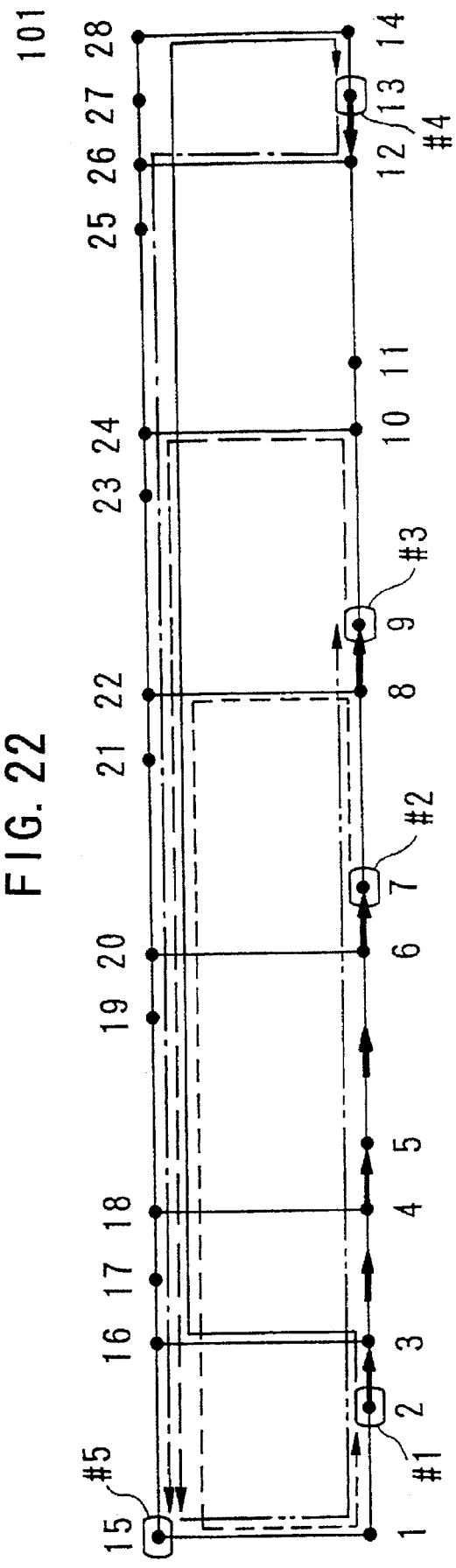
Figure 23:
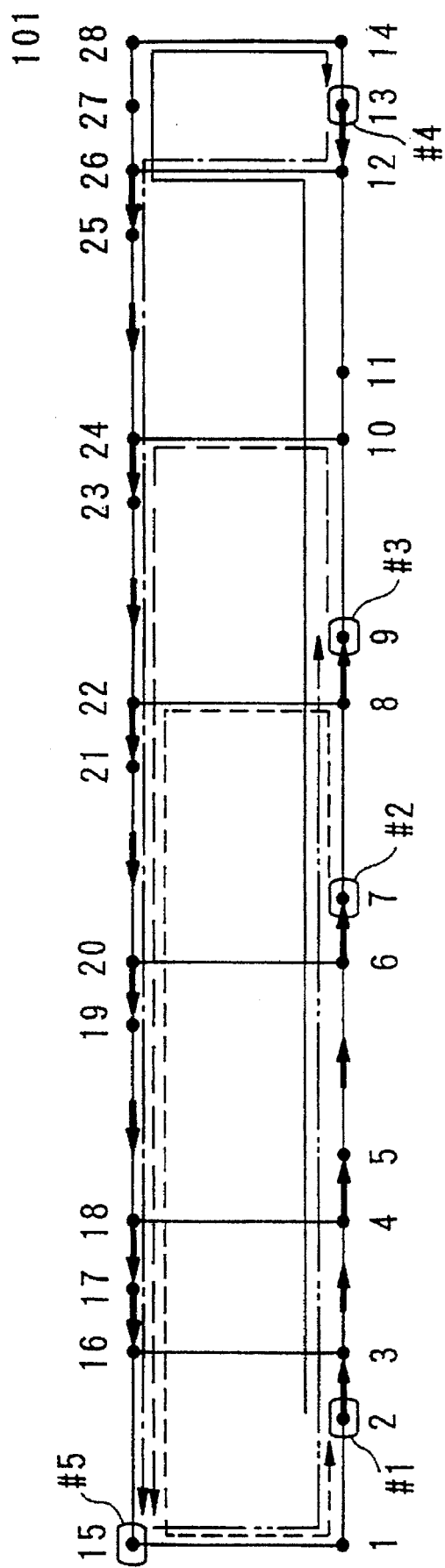

For this reason, backtracking is conducted to the master branching point N2, and the directional application (node $9 \geq 8$, node $13 \geq 12$) based on the previous unmanned carrier vehicle #1 to be observed of the branching point 2 is canceled. Next, the next unmanned carrier vehicle #3 of this conflicted unmanned carrier vehicle set is made the unmanned carrier vehicle to be observed, and when identical processing was conducted, the search results shown in FIG. 21 were obtained. Next, the conflicted unmanned carrier vehicle set (#1, #4) is established in the subsidiary branching point N4 of branching point N2. At this time, unmanned carrier vehicle #1 is selected as the unmanned carrier vehicle to be observed, the search results shown in FIG. 22 are obtained, and the conflicted unmanned carrier vehicle set (#1, #4, #3, #2) is established in the subsidiary branching point N5 of the branching point N4. Furthermore, unmanned carrier vehicle #1 is selected as the unmanned carrier vehicle to be observed, and directional application and a route search are conducted (FIG. 23). At this time, there is no opposite direction interval present in the route, so that the route alignment is successful (shown by the concentric circle mark in FIG. 16), and the routes at this point become the final traveling routes.

The traveling routes are transmitted from transport management control apparatus 102 to unmanned carrier vehicles 1 through #5, and the unmanned carrier vehicles #1 through #5 conduct movement in accordance with these routes.

B-2: Operational Example 2

Figures 3, 4:
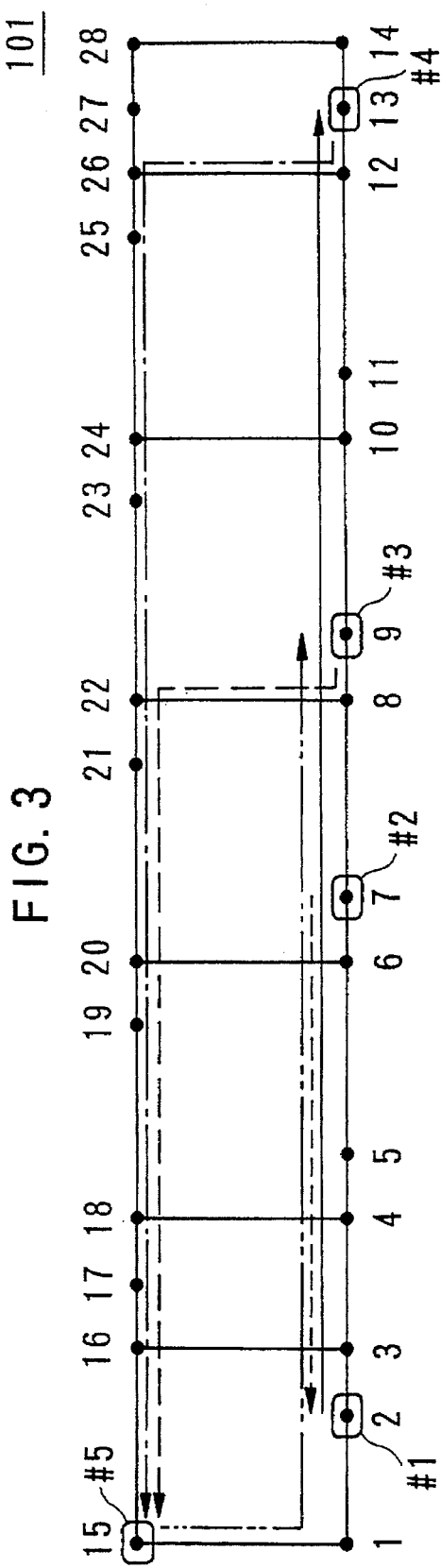
FIGS. 3 and 4 show movement routes in a first conventional example.
Figure 5:
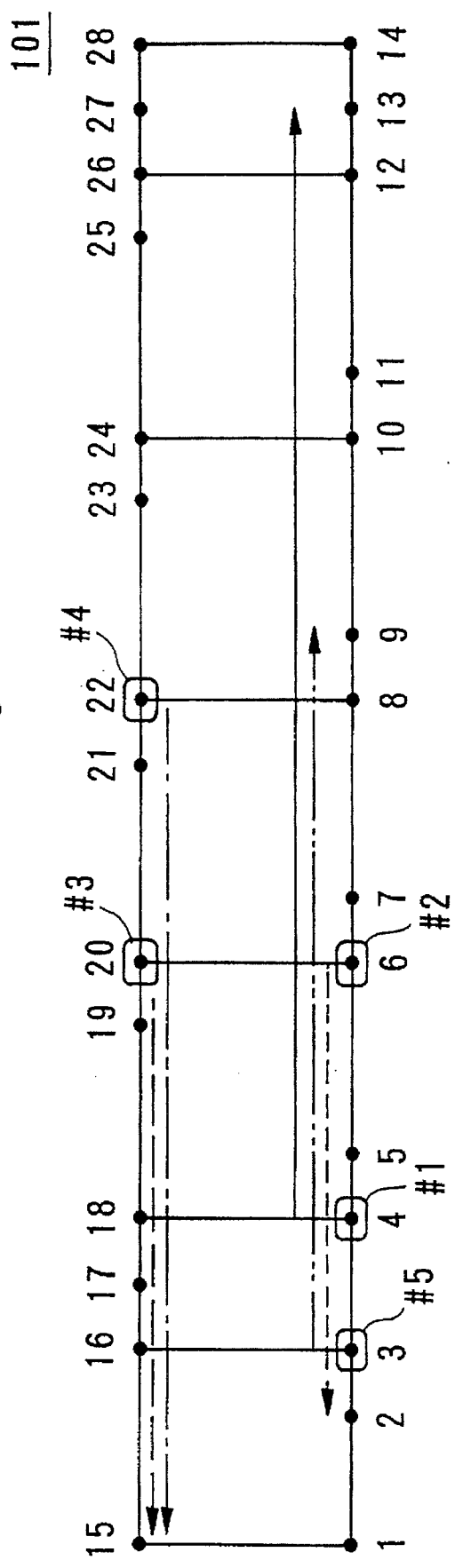
FIG. 5 shows movement routes in a second conventional example.
Figure 6:
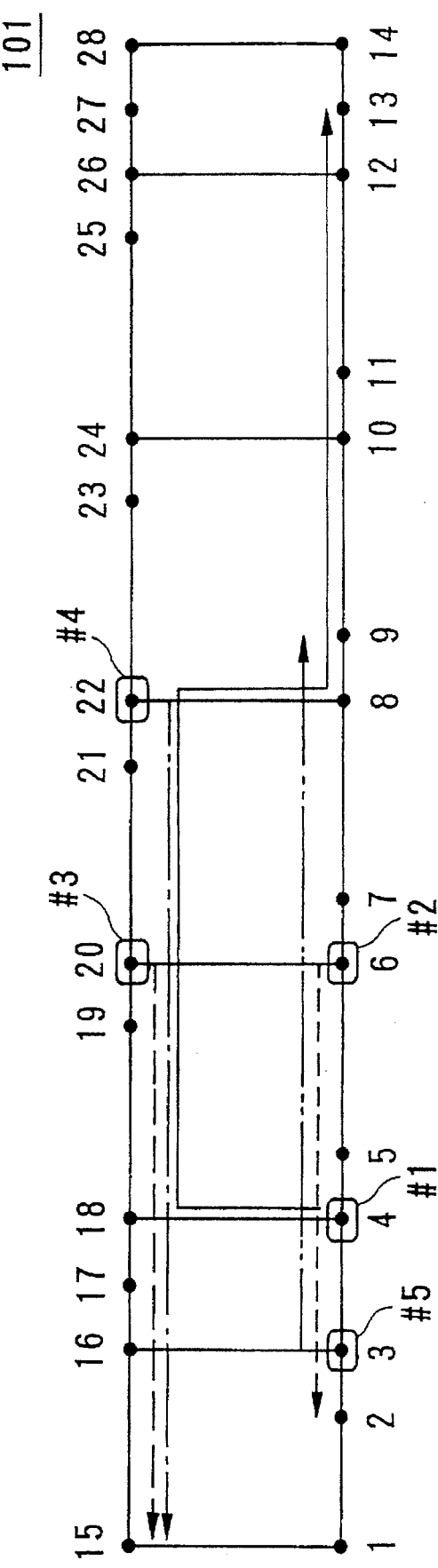
FIG. 6 shows movement routes in a third conventional example.

Next, the operational example in travel grid 110 (FIG. 25) will be explained. This travel grid 110 represents the travel grid 101 (FIG. 3) described above, in which the interval between nodes 20 and 21 has been rendered impassable. In this operational example, the departure nodes and target nodes of each of the unmanned carrier vehicles #1 through #5 are identical, to those of the operational example 1 (FIG. 3). Furthermore, in this case, the intervals between nodes 6 and 7, nodes 7 and 8, and nodes 21 and 22 possess no detour routes other than the routes linking these nodes, so that they are not included in the opposite direction intervals.

Figure 25:
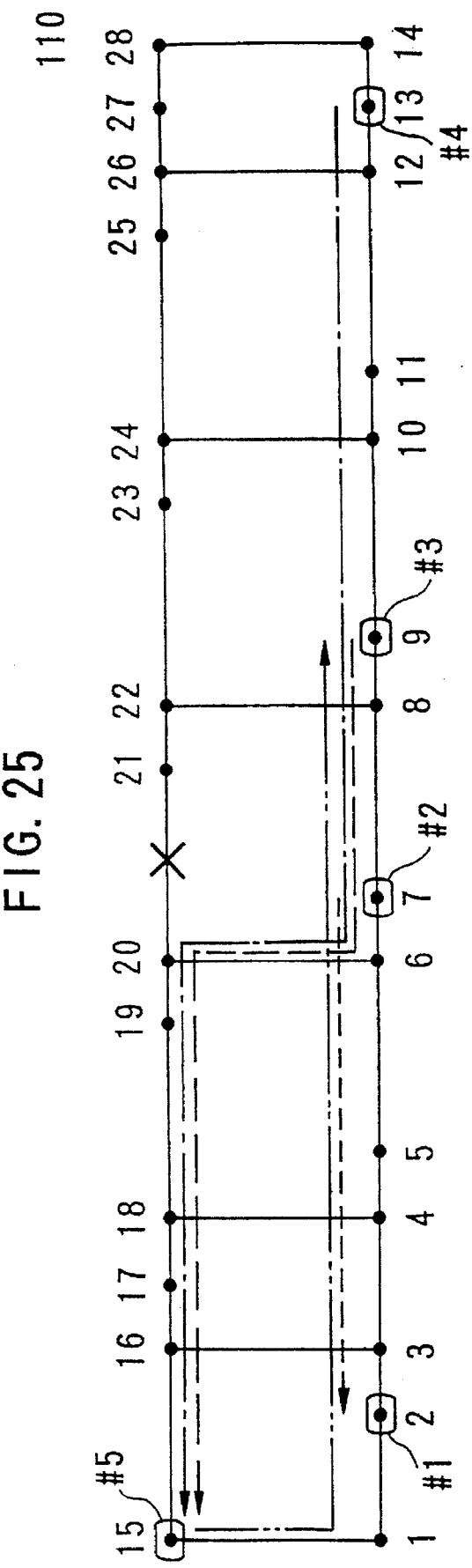
FIGS. 25 to 27 are transport diagrams showing a second example of the operation.
Figure 28:
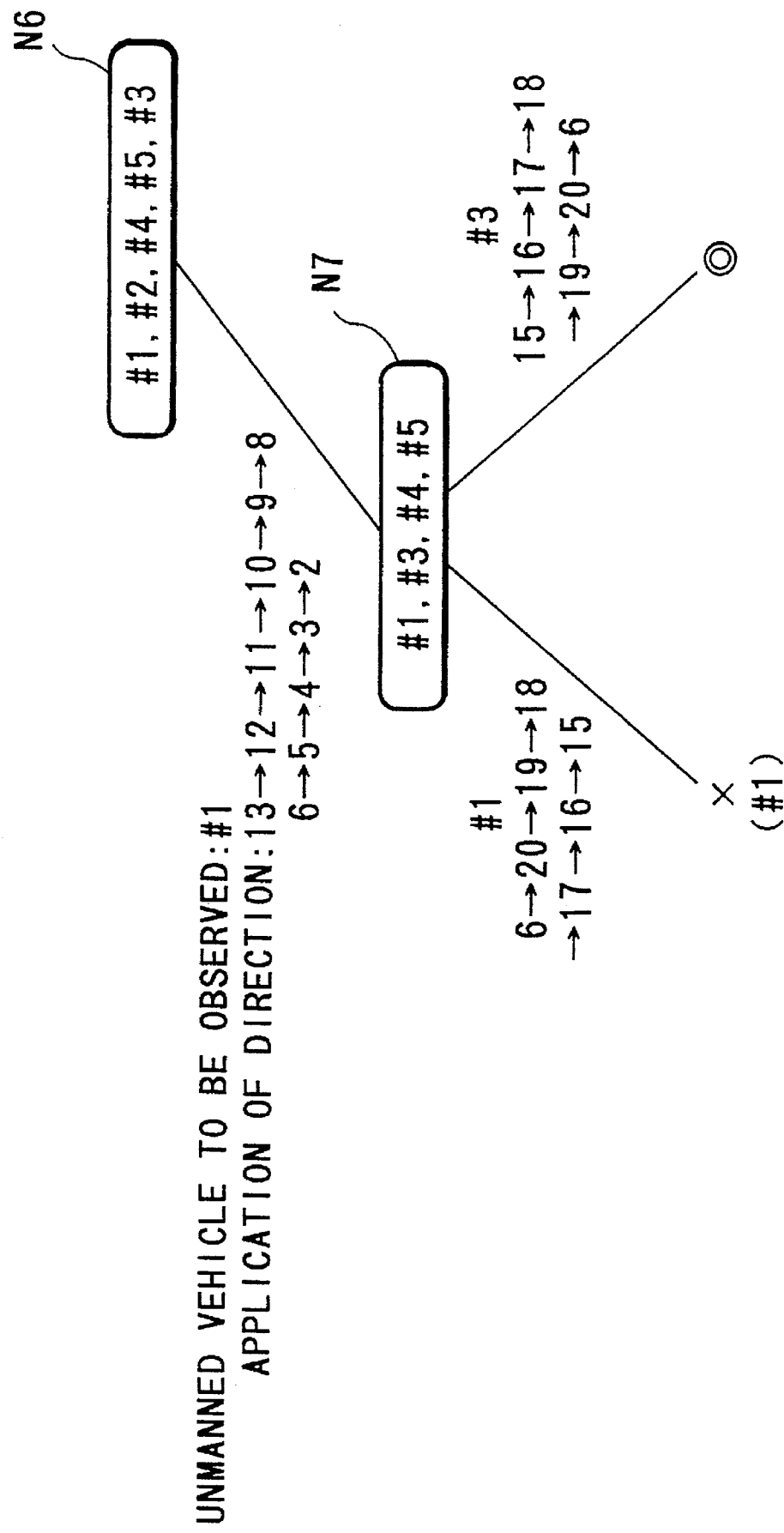
FIG. 28 shows a portion of the tree diagram showing the second example of the operation.

Here, processing which is identical to operational example 1 is conducted, and first, initial routes such as those shown in FIG. 25 are determined. Based on these, the cost estimate is conducted, a conflicted unmanned carrier vehicle set (#1, #2, #4, #5, #3) is created, and this conflicted unmanned carrier vehicle set is established in the root branching point N6 of the tree shown in FIG. 28. Next, the unmanned carrier vehicle #1, which is at the lead end of this conflicted unmanned carrier vehicle set, is made the unmanned carrier vehicle to be observed, directional application (nodes 13≧12≧11≧10≧9≧8, and nodes 6≧5≧4≧3≧2) is conducted, and after this, the traveling routes are predetermined. Here, an unmanned carrier vehicle which travels in the opposite direction is present between nodes 8 and 7 and nodes 7 and 6; however, for the reasons stated above, theses are not included in the opposite direction intervals.

Figure 26:
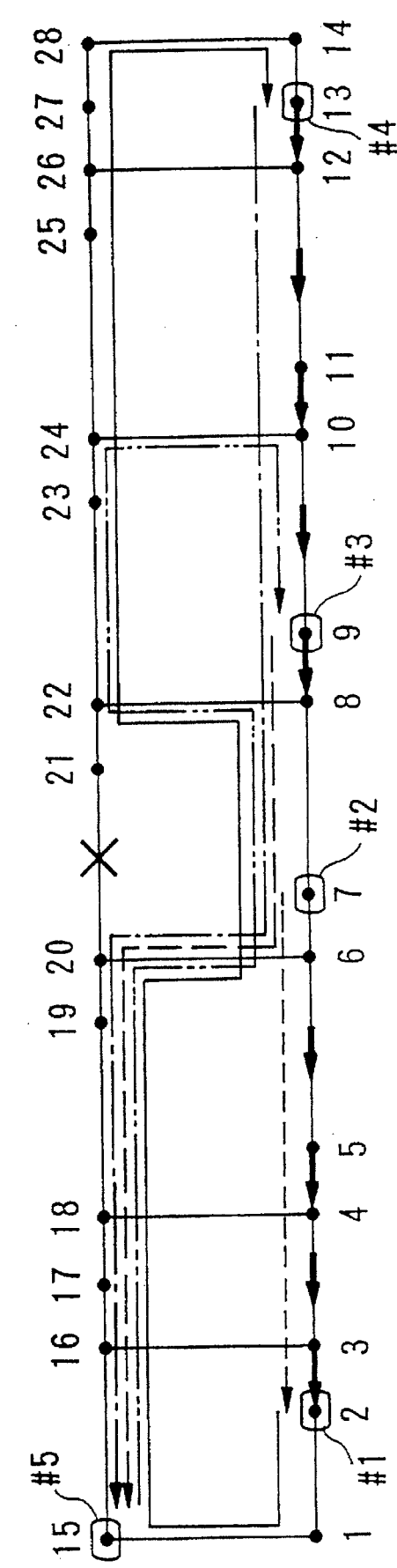
Figure 27:
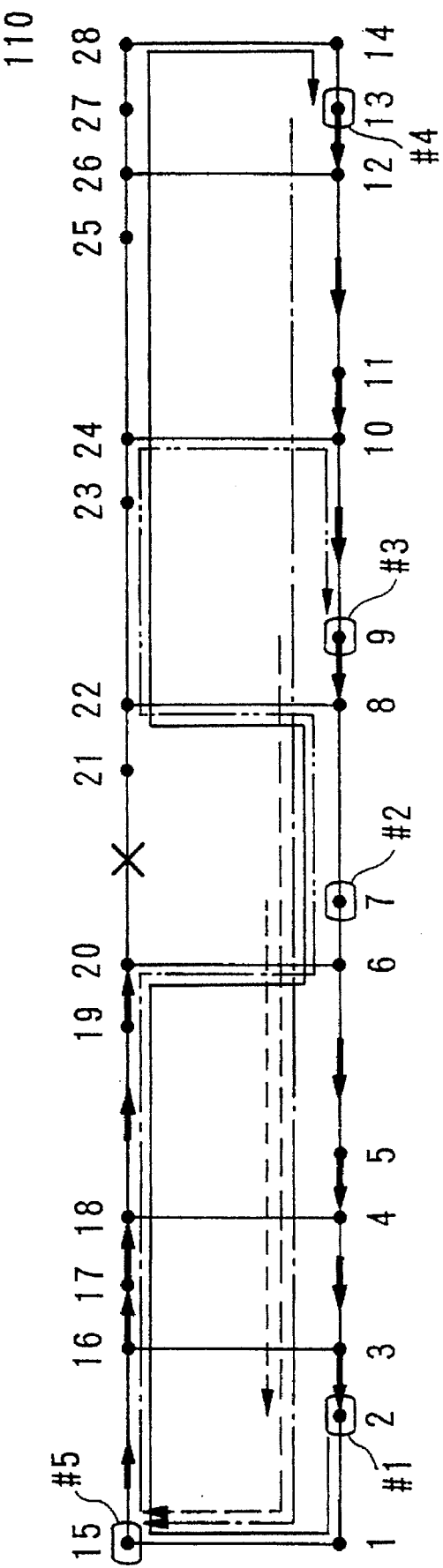

As a result of this route search, the routes shown in FIG. 26 are obtained, and thereupon, the costs in these travel grid are accumulated, a conflicted unmanned carrier vehicle set (#1, #3, #4, #5) is created, and this conflicted unmanned carrier vehicle set is established in the subsidiary branching point N7 of branching point N6. Next, the unmanned carrier vehicle #1 is selected as the unmanned carrier vehicle to be observed, directional application (nodes 6≧20≧19≧18≧17≧16≧15) is conducted, and this is appended to the previous directional application. However, in this directional restriction, the route for unmanned carrier vehicle #1 becomes unobtainable, so that the previous directional application is canceled, and the following unmanned carrier vehicle #3 in the conflicted unmanned carrier vehicle set in branching point N7 is selected as the unmanned carrier vehicle to be observed. After the conducting of directional application by means of the route of this unmanned carrier vehicle #3, the routes of unmanned carrier vehicles #1 through #5 are predetermined. As a result, the routes shown in FIG. 27 are obtained, and no opposite direction intervals are present in these routes, so that these become the final alignment results. Each unmanned carrier vehicle #1 through #5 conducts movement in accordance with these traveling routes.

As explained above, in accordance with this embodiment, searching and alignment is conducted so that opposite direction intervals are eliminated in the traveling routes of each unmanned carrier vehicle, so that effects are obtained whereby wasted motion and waiting are minimized, and the movement efficiency of the unmanned carrier vehicles is improved.

As explained above, in accordance with this embodiment, no opposite direction intervals are present in the travel grid of a plurality of unmanned carrier vehicles, and furthermore, searching is conducted so as to greatly reduce costs, so that it is possible to obtain travel grid for unmanned carrier vehicles having a minimized amount of wasted motion or waiting, and accordingly, an effect is achieved whereby it is possible to improve the movement efficiency of the unmanned carrier vehicles.

C: Operational planning portion 108

Operational planning portion 108 periodically examines the movement of each unmanned vehicle based on the standard routing supplied from route planning portion 109, and plans the movement operations up until the target node for all of the unmanned vehicles, adjusting the movement sequence and changing or adding routes as necessary, in addition, this planning is performed by means of simulation using a Petri net. Before describing the operational planning procedure performed by operational planning portion 108, the Petri net and various processes involved in the operational planning will be described using concrete examples.

(1) Petri net

FIG. 29 is a transport diagram for use in describing the aforementioned Petri net. In this figure, unmanned vehicles #1 and #2 are in standby states on nodes 2 and 6, respectively, of travel grid 111. In addition, FIG. 30 shows the departure node and target node of each unmanned vehicle #1 and #2: the movement time between nodes (seconds) is shown in []. In other words, unmanned vehicle #1 moves in order from node 2 to node 3 and to node 4. As seen from the figure, the movement times between nodes 2 to 3 and nodes 3 to 4 are 1 second and 3 seconds, respectively. In addition, the same applies for unmanned vehicle #2.

FIG. 31 uses a Petri net to describe the aforementioned transport diagram shown in FIG. 29, in this figure, presses P1 to P8 are provided which represent the occupancy states of each node 1 to 8 on travel grid 111. In addition, with regard to these presses P1 to P8, the state in which an unmanned vehicle is present on a corresponding is denoted by a black token (circle) inside the circular marker; on the other hand, a state in which a node is not reserved is denoted by a white token (circle). In the initial state, unmanned vehicles #1 and #2 are present on nodes 2 and 6, respectively, hence both presses P2 and P6 possess a black token.

In addition, transitions T12, T23, . . . , indicate the movement state of an unmanned vehicle. An input arc, into which these transitions enter, and an output arc, from which these transitions exit, are attached respectively to each transition: two adjacent presses are linked by means of these arcs. For example, the transition of input node 5 and output node 6 is represented by transition T56, while the transition corresponding to a move from node 6 to node 5 is represented by transition T65. Additionally, when moving from node 5 to node 6, transition T56 is ignited, thereby indicating that an unmanned vehicle is in a state of movement. Furthermore, when a transition is ignited once, this ignition lasts for an effective time period based on the movement time of the corresponding arc.

In addition, the lining up of transitions by ignition order on the route over which movement is to occur, is referred to as "ignition projected transition series": in the case of the standard routing shown in FIG. 30, the ignition projected transition series of unmanned vehicles #1 and #2 are as follows:

Ignition projected transition series (unmanned vehicle #1) = {T23, T34}

Ignition projected transition series (unmanned vehicle #1) =

{T67, T73, T34}

In the following, a description will be provided with regard to the ignition of transition Tst.

{1} Ignitable conditions

Transition Tst is ignitable in the case when a black token is present on input side press Ps, a black token is not present on output side Pt, and all preceding transitions are ignited (to be explained hereafter).

{2} Ignition Procedure

When an ignitable transition Tst is ignited, the movement time from node Ns to node Nt is added to the present time, and this transition number and completion time of the unmanned vehicle are set. In addition, when operations are conducted using node Nt, the operational time is further added to the completion time. A white token is then placed on output press Pt.

{3} Ignition Completion Procedure

During ignition, a black token and white token are respectively removed from input side press Ps and output side press Pt of transition Tst, and a black token is then placed on press Pt.

Furthermore, under the aforementioned ignitable conditions, when an unmanned vehicle passes over a single line interval (i.e., an interval without a detour route), the translations are packaged, and then examined together for ignitability. For example, in the case when the ignition projected transition series is {T1, T2, ... Tn}, and among these transitions Ti, Ti+1, ... , Tj form a single line interval, transition Ti−1 can only be ignited in the case when all of transitions Ti, ... Tj are ignitable. The purpose of this operation is so that the exits of other unmanned vehicles present in the single line interval are not closed by means of the ignition of transition Ti−1.

(2) Planning of the Relief Operation

In the case when another unmanned vehicle in a standby state exists after the unmanned vehicle in motion has reached its movement destination, the relief operations serve to move this unmanned vehicle in a standby state to another node. In the following, the flowchart shown in FIG. 32 of a relief route search procedure for finding this relief route will be explained.

When the relief operations begin, in step Sa2, an examination of the surrounding nodes is performed, and all nodes to which the relief operation can be performed are searched. Potential relief nodes satisfy the following conditions:

{1} Movement to the node is not prohibited

{2} Node must not be occupied by an unmanned vehicle which is not in a standby state Subsequently, in step Sa3, the basic costs, such as the movement time and the like with regard to this potential relief node are then calculated. However, nodes which are occupied by an unmanned vehicle which are in a standby state are not selected, if possible. e.g. the costs of such nodes are multiplied by 100.

In step Sa4, the node with the smallest cost from step Sa3 is selected as the relief node, and the interval from the present node to the relief node is added to the travel route of the unmanned vehicle.

Figure 33:
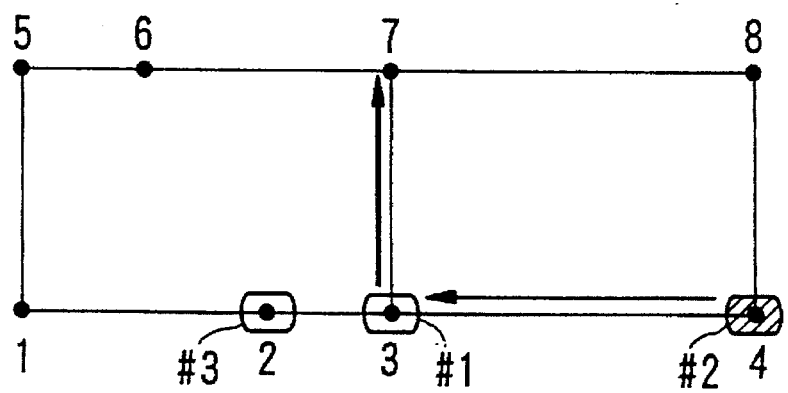
FIG. 33 is a transport diagram of an example of the operations of the relief route search procedure.

FIG. 33 is a transport diagram showing an example of the aforementioned relief route search. In this figure, unmanned vehicles #1 and #3 are both in a standby state (no movement projected), and unmanned vehicle #2 is en route towards node 3. In this case, unmanned vehicle #1 obstructing the route of unmanned vehicle #2, and thus must undergo relief operations. Potential relief nodes include nodes 2 and 7, hence the relief route costs to both of these nodes are examined. The movement time to node 2 is 1 second, however, since unmanned vehicle #3 is in a standby state at node 2, the basic cost is obtained by multiplying this movement time by 100 (see above). In addition, the movement time to node 7 is 4 seconds, however, since this node is free, the basic cost is 4. In this manner, node 7, i.e. the node with the lowest cost, is selected as the relief node, and the interval from node 3 to node 7 is added to the travel route of unmanned vehicle #1.

(3) Deadlock

In the case when a plurality of unmanned vehicles are concentrated in a narrow region, and even upon performing the aforementioned relief operations, a deadlock state in which the unmanned vehicles cannot proceed along their projected routes occurs, the following processes (to be explained hereafter) are performed: ignition sequence adjustment, detour route search, and passing route search. In the following an explanation will be provided with regard to the recognition process of the deadlock state with reference to the flowchart shown in FIG. 34.

Initially, in step Sb2, an unmanned vehicle which has not yet entered the procedure mentioned hereafter is selected, and this vehicle is examined as to whether or not it is in a standby state. In the case when this vehicle is not in a standby state, the procedure moves to step Sb3; and in the case when this vehicle is in a standby state, the procedure branches off to step Sb4. In step Sb3, the closest unmanned vehicle on the travel route of the vehicle in question is identified as an obstruction, following which the procedure proceed to step Sb5. In contrast, in step Sb4, all of the unmanned vehicles in the vicinity of the unmanned vehicle in question are identified as obstructions, following which the procedure moves to step Sb5.

In step Sb5, an examination is performed as to whether or not the aforementioned procedure has been conducted on all unmanned vehicles: in the case when unprocessed unmanned vehicles still remain, the procedure return to step Sb2.

In step Sb6, an appropriate unmanned vehicle not in a standby state is selected, and a process is followed in which a second unmanned vehicle obstructing this first unmanned vehicle, a third unmanned vehicle obstructing this second unmanned vehicle, ... are recognized to form two or more loops. This process is then performed for all possible combinations.

In step Sb7, the loop containing the most unmanned vehicles from among these aforementioned loops is selected as the competitive loop. In step Sb8, when a competitive loop is not obtained in step Sb7, the present procedure ends (step Sb10) due to a deadlock recognition failure.

In step Sb9, a search is conducted with regard to each unmanned vehicle of the competitive loop for surrounding nodes to the unmanned vehicle can move, i.e., a search for nodes which are not occupied by other unmanned vehicles. The present procedure is then completed in step Sb10.

Figure 35:
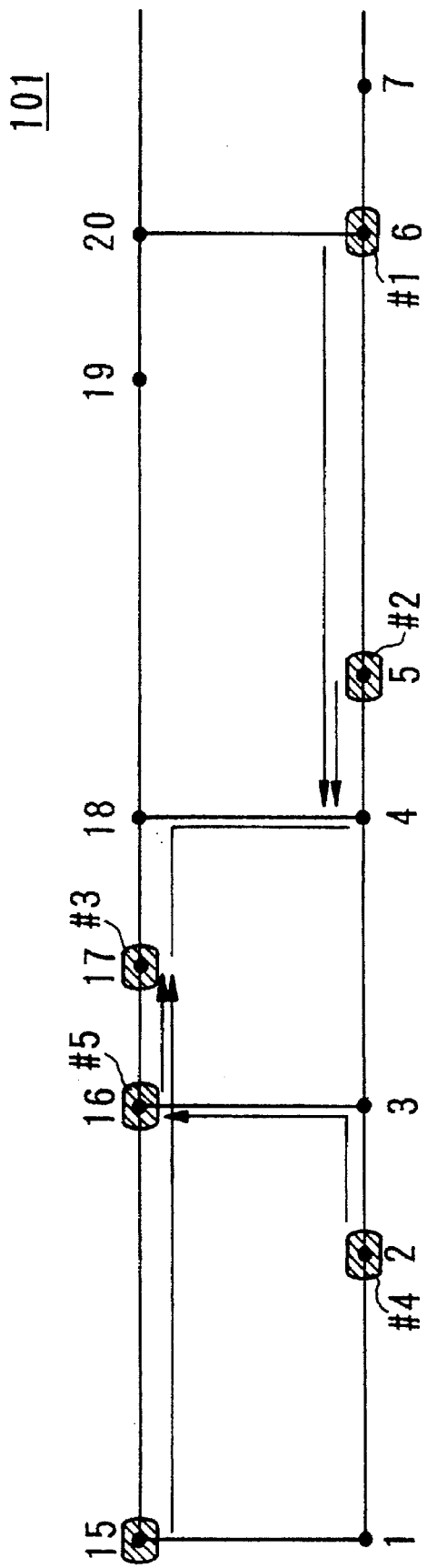
FIGS. 35 and 36 are transport diagrams showing an example of the operations in deadlock recognition procedure.
Figure 36:
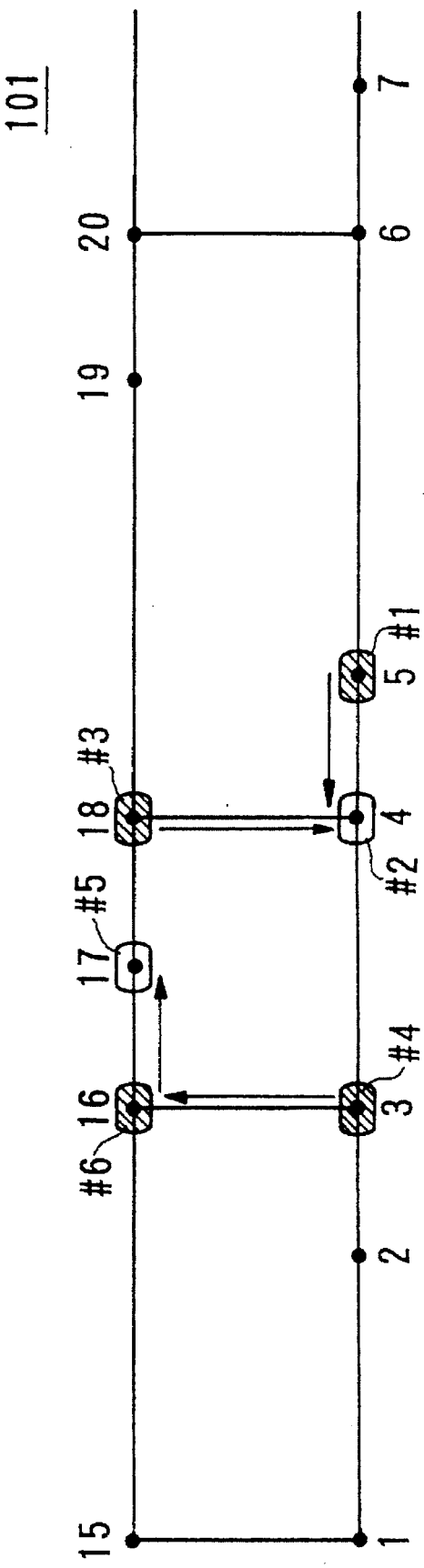

FIGS. 35 and 36 show an example of a deadlock situation on travel grid 101: FIG. 35 is a transport diagram showing the initial state; and FIG. 36 is a transport diagram showing a deadlock state. In addition, in these figures, unmanned vehicles which are not in a standby state are shown covered by crosshatches, while those unmanned vehicles in a standby state are shown within a white enclosure. The travel routes of unmanned vehicles #1 to #6 are as follows:

unmanned vehicle #1:6≧5≧4
unmanned vehicle #2:5≧4
unmanned vehicle #3:17≧18≧4
unmanned vehicle #4:2≧3≧16
unmanned vehicle #5:16≧17
unmanned vehicle #6:15≧16≧17

When unmanned vehicles #1 to #6 move only one interval from their initial routing shown in FIG. 35, a deadlock state as shown in FIG. 36 occurs. At this point, unmanned vehicles #2 and #5 are both in standby states, however, it is not possible to find a relief route as described in the aforementioned. An examination is then conducted on the obstructive unmanned vehicles with regard to each of unmanned vehicles #1 to #6; these results are shown in FIG. 37. In this Figure, for example, unmanned vehicle #2 is considered an obstruction to unmanned vehicle #1, and node 6 is recognized as a potential relief node to which unmanned vehicle #1 can move during deadlock. Based on this result, the following four loops of unmanned vehicles which are current obstructions or potential obstructions are then obtained:

Loop 1: unmanned vehicle #1 (5)≧#2 (4)≧#1
Loop 2: unmanned vehicle #3 (18)≧#2 (4)≧#3
Loop 3: unmanned vehicle #6 (16) =>#5 (17)=>#6
Loop 4: unmanned vehicle #3 (18)≧#2 (4)≧#4(3)≧#6 (16)≧#5(17)≧#3

As seen above, loop 4 contains the most unmanned vehicles, and is thus selected as the competitive loop. Furthermore, in the aforementioned, ( ) contains the current position (node) of each unmanned vehicle during deadlock.

(4) Ignition sequence adjustment

Figure 38:
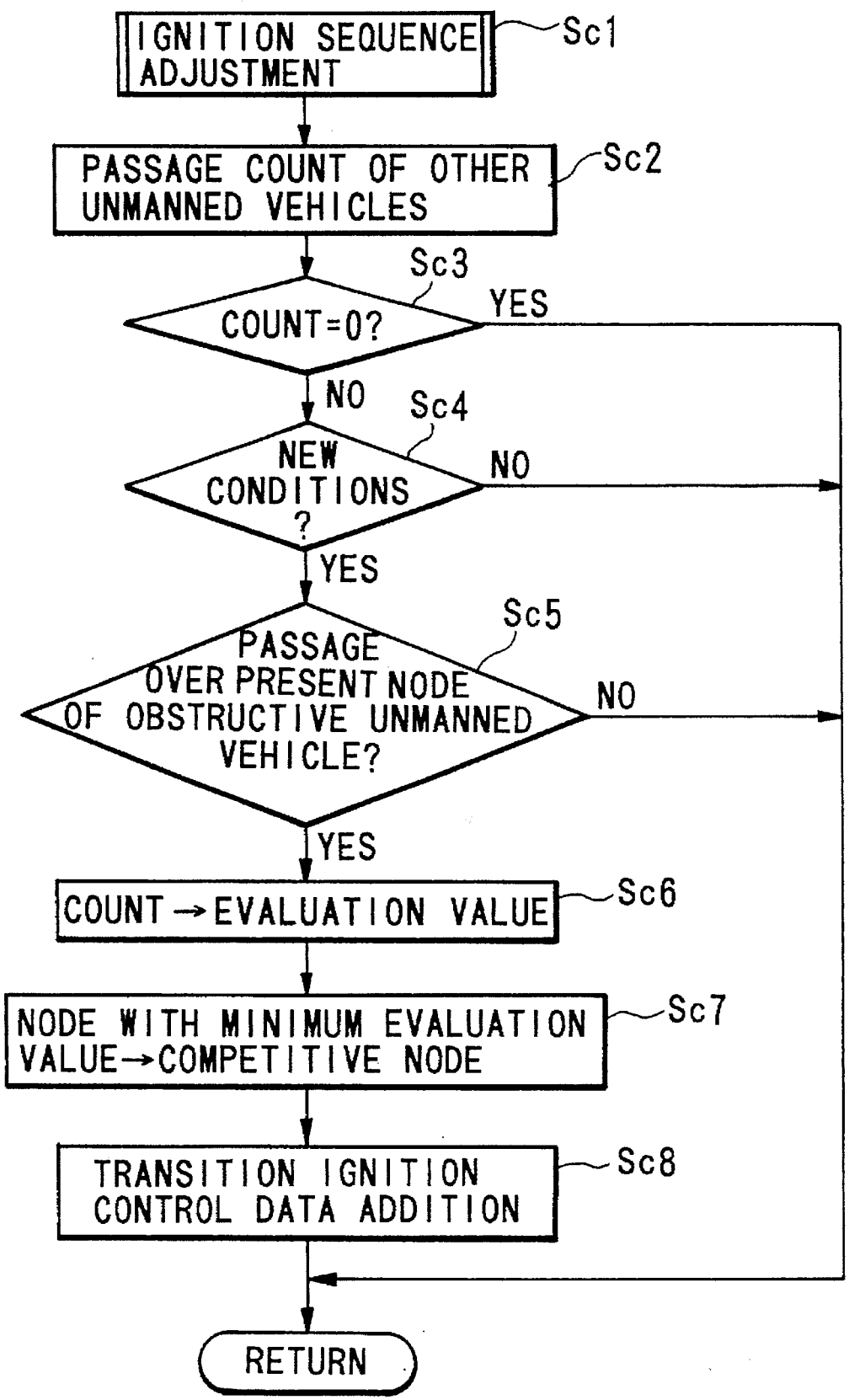
FIG. 38 is a flow chart showing the ignition sequence adjusting procedure of operational planning portion 108.

In the case of the aforementioned deadlock situation, an attempt to solve this situation is first performed by means of adjusting the ignition sequence of the transitions. In other words, a test is conducted as to whether or not the deadlock state can be escaped by means of changing the reservation sequence of the nodes. In the following, an explanation with regard to this ignition sequence adjusting procedure will be provided with reference to the flow chart shown in FIG. 38.

Initially, in step Sc2, the number of unmanned vehicles to pass through the current nodes of the non-standby unmanned vehicles belonging to the competitive group are counted. In step Sc3, an examination is conducted as to whether or not this aforementioned passage count is "0"; in the case when this count is "0", the present procedure ends (step Sc9); and in the case when this count is not "0", the procedure moves to subsequent Sc4.

In Sc4, an examination is conducted as to whether or not the passage number of each node is different from that at the time of the previous ignition sequence adjusting procedure; in the case when a new state is detected, the procedure moves to step Sc5; and in the case when the status remains unchanged, the present procedure ends (Sc9). This step is inserted in order so that when the states become complex, the procedure eventually returns to the original state even after changing the ignition sequence a number of times.

In step Sc5, an examination is performed as to whether or not the unmanned vehicle will pass through the current node of an unmanned vehicle which is obstructing it; in the case when there is no passage, the procedure moves to Sc6; and in the case when there is passage, the procedure ends (step Sc9). In the case when unmanned vehicles pass over the same interval, subsequent unmanned vehicles cannot progress forward; thus, this step is for the purpose of checking their meeting point (node).

In step Sc6, an evaluation value is assigned to the passage number resulting from step Sc2. At the time when a particular unmanned vehicle is being blocked by another unmanned vehicle in a standby state, this evaluation value is brought forth. In addition, the procedure comprising the aforementioned steps Sc2 to Sc6 is conducted on all nodes which are occupied by non-standby unmanned vehicles contained in the competitive loop.

In step Sc7, the node with the minimum evaluation value from among the nodes searched in step Sc6 is selected as the competitive node. In step Sc8, data designating the initial passage of the unmanned vehicle which would potentially block the unmanned vehicle occupying the competitive node is added to the transition ignition control data. This transition ignition control data regulates the movement sequence of an unmanned vehicle at a specific node, and hence, the transition ignition is regulated by means of this data.

In the following, the above-described ignition sequence adjusting procedure will be further explained using the transport diagrams shown in FIGS. 35 and 36. Initially, the passage numbers of nodes 18, 3, and 16 (FIG. 36) which are occupied by non-standby unmanned vehicles #3, #4, and #6 of the competitive loop are calculated, respectively. As a result, node 16 registered one passage, while the other nodes registers zero passages, thus in this case, node 16 is chosen as the competitive node. Transitions T15.16 and T3.16 are both transitions which possess node 16 as the output destination; consequently, their ignition sequences are reversed.

In other words, transition T3.16 is designated as the lead transition, and is accordingly ignited before T15.16. In this manner, before moving unmanned vehicle #6 to node 16, unmanned vehicle #4 is moved to node 16, thereby opening node 3 and allowing the relief of standby unmanned vehicle #2 to node 3. Consequently, there are cases in which the deadlock state can be solved by means of adjusting the ignition sequence of the transactions.

FIGS. 39 and 40 show the final result of this aforementioned concrete example; FIG. 39 shows the routes of unmanned vehicles #1 to #6 from departure node to target node; and FIG. 40 shows the node reservation sequence. In FIG. 39, the target node is shown in ( ), and any route appearing after this node serves as the aforementioned relief route. In addition, the node reservation sequence shown in FIG. 40 indicates the sequence in which an unmanned vehicle reserves each node; for example, in this Figure, node 5 is reserved in order, first by unmanned vehicle #2 and then by unmanned vehicle #1.

(5) Planning of the detour operation

Figure 41:
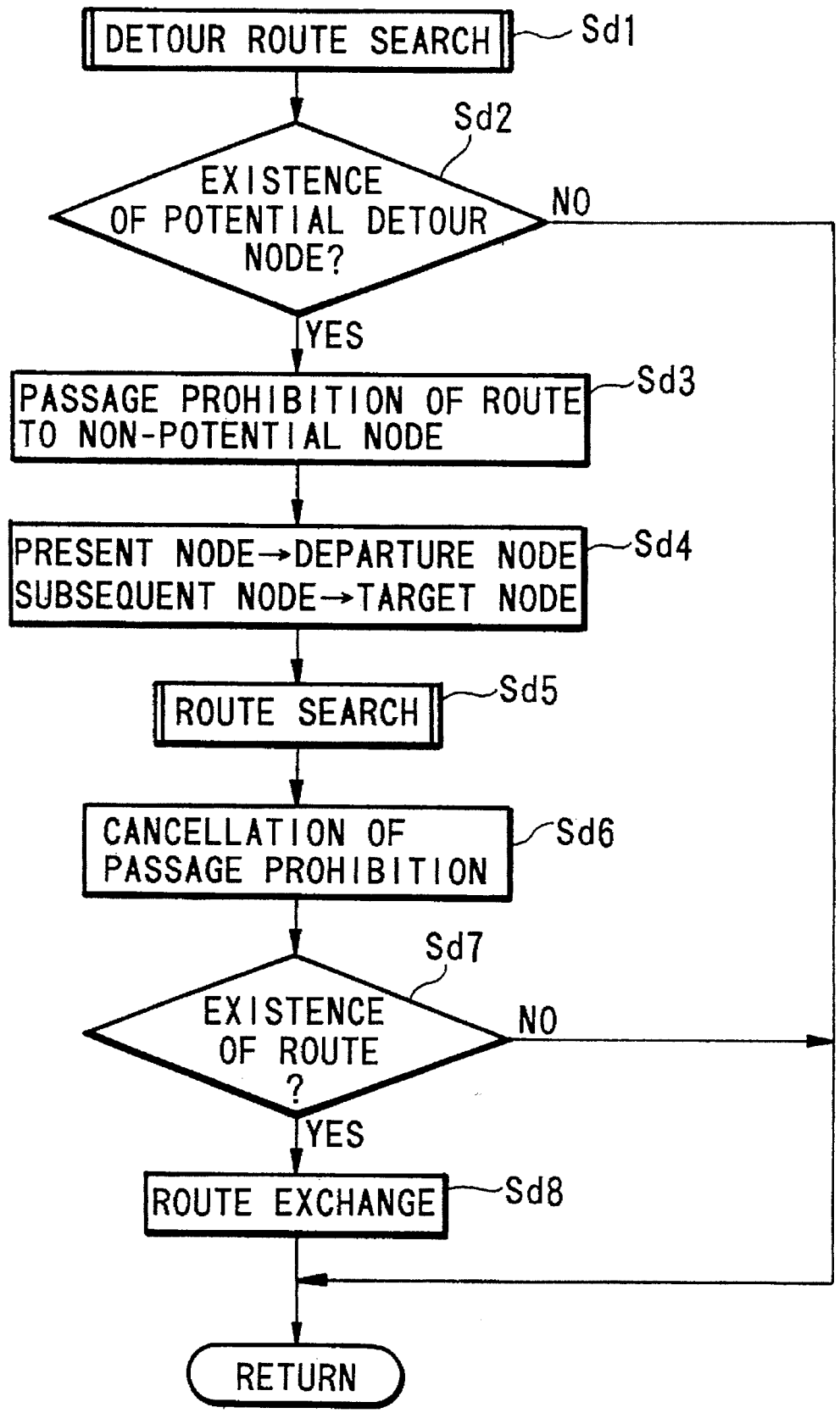
FIG. 41 is a flow chart showing a detour route search procedure of operational planning portion 108.

In the case when the deadlock situation cannot be solved in accordance with the standard routing, planning of a detour route for an appropriate unmanned vehicle is performed. This detour route search procedure will be explained in the following with reference to the flow chart shown in FIG. 41.

Initially, in step Sd2, an examination is conducted as to whether or not a potential detour node (movable neighboring node) exists with regard to a standby unmanned vehicle belonging to the competitive group. In the case when a potential detour node exists, the procedure moves to step Sd3; and in the case when this type of node does not exist, the present procedure ends due to a detour route search failure (step Sd9).

In step Sd3, passage over the following arcs is temporarily prohibited with regard to the unmanned vehicle selected in the previous step.

1. The arc from the present node to the subsequent node of the unmanned vehicle.
2. The arc in the direction from the present node through which movement is not possible.

In step Sd4, the present node is designated as the departure node, and the subsequent node is designated as the target node. In step Sd5, a route-search procedure is conducted based on the designations of steps Sd3 and 4 (step Sa1). In step Sd6, passage prohibition (no passage) of the arcs conducted in step Sd3 is canceled.

In step Sd7, an examination is conducted as to whether or not a detour route has been found in the route search procedure of step Sd5; in the case when a detour route exists, the procedure moves to the subsequent step Sd8; and in the case when a detour route does not exist, the present procedure ends due to a detour route search failure (Sd9).

In step Sd8, the route of the interval in question is exchanged for the detour route, and the present procedure is then completed (step Sd9).

Figure 42:
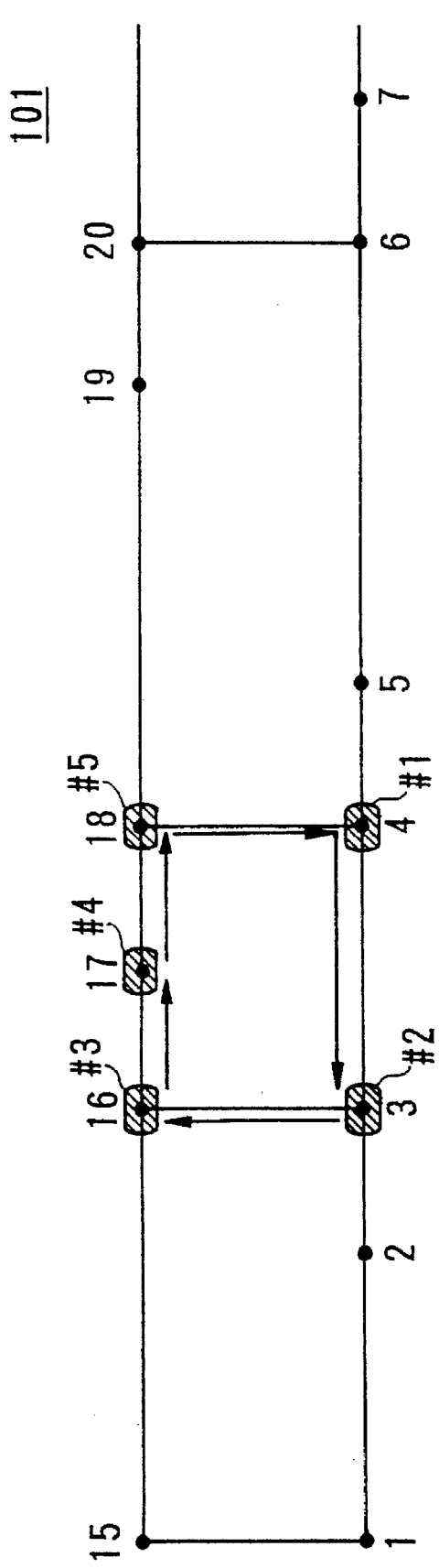
FIGS. 42 and 43 are transport diagrams showing an example of the operations of detour route search procedure.

FIG. 42 is a transport diagram showing another example of a deadlock situation. Based on this figure, the aforementioned detour route search procedure will be explained in the following.

Initially, when unmanned vehicle #1 is chosen, the arcs from node 4 f 3 and node 4 f 18 are designated as "no passage", and a search is conducted for a detour route. In this case, the route of node $5 \geq 6 \geq 20 \geq 19 \geq 18 \geq 17 \geq \ldots$ can be considered as a detour route for unmanned vehicle #1; however, since the arc from node $18 \geq 17$ runs opposite to the route of unmanned vehicle #4, this route is fundamentally not chosen. However, in the second operational trial, to be explained hereinafter, this aforementioned route may be selected, since passage over an inverse interval therein is not prohibited.

Figure 43:
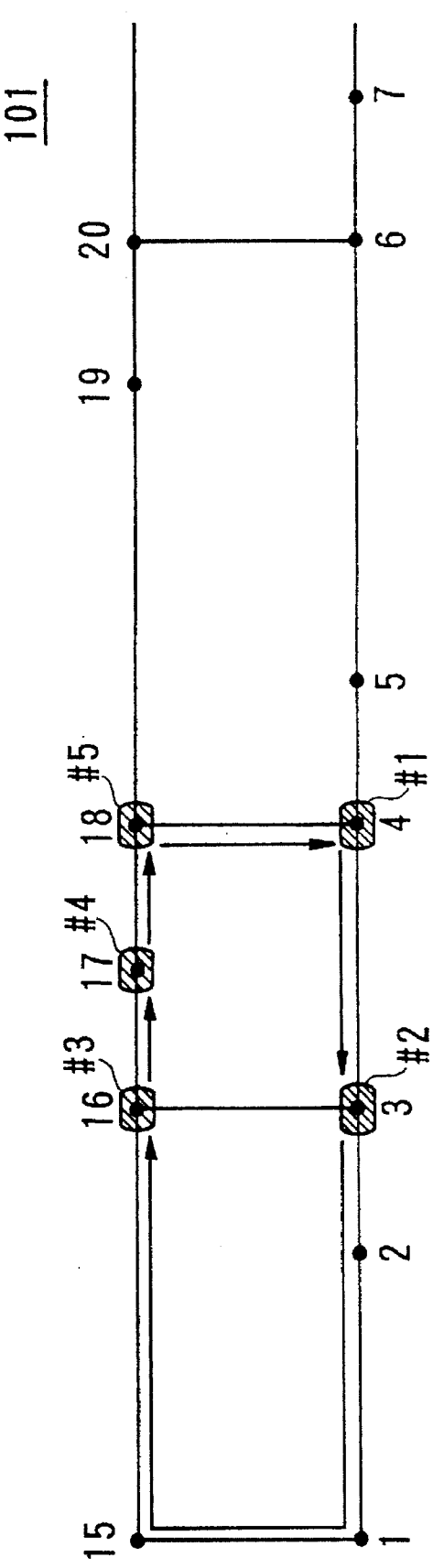

Subsequently, when conducting a detour route search using unmanned vehicle #2, a route containing node $3 \geq 2 \geq 1 \geq 15 \geq 16$ is obtained. This route then becomes the detour route, and is inserted into the route of unmanned vehicle #2 ($3 \geq 16$) as shown in FIG. 43.

(6) Planning of the passing operation

Figure 44:
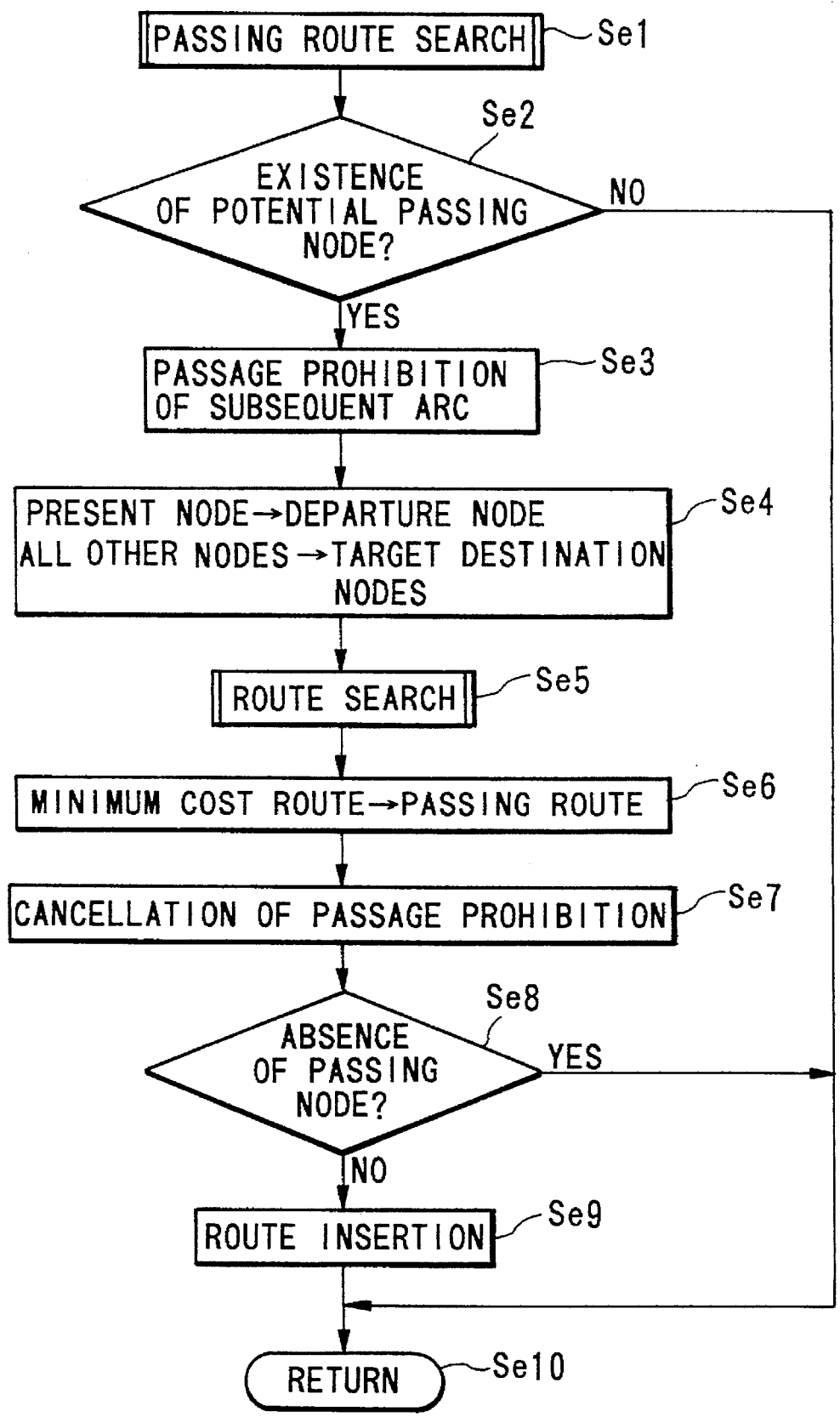
FIG. 44 is a flow chart showing a passing route search procedure of operational planning portion 108.

In the case when the deadlock situation cannot be solved by means of the aforementioned detour operations, an appropriate unmanned vehicle is re-routed to a separate node (passing node), and after giving the right-of-way to another unmanned vehicle, returns to its original route. The passing route search which shows these passing operations is shown in FIG. 44, and will be explained in greater detail below.

Initially, in step Se1, a search is conducted with regard to an unmanned vehicle (non-standby unmanned vehicle) belonging to the competitive loop which has not yet reached its target node, as to whether or not an neighboring node exits (potential passing node) to which it can move; in the case when this type of node exists, the procedure moves to step Se3; and in the ease when this node does not exist, the present procedure ends due to a passing route search failure (Se10).

In step Se3, passage over the are from the present node to the subsequent node of this unmanned vehicle is temporarily prohibited. In step Se4, the present node is designated as the departure node, while all other nodes are designated as target nodes.

In step Se5, under the conditions designated in steps Se3 and step Se4, the route search procedure (step Sa1) is performed. In step Se6, from among the routes obtained in step Se5, the route with the minimum cost is selected, and the target node therein is designated as the passing node. However, in the selection of a passing node, all nodes existing in a single line interval are excluded.

In step Se7, the "no-passage" designation performed in step Se3 is canceled. In step Se8, based on the result from step Se6, in the ease when a passing node does not exist, the present procedure ends due to a passing route search failure (step Se10); in the case when a passing node exists, the procedure moves on to the subsequent Se9.

In step Se9, the route from the present node to the passing node, as well as the route from the passing node back to the present node (passing route) is inserted into the present route, and the present procedure is then completed.

FIG. 45 is a transport diagram showing an example of a deadlock situation; in the following, an explanation will be provided with regard to the passing route search procedure based on this figure.

Initially, when unmanned vehicle #1 is selected, passage from node $4 \geq 3$ is temporarily prohibited, and a route search is conducted. As a result, node 5 is selected as the passing node with the minimum cost. With regard to other neighboring nodes to which unmanned vehicle #1 can move, besides node 5, node 18 is also possible; however, due to cost considerations, the node with the lower cost, i.e., node 5 is selected as the passing node (see FIG. 2). Subsequently, a search is conducted for a route from node 5 to node 4, and node $4 \geq 5 \geq 4$ is then recognized as a passing route. Finally, this passing route is inserted into the original route, and the overall route of unmanned vehicle #1 (node $4 \geq 5 \geq 4 \geq 3 \geq 2$) is then obtained as shown in FIG. 46.

(7) Operational planning

Figure 48:
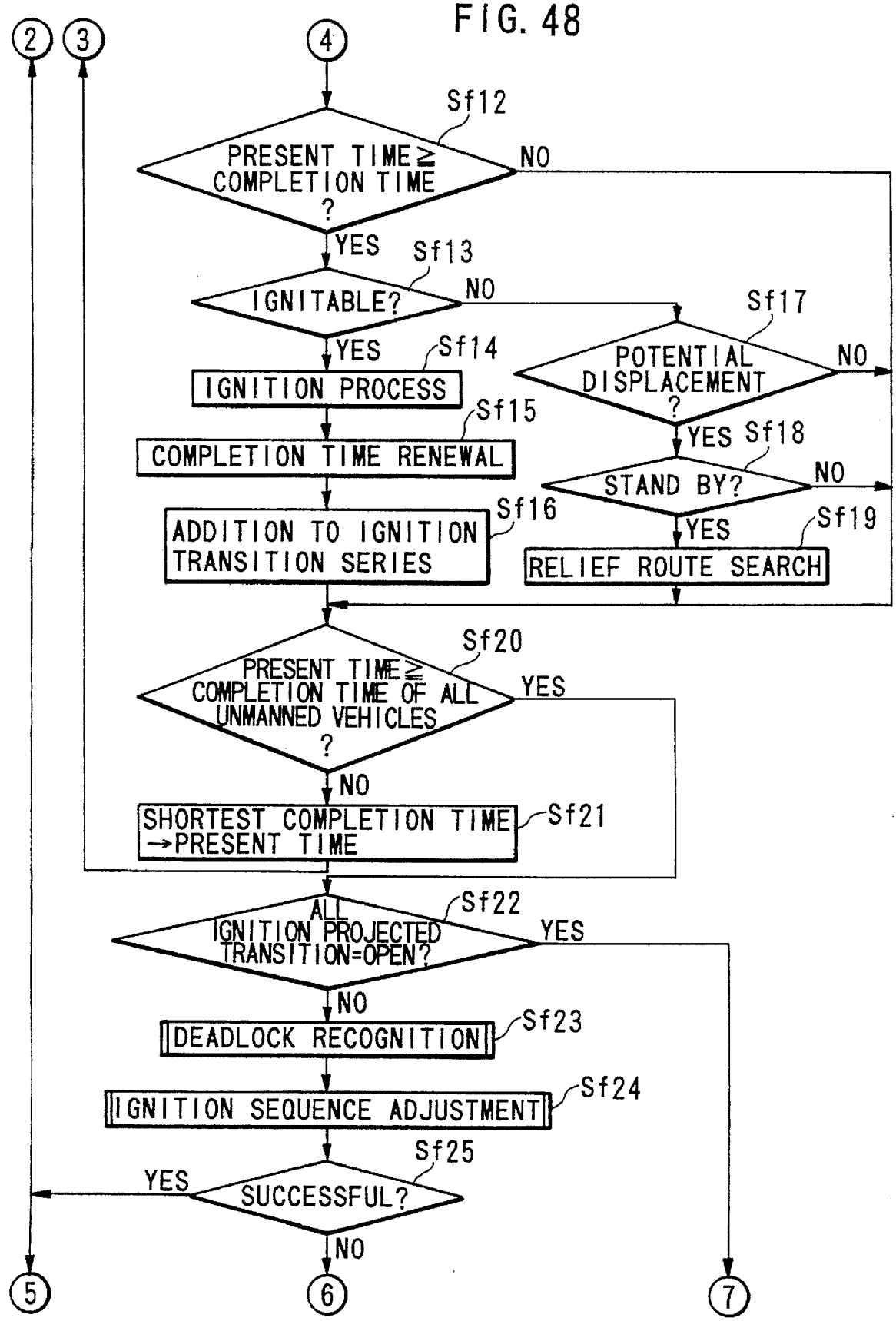
Figure 49:
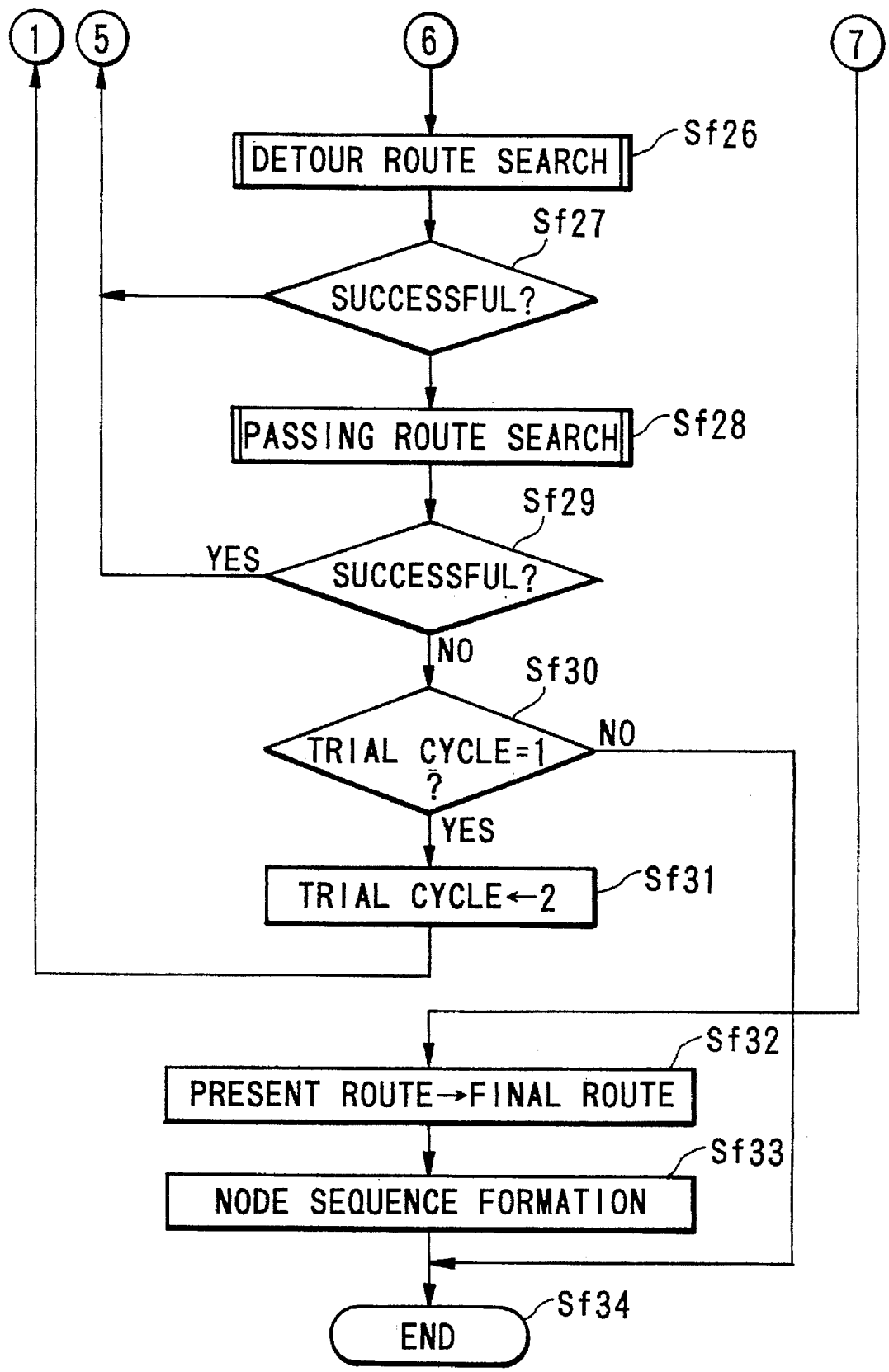

Operational planning portion 108 determines the route of all of the unmanned vehicles and also plans their movement sequences using the aforementioned procedures (1) to (6). This operational planning procedure will be explained in greater detail below based on the flow charts shown in FIGS. 47, 48, and 49.

Initially, in step Sf1 (FIG. 47), a model of the travel route is formed using a Petri net. In step Sf2, the trial cycle is set to "1".

In step Sf3, the route of each unmanned vehicle is set into the standard routing obtained by means of the route planning. In step Sf4, the trial cycle is examined; in the case when the trial cycle is "1", the procedure moves on to the subsequent step Sf5; however, when this value is a number other than "1", the procedure skips to step Sf6.

In step Sf5, passage over all arcs running opposite to the routes of the standard routing above is prohibited. In this manner, there is no generation of inverse intervals due to the subsequent procedure. In addition, the case when the procedure returns by means of loop 1, and the trial cycle turns to "2" (FIG. 49, step Sf31), step Sf5 is not executed, and the aforementioned passage prohibition is not executed in the route search procedure.

In step Sf 6, the present time is reset to "0". In step S7, the respective unmanned vehicles are placed at their respective departure points, and from the routes therein, the ignition projected transition series are calculated, respectively. In step Sf8, the completion time of each unmanned vehicle is reset to "1".

In step Sf9, the ignition transition series is opened and reset to the beginning. This ignition transition series is in actuality the series of transitions in which ignition occurs, and is not always the same as the ignition projected transition series.

In step Sf10, the completion time of each unmanned vehicle is checked against the present time; in the case when these times are equal, the procedure moves to step Sf11; however, in the case when these times differ, the procedure branches off to step Sf12.

In step Sf11, the lead transition is read out from the ignition projected transitions of all vehicles satisfying the conditions of step Sf10, and an ignition completion procedure is conducted.

In step Sf12 (FIG. 48), the completion time of each unmanned vehicle is checked with the present time: if a completion time precedes or equals the present time, the procedure moves to step Sf13; however, if the completion time follows the present time, the procedure branches off to step Sf20.

In step Sf13, an examination is performed as to whether or not the lead transition of the ignition of the ignition projected transitions is ignitable; in the case when this transition is ignitable, the procedure moves to step Sf14; however, in the case when this transition is not ignitable, the procedure branches off to step Sf17.

In Sf14, an ignition procedure is performed by reading out all transitions which are determined to be ignitable in step Sf13.

In step Sf15, the completion time is recalculated by adding the movement time of the ignited transition to the original completion time.

In step Sf16, the transitions in which the ignition procedure of Sf14 was carried out are registered (added) to each respective corresponding ignition transition series, after which the procedure moves to Sf20.

On the other hand, in step Sf17, an examination is carried out as to whether or not neighboring nodes exist to which obstructive unmanned vehicles corresponding to the non-ignitable transitions can move. In other words, an examination is conducted as to whether obstructive unmanned vehicles can be displaced to other nodes or not. When this displacement is possible the procedure moves to the subsequent step Sf18; however, when this displacement is not possible, the procedure branches off to step Sf20.

in step Sf18, the unmanned vehicles which are determined to be displaceable in step Sf17 are checked to determine whether they are in a standby state or not. In the case when a vehicle is in a standby state, the procedure moves to step Sf19; however, in the case when a vehicle is not in a standby state, the procedure branches to step Sf20.

Figure 32:
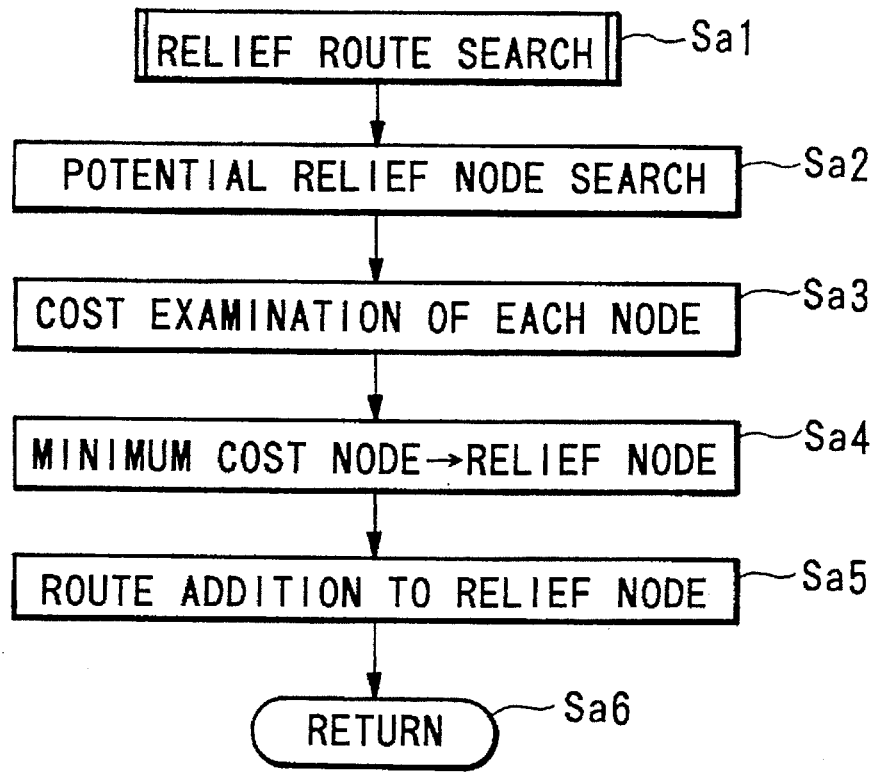
FIG. 32 is a flow chart showing a relief route search procedure of operational planning portion 108.

In step Sf19, a search for a relief route is performed with regard to an unmanned vehicle which meets both conditions of step Sf17 and step Sf18 (FIG. 32, step Sa1).

In step Sf20, an examination is conducted as to whether or not the completion times of ignition transitions corresponding to all of the unmanned vehicles precede or equal the present time; in the case when this result is "yes", the procedure branches off to step 22; and when the result of this examination is "no", the procedure moves to step Sf21.

Figure 47:
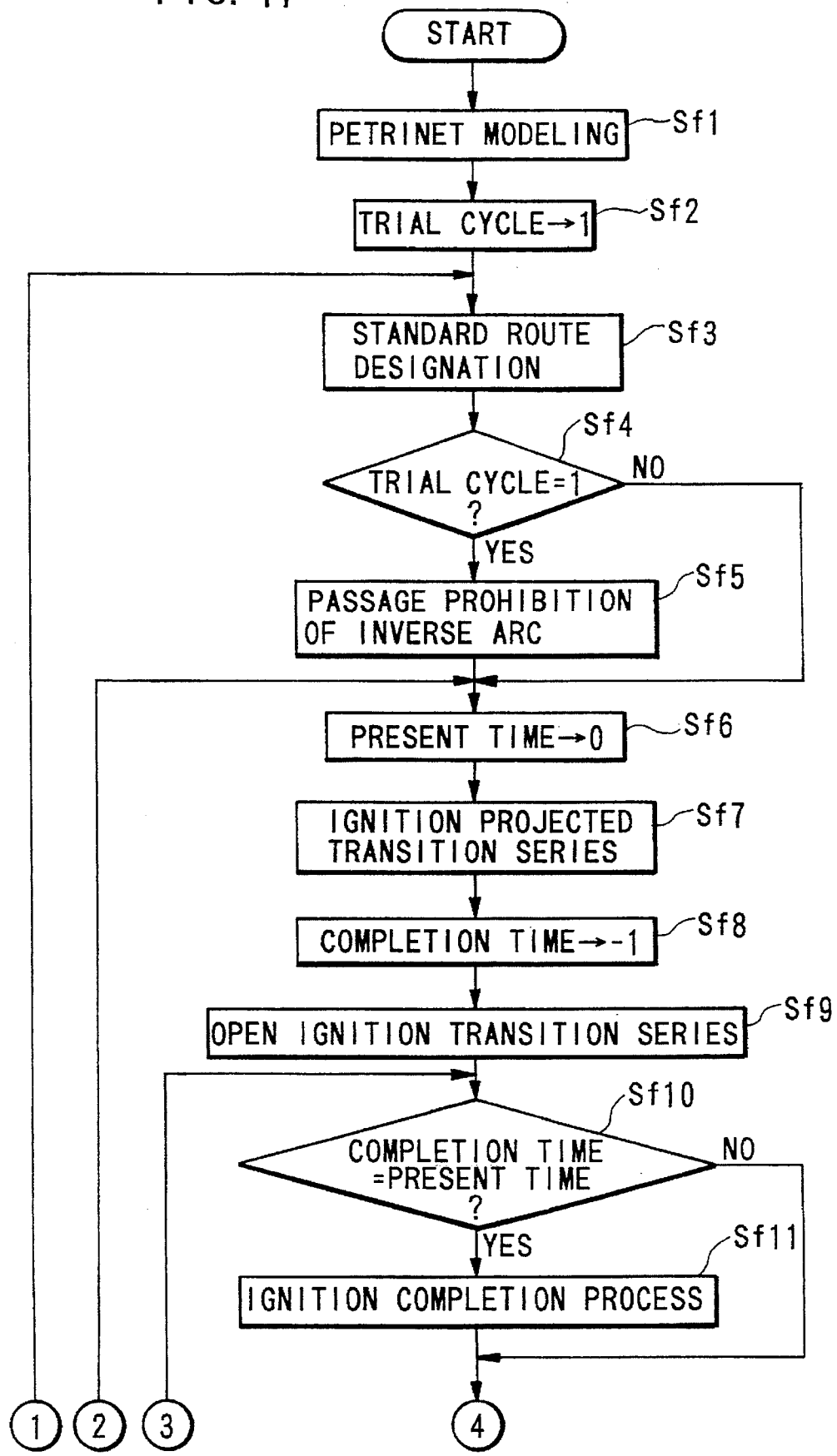
FIGS. 47 to 49 are flow charts showing an operational planning procedure (main procedure) of operational planning portion 108.

In step Sf21, the completion time of the unmanned vehicle with the closest completion time from among all unmanned vehicles is set to the present time, following which, the procedure moves to step Sf10 (FIG. 47).

In step Sf22, an examination is conducted as to whether or not the ignition projected transition series of all unmanned vehicles is open; in the case when this result is "yes", the procedure branches off to step Sf32 (FIG. 49); however, when the result of this examination is "no", the procedure moves on to the subsequent step Sf23.

Figure 34:
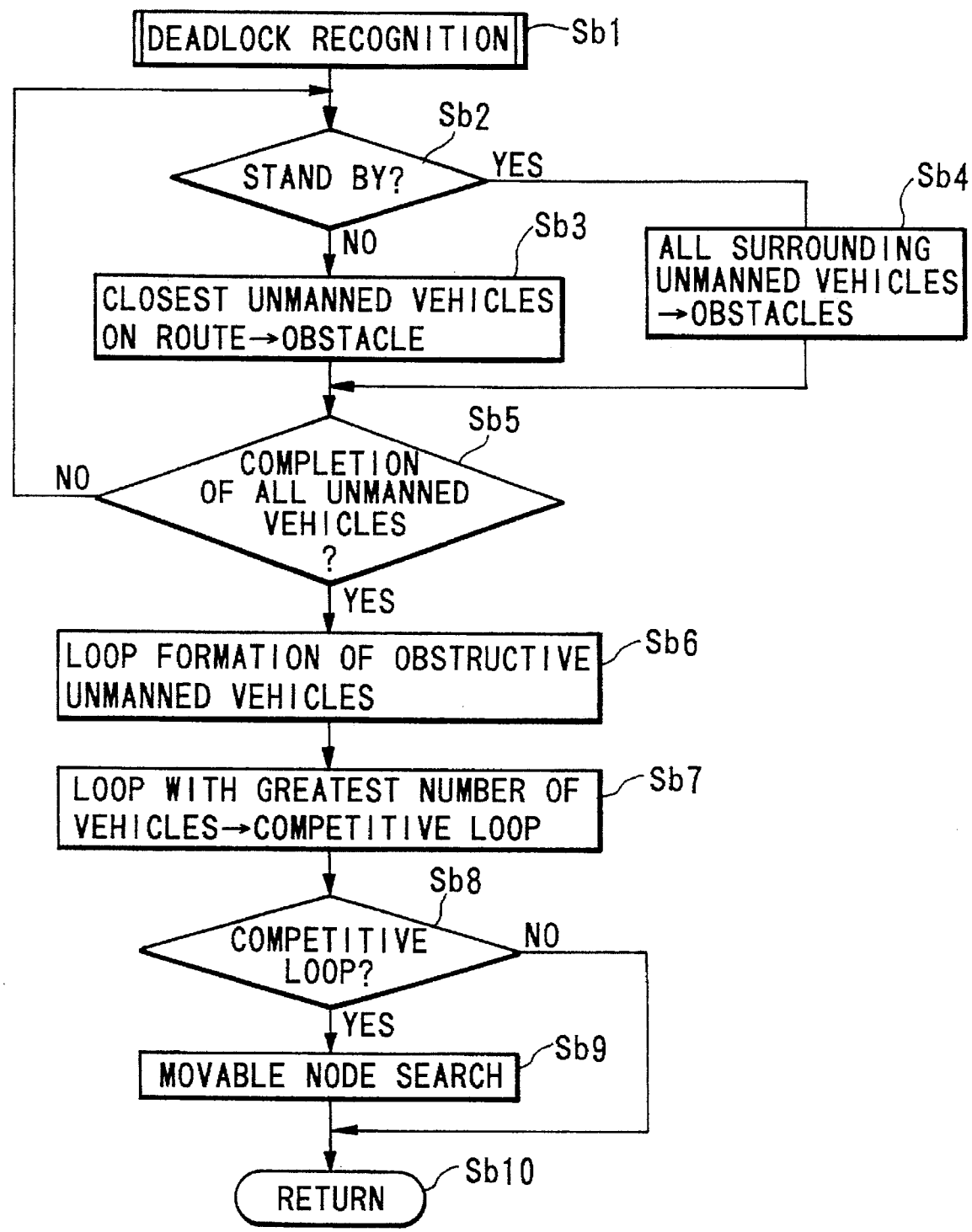
FIG. 34 is a flow chart showing a deadlock recognition procedure of operational planning portion 108.

In step Sf23, the deadlock situation is checked by means of the aforementioned deadlock recognition procedure (FIG. 34, step Sb1).

In step Sf24, the ignition sequence of each transition is adjusted by means of the aforementioned transition sequence adjusting procedure (FIG. 38, step Sc1) based on the competitive loop obtained by the procedure of step Sf23.

In step Sf25, an examination is conducted as to whether or not the adjustment of the ignition sequence conducted in step Sf24 was successful; in the case when this adjustment failed, the procedure moves to step Sf26; and in the case when this adjustment was successful, i.e., the deadlock situation was solved, the procedure returns to step Sf6 (FIG. 47).

In step Sf26, a search is conducted for a detour route according to the detour route search procedure mentioned above (FIG. 41, step Sd1).

In step Sf27, a determination is made as to whether this detour route search in the previous step was successful or not; in the case when this search failed, the procedure moves on to the subsequent step step Sf28; and in the case when this search was successful, the procedure returns to step Sf6 (FIG. 47).

In step Sf28, a search is conducted for a passing route according to the aforementioned passing route search (FIG. 44, step Se1).

In step Sf29, a determination is made as to whether this passing route search of the previous step was successful or not; in the case when this search failed, the procedure moves on to the subsequent step Sf30; and in the case when this search was successful, the procedure returns to step Sf6 (FIG. 47).

In step Sf30, the current trial cycle is examined; in the case when this cycle is "1", the procedure moves on the subsequent step Sf31; and in the case when this value is other than "1", the entire procedure is ended due to an operational planning failure (step Sf34).

In step Sf31, the trial cycle is increased to "2", following which the procedure returns to step Sf3 (FIG. 47).

Step Sf32 is executed in the case when the operational planning of the unmanned vehicle was successful; in this step, the present route is designated as the final routing of the unmanned vehicle.

In step Sf33, the ignition transition series and sequence of unmanned vehicles occupying each node (node reservation sequence) are formed, following which the entire procedure ends (step Sf34).

(8) Example of Petri net simulation procedure

In the following, a concrete example of the aforementioned Petri net simulation will be provided with regard to the conditions set in FIGS. 18 and 19. Furthermore, FIGS. 50 to 56 are Petri net diagrams showing this type of simulation.

Figure 50:
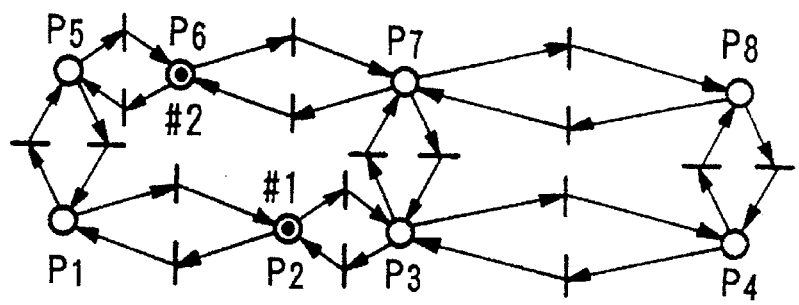
FIGS. 50 to 56 are Petri net diagrams showing an operational example of operational planning portion 108.

In the initial state shown in FIG. 50, transitions T23 and T67 corresponding to unmanned vehicles #1 and #2, respectively, are ignited by means of the ignition procedure described above (step Sf14). The completion times of the aforementioned transitions are 1 and 2 seconds, respectively; and a white token is placed on each of presses P3 and P4.

Figure 51:
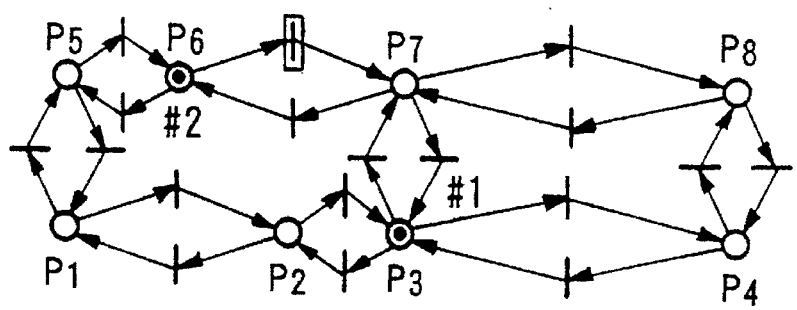
Figure 52:
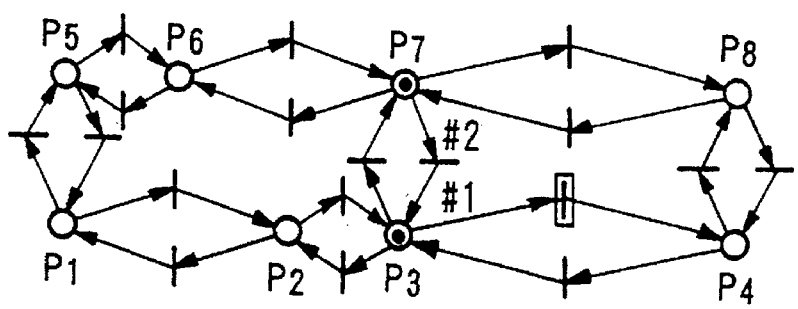

Subsequently, in step Sf21, the present time is renewed to 1 second, i.e., the completion time of unmanned vehicle #1, and the procedure then returns to step Sf10. A black token and a white token are then removed from presses P2 and P3, respectively, by means of the ignition completion procedure of step Sf11, following which a black token appears on press P3 as shown in FIG. 51. This state indicates that unmanned vehicle #1 has reached node 3. At this point, transition T67, which is currently in a state of ignition, takes the form of a rectangle.

Subsequently, transition T34, corresponding to unmanned vehicle #1 is ignited in step Sf14, following which the completion time of unmanned vehicle #1 is set to 4 seconds by means of step Sf15. Subsequently, in step Sf21, the present time is renewed to 3 seconds, i.e., the completion time of unmanned vehicle #2, and the procedure then returns to step Sf11, passing en route through step Sf10, at which point an ignition completion procedure is performed on transition T67.

In step Sf13, transition T73 of unmanned vehicle #2 is examined; however, due to the presence of a black token on press P3 of the output destination, this transition cannot be ignited. This is a result of unmanned vehicle #1 occupying node 3. Unmanned vehicle #1 is currently en route from present node 3 to node 4, and thus cannot be displaced. As a result, unmanned vehicle #2 must wait at node 7, and in step Sf21, the present time is renewed to 4 seconds, i.e., the completion time of unmanned vehicle #1.

Figure 53:
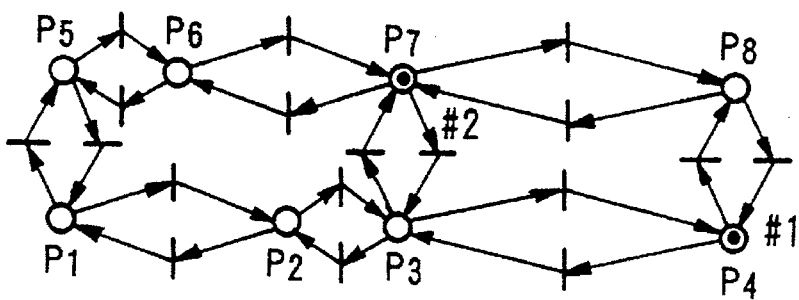
Figure 54:
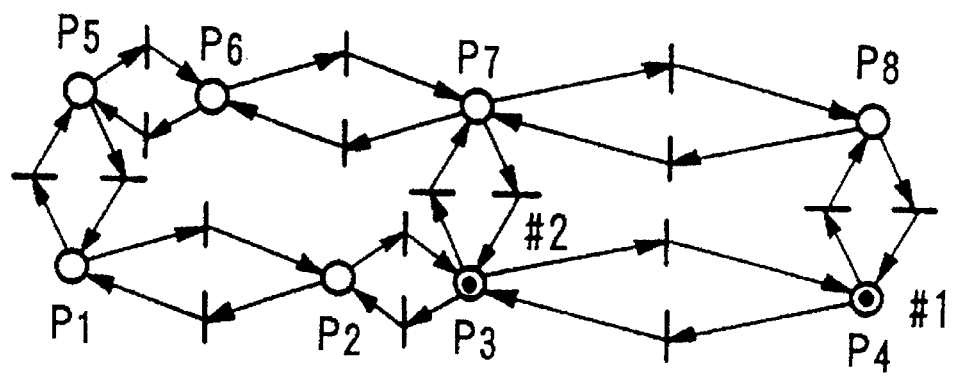
Figure 55:
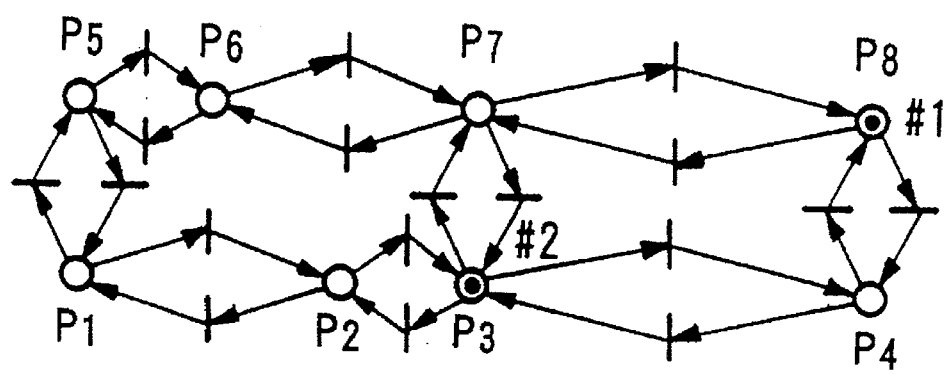

In step Sf14, after transition T34 is ignited, unmanned vehicle #1 arrives at target node 4. Subsequently, unmanned vehicle #1 releases node 3, thus allowing the ignition of transition T73 in step Sf14 as shown in FIG. 53.

At the time point where the ignition of transition T73 is completed (FIG. 54), an attempt is made to ignite the last transition T34 according to step Sf14; however, since the aforementioned ignition is not possible, an attempt is made to displace unmanned vehicle #1.

In step Sf19, a relief route for unmanned vehicle #1 (node 4≧8) is found by means of the above-described relief route search procedure, and the corresponding transition T48 is added to the transition to be ignited, and then ignited.

Figure 56:
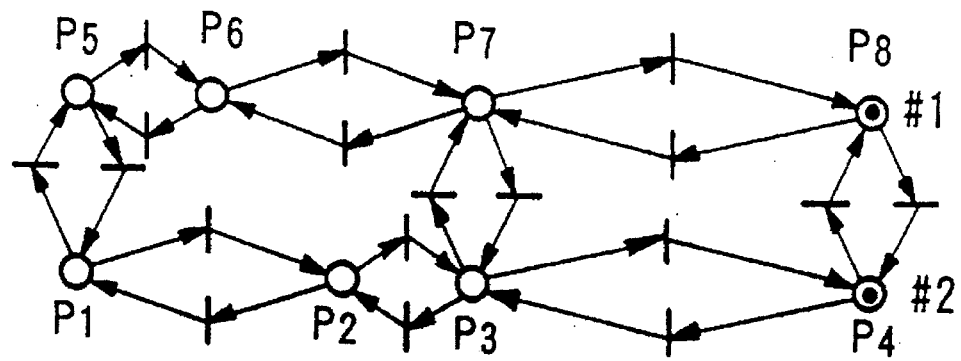

Subsequently, the simulation proceeds by the same procedure, and when the simulation reaches the state shown in FIG. 56, the transition which should have been ignited is lost, and the procedure enters step Sff32.

Figures 57, 58:
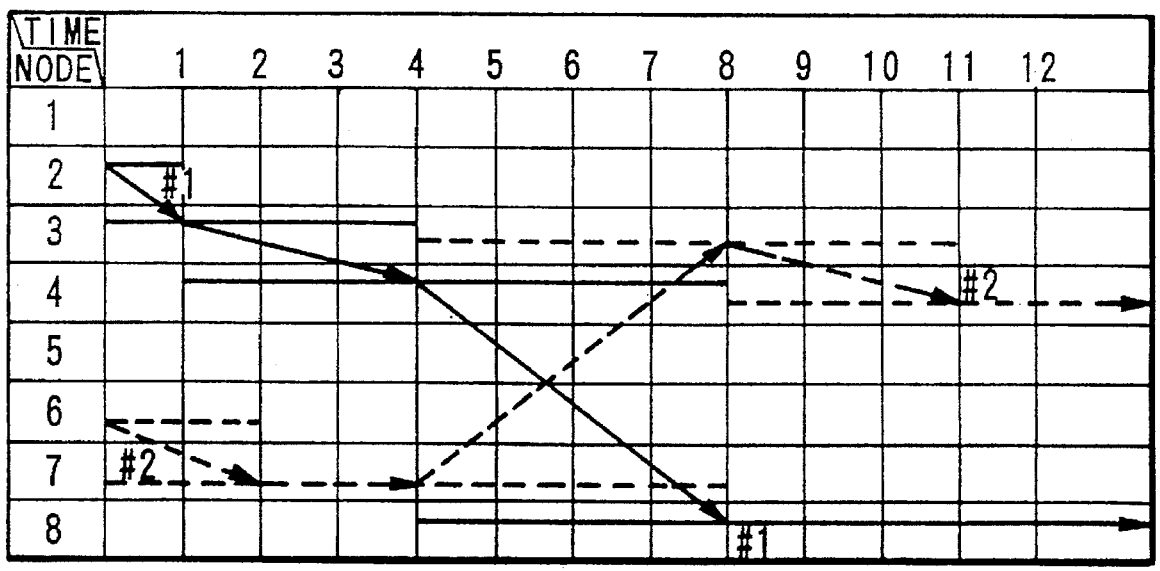
FIG. 57 is a node reservation sequence showing a result of the operational example.
FIG. 58 is a transport planning diagram showing a result of the same operational example.

From the ignition series of transitions {T23 (#1), T67 (#2), T34 (#1), T73 (#2), T48 (#1), T34 (#2)}, the preceding relationship of the unmanned vehicle occupying each node is examined, and a node reservation sequence as shown in FIG. 57 is formed. In addition, a transport diagram as shown in FIG. 58 is formed using this node reservation sequence. In this figure, unmanned vehicles #1 and #2 correspond to the solid and short-dashed lines, respectively. Furthermore, the arrows represent the movements of each unmanned vehicle, and the horizontal lines indicate the time period of reservation. For example, unmanned vehicle #1 moves from node 2 to node 3 in 1 second, and then moves to node 4 over the course of 3 seconds. During this interval, node 3 is reserved by unmanned vehicle #1 over the time course from 0 to 4.

D: Overall Operational Example 1

Figure 1:
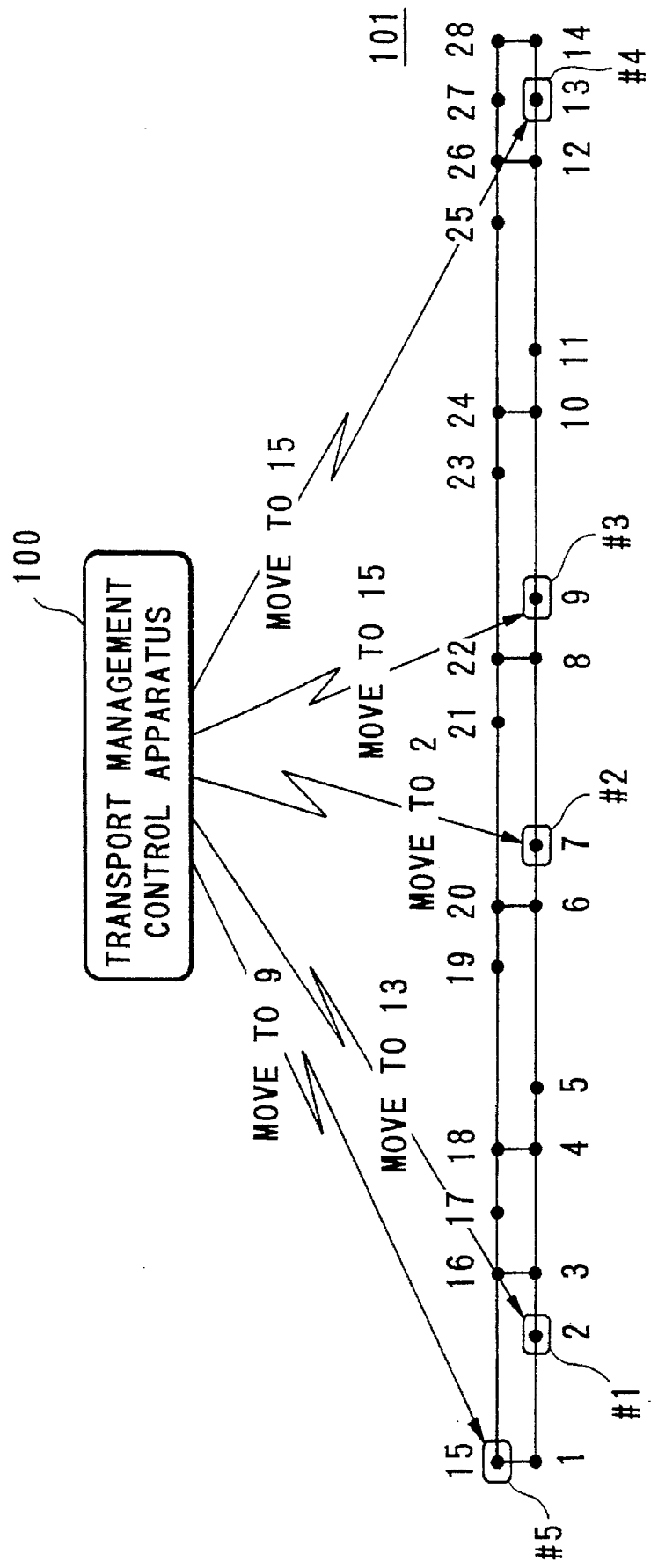
FIG. 1 shows a construction of a conventional unmanned carrier system.

In the following, the operations of transport management control apparatus 102 (FIG. 1) in carrier grid 101 shown in FIG. 1 will be explained. In the subsequent figures, parts corresponding to those shown in FIG. 1 will be denoted by the same numerals and their descriptions will be omitted. In addition, departure points and target points in this operational example are shown in FIG. 59.

Initially, route planning portion 109 outputs a search designation (FIG. 59) to route search portion 110. Route search portion 110 then searches for the carrier route (initial route) of each unmanned vehicle #1 to #5 in accordance with the search designation, and then outputs this initial routing to route planning portion 109. FIG. 62 is a transport diagram showing this aforementioned initial routing: in the same figure, the routes of unmanned vehicles #1 to #7 are represented by a dotted line, long single-dotted chain line, double-dotted chain line, single-dotted chain line, short-dashed line, solid line and long-short-dashed line, respectively.

From this initial routing, route planning portion 109 recognizes the intervals between nodes 2 to 3, nodes 4 to 6 and nodes 8 to 10 as inverse intervals. As a result, route planning portion 109 conducts orientation of specific intervals on the travel grid with respect to cost, and then outputs a search designation again to route search portion 110. The aforementioned operations are performed until all inverse intervals have been removed to obtain the standard routing shown in FIG. 60 and FIG. 62. Route planning portion 109 then outputs this standard routing to operation planning portion 108.

Route planning portion 108 subsequently conducts the above-described operational planning procedure (FIGS. 47, 48, and 49) based on this standard routing. In addition, route searches, e.g. detour route and the like, are conducted during the aforementioned procedure in route search portion 10 via route planning portion 109. In addition, in this case, operational planning portion 108 outputs the departure nodes, target nodes, and "no-passage" intervals.

Figure 64:
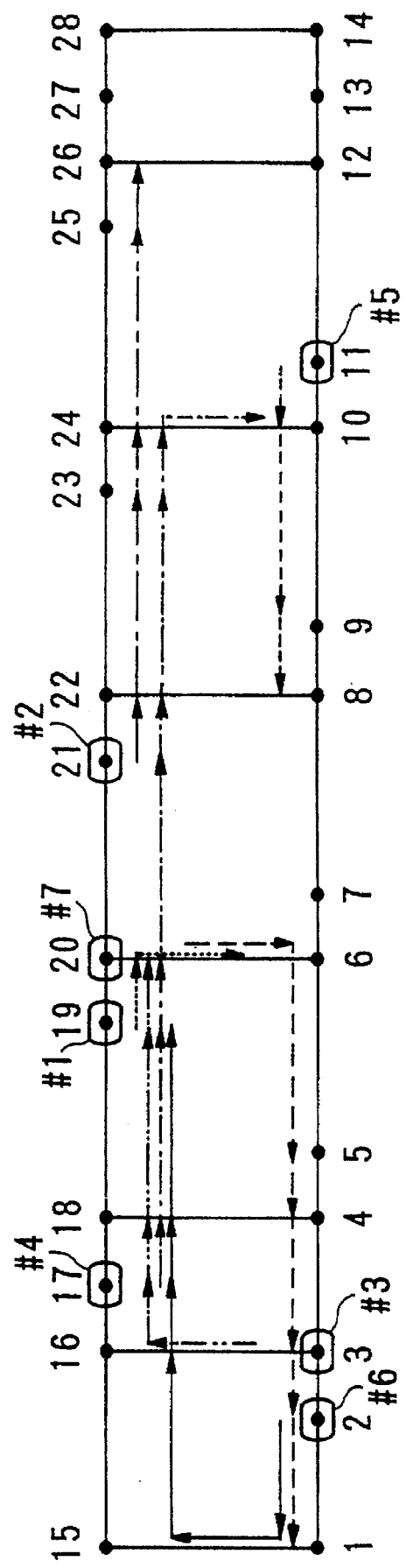
FIG. 64 shows the final routing of the same.
Figure 65:
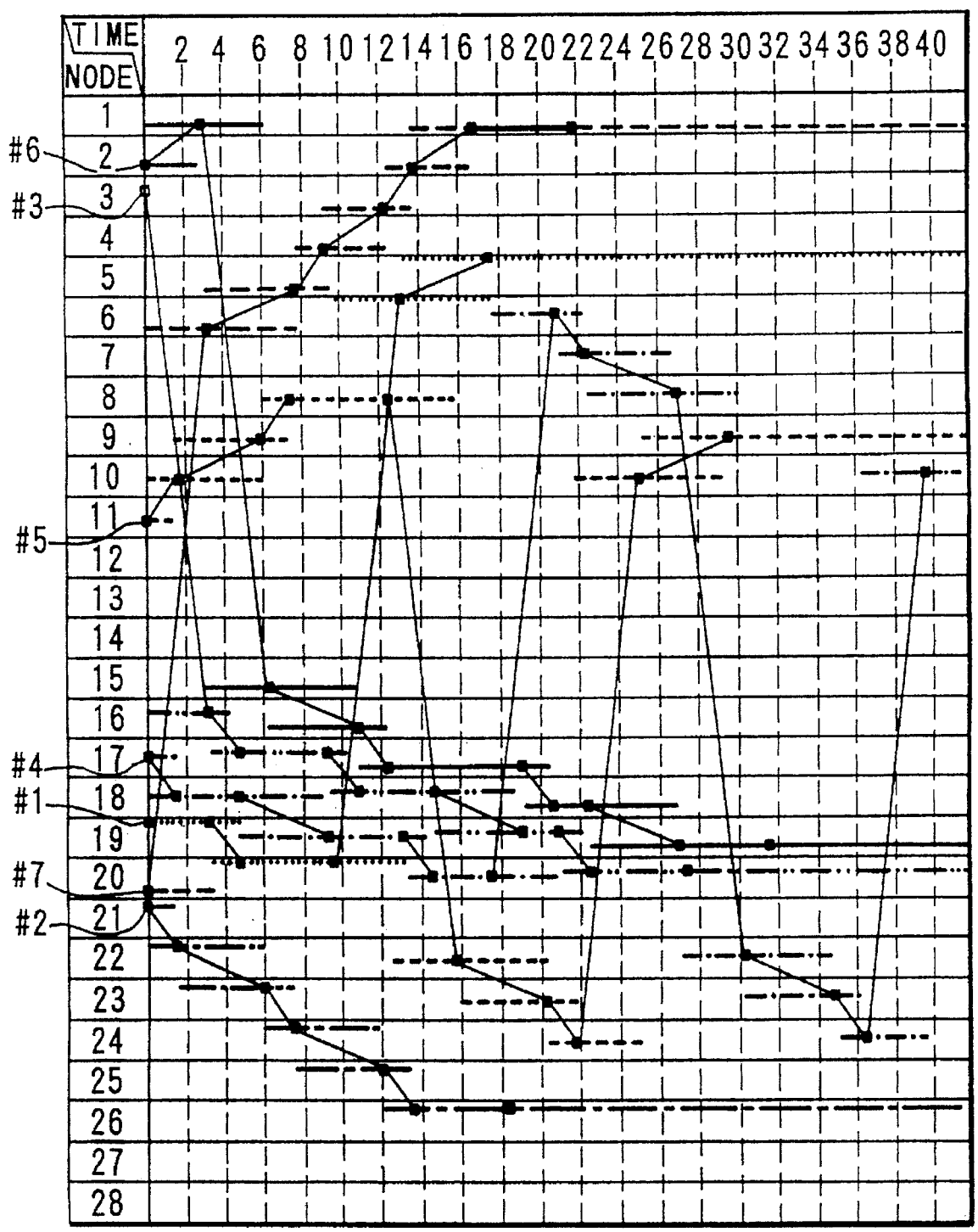
FIG. 65 is a transport planning diagram of this Operational Example 1.

In accordance with the above procedures, the final routings shown in FIG. 61 and FIG. 64 are obtained. In the final routing shown in FIG. 61, the relief route of unmanned vehicle #1 (node 20 f 6) has been added to the standard routing shown in FIG. 60. FIG. 65 is a transport diagram showing the timed movements of unmanned vehicles #1 to #7 at this time.

E: Overall Operational Example 2 in the following, an operational example will be explained in the case when passage is prohibited over the interval between nodes 20 and 21 on the aforementioned carrier grid 101. In this operational example, the present and target points of unmanned vehicles #1 to #7 are identical to those of Operational Example 1 (FIG. 59). In addition, in this case, in the intervals between nodes 6 to 7, nodes 7 to 8, and nodes 21 to 22, a potential detour route other than the connection route does not exist, hence these intervals are not classified as inverse intervals.

Figure 68:
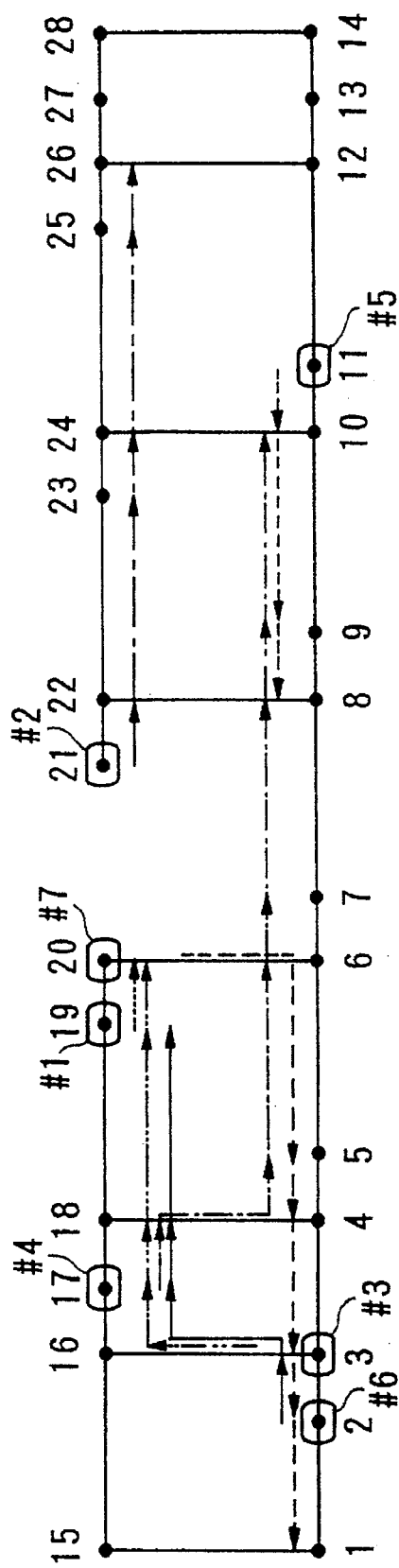
FIGS. 68 to 70 are transport diagrams showing the initial routing, standard routing, and final routing, respectively, of the same Operational Example 2.

At this point, the same procedure as in Operational Example 1 is performed. Initially, an initial routing as shown by the transport diagram of FIG. 68 is obtained in route search portion 110. Subsequently, the standard routings shown in FIG. 66 and FIG. 68 are formed by means of route planning portion 109. In these figures, the inverse intervals present in the initial routing (FIG. 68) have been removed.

Figure 7:
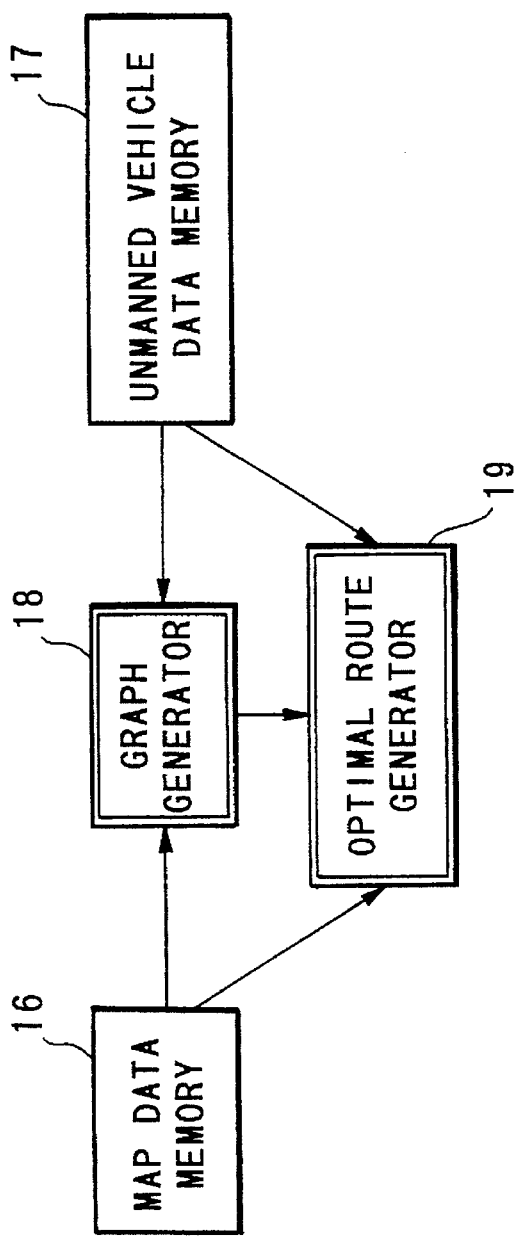
FIG. 7 shows a construction of a conventional optimal route determining apparatus.
Figure 69:
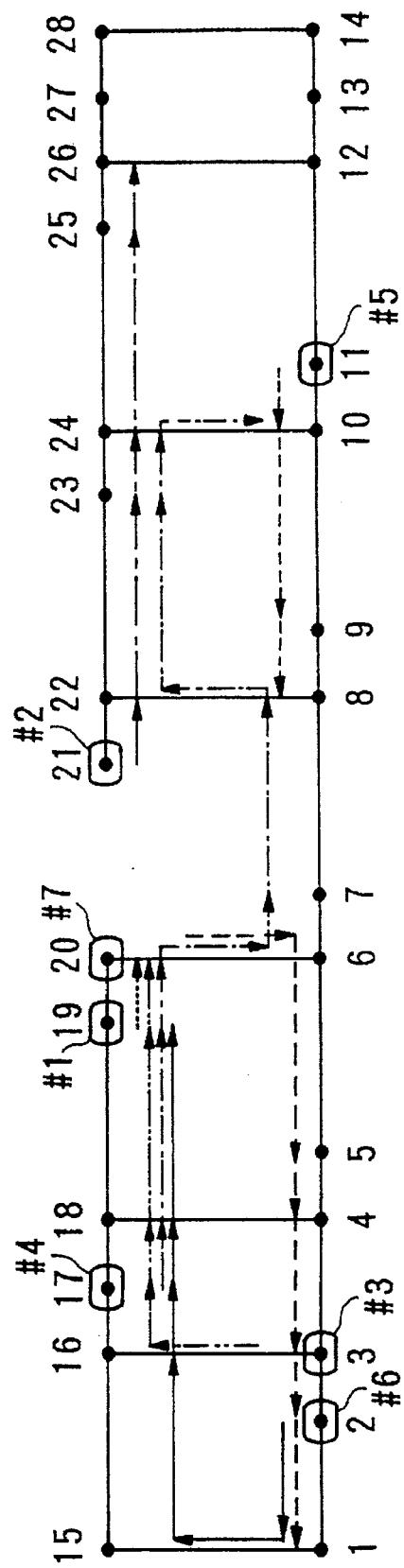
Figure 70:
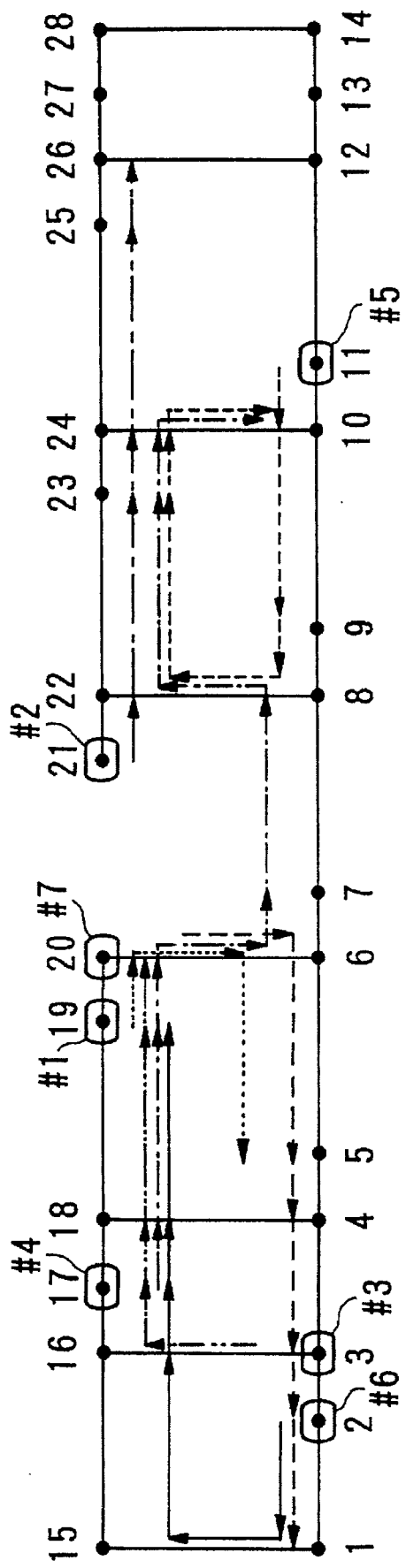
Figure 71:
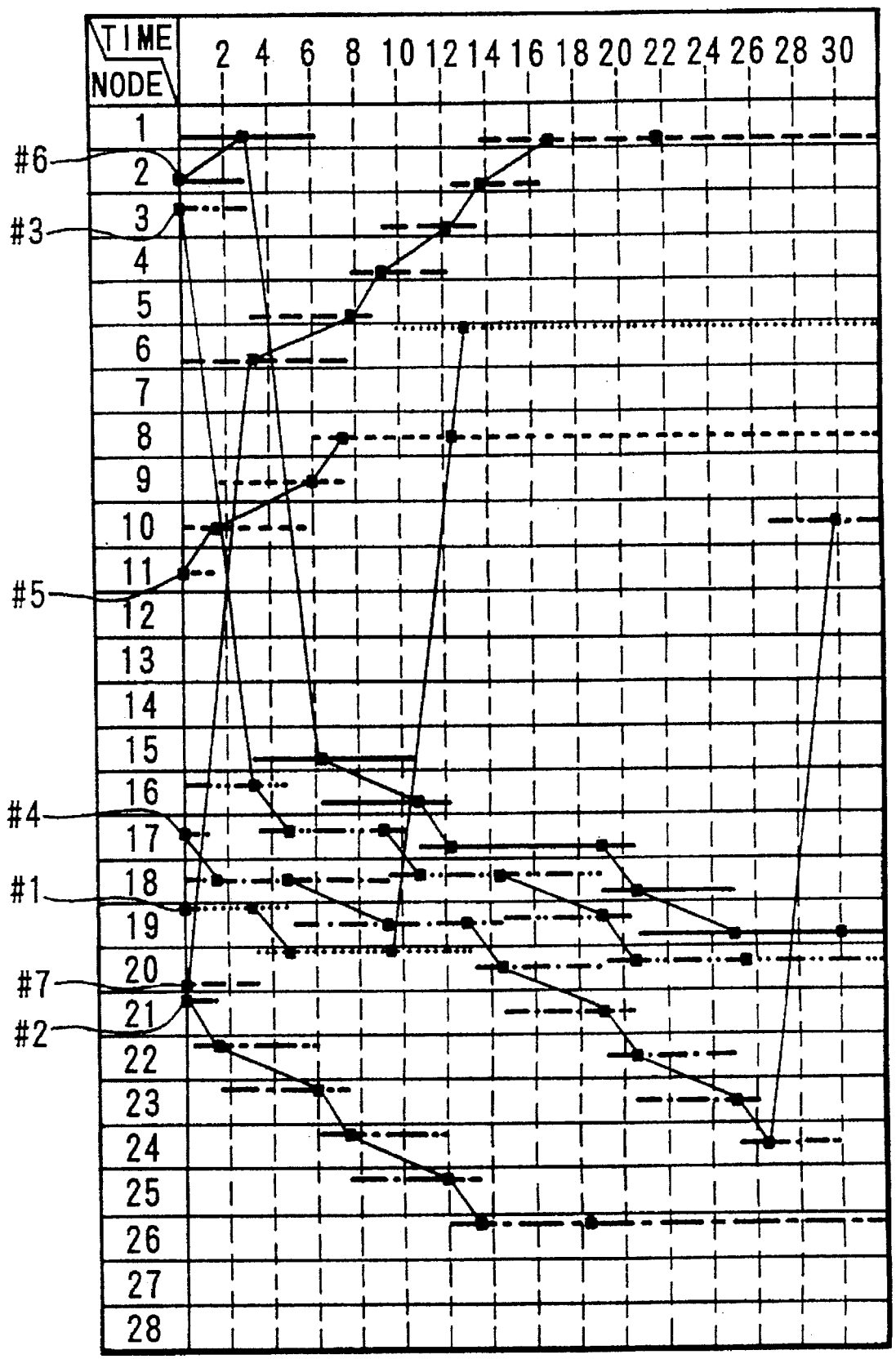
FIG. 71 is a transport planning diagram of the same Operational Example 2.

The final routings as shown in FIG. 67 and FIG. 70 are then formed in operational planning portion 108. With regard to these final routings, the relief route of unmanned vehicle #1 (node 20≧6) and the relief route of unmanned vehicle #5 (node 8≧22≧23≧24≧10≧9) have been added to the standard routing shown in FIG. 69. In addition, FIG. 7 is the corresponding transport diagram: in this figure, the node reservation of unmanned vehicles #1 to #7 are shown by the same lines as in FIG. 65.

As described in the aforementioned, according to the present invention, the travel routes and travel sequences of all of the unmanned vehicles can be obtained before movement commences by previously taking into consideration potential obstructions caused by certain unmanned vehicles. Therefore, a plurality of unmanned vehicles can move smoothly over a travel grid even in the case when the potential for frequent interferences exist. Consequently, the carrier efficiency of the unmanned vehicles can be improved.

Figure 72:
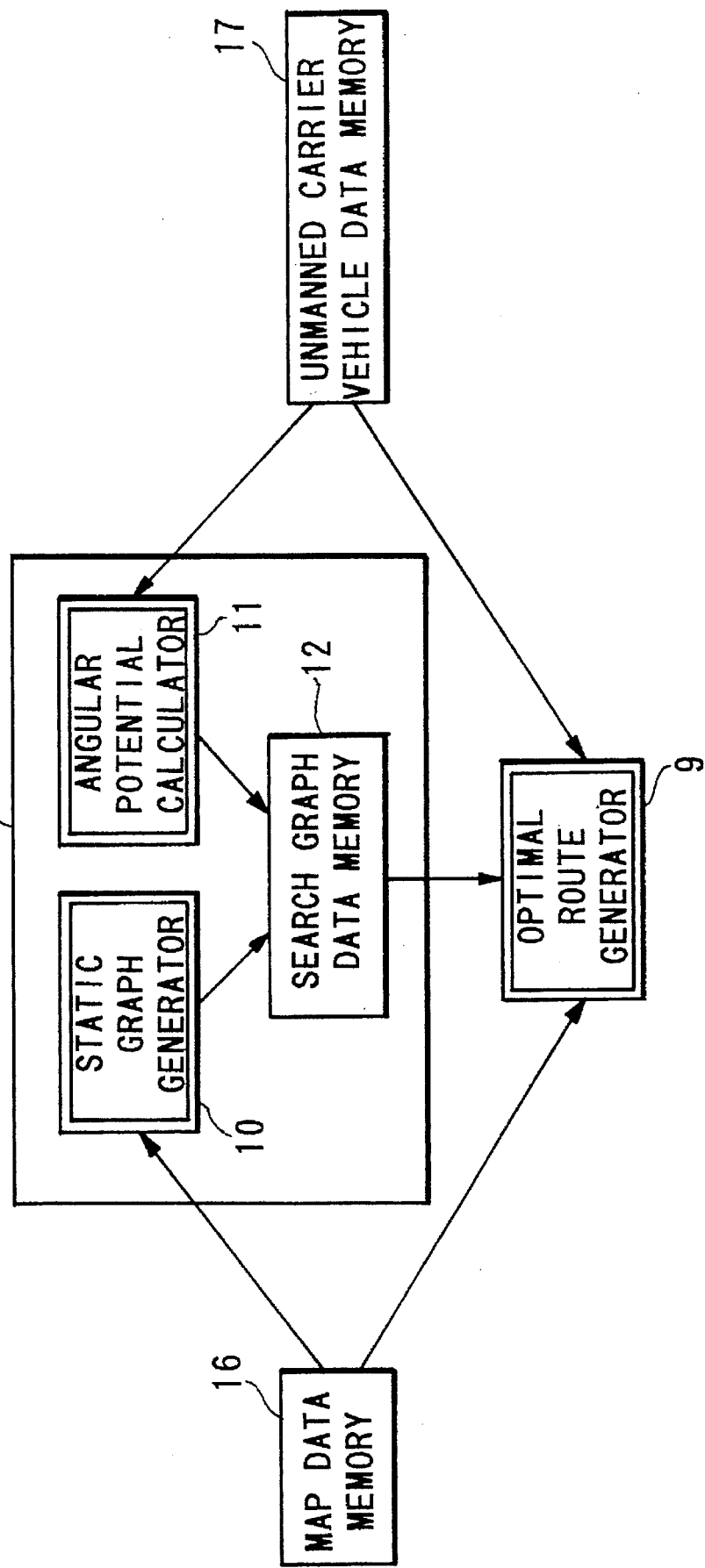
FIG. 72 is a block diagram showing an optimal route determining apparatus according to a preferred embodiment of the present invention.

F: Another Embodiment with respect to a Technique for Determining an Optimal Route FIG. 72 is a block diagram showing an optimal route determining apparatus in accordance with the present embodiment; parts which are identical to those in FIG. 7 are given identical reference numbers, and an explanation thereof will be omitted.

In the Figure, graph generator 8 generates graph G shown below.

$$G=(N, A, C) \tag{7}$$

Here, $N=(n_1, n_2, \ldots, n_m)$ and $A=\{a_1, a_2, \ldots, a_n\}$ are identical to the elements of graph G0 explained above, and an explanation thereof will be omitted here.

C represents a set of costs calculated with respect to each arc $a_k=(n_i, n_j)$, based on cost calculation characteristics which are weighted with an angular potential explained hereinbelow, in addition to the distance between the nodes and the movement time, which are explained above.

In the case in which map data memory 16 is updated, static graph generator 10 calculates the cost $B_{ij}$ of each arc by means of formulas (2), (4), or (5).

In the case in which a target node g is directed, angular potential calculator 11 calculates an angular potential cost $T_{ij}(g)$ by means of formulas (8) and (9) below, with respect to each arc.

$$T_{ij}(g)=(K/2p)Dq(g, i, j)B_{ij} \tag{8}$$

$$Dq(g, i, j)=Mod(ABS(q(g, j)-q(g, i)), p) \tag{9}$$

Here, K is a prespecified coefficient; ABS() is the abstract value of (); and q(g, i) represents an angle measured from the x axis in a counterclockwise direction to the direction of node 1 as seen from node g; in the case in which g=i, this has a value of "0". Furthermore, formula (8) exhibits the remainder in the case in which ABS(q(g, j)-q(g, i)) is divided by p.

That is to say, with respect to the nodes i and j comprising each arc, the angular difference between the direction of the node i, as seen from the target node g, and the x axial direction, and the angular difference between the direction of the node j, as seen from the target node g, and the x axial direction, are calculated. Then, coefficients which are set based on the difference between these angular differences are multiplied by the cost $B_{ij}$, and a new cost $T_{ij}(g)$ is calculated.

The cost $C_{ij}(g)$ (=C), which is shown hereinbelow, is stored in the search graph data memory 12.

$$C_{ij}(g)=B_{ij}+T_{ij}(g) \qquad (10)$$

That is to say, the set $C_{ij}(g)$ of the arc costs is set depending on the target node, in addition to the initial point node and final point node of each arc.

Optimal route generator 9 receives the carrying directives from the central unit, and determines the departure node and the target node, as in the conventional art. Then, based on this, the graph G discussed above which was determined in graph generator 8, and the mapped data and unmanned carrier vehicle data, this optimal route generator 9 generates an optimal route which minimizes estimated costs.

Figure 8:
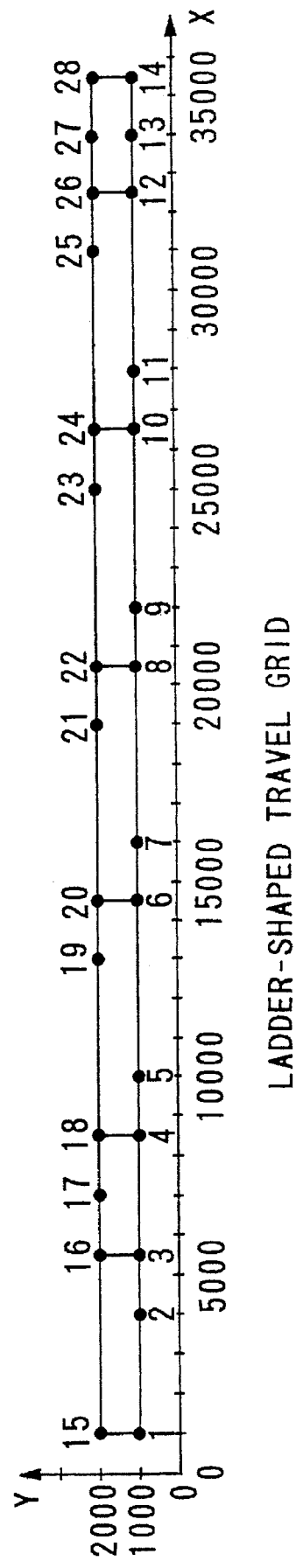
FIG. 8 shows travel grid having ladder shape.
Figures 12, 13:
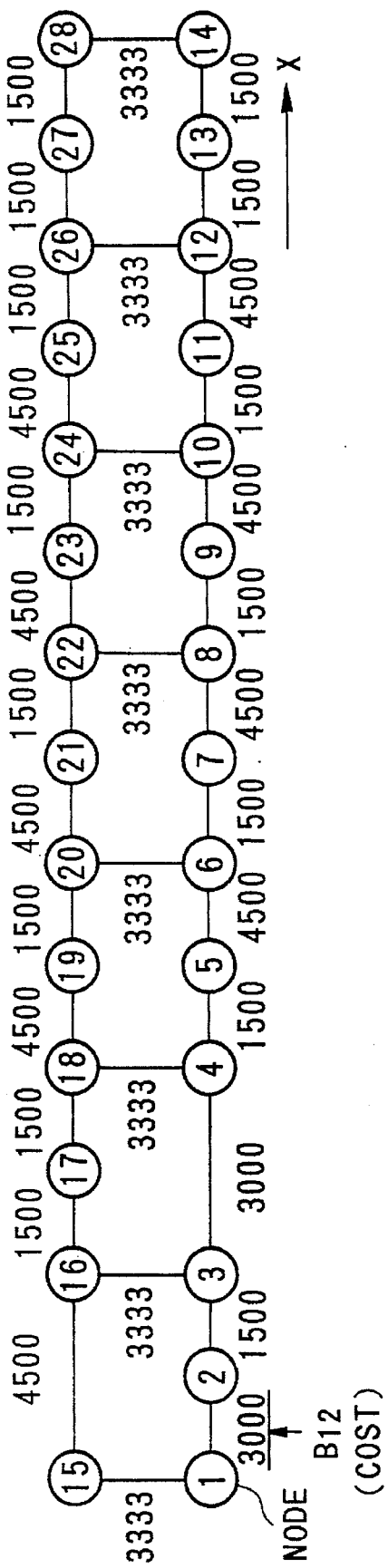
FIG. 12 shows the calculated results of the costs of the arcs in the grid shown in FIG. 8.
FIG. 13 shows the shortest routes, each one requiring the minimum cost .in the grid shown in FIG. 8.

In the ladder shaped travel grid shown in FIG. 8, a case will be considered in which the target node is set to the node labeled "28". First, by means of the static graph generator 10, the costs $B_{ij}$ (conventional costs) shown in FIG. 12 are calculated.

Figure 73:
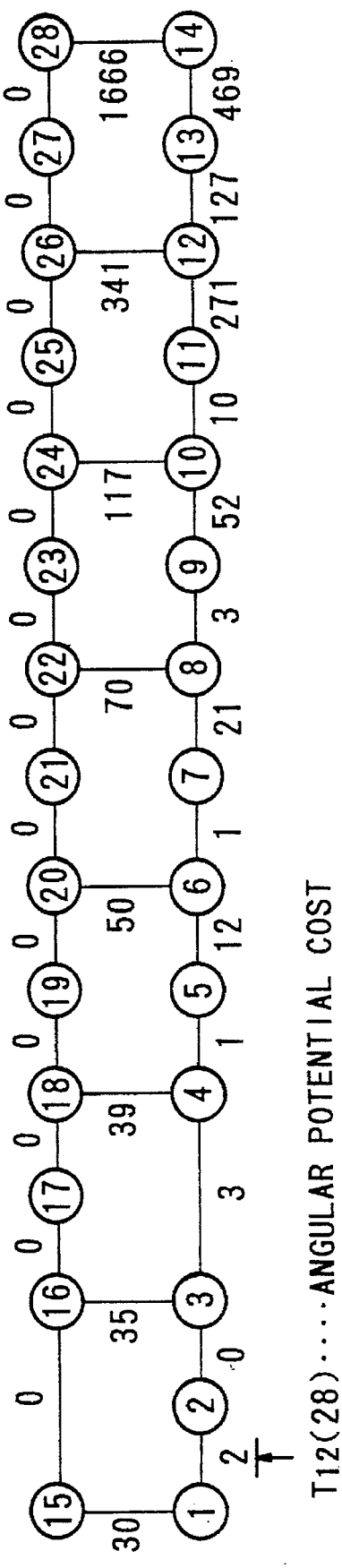
FIG. 73 shows angular potential costs used for the optimal route determining apparatus shown in FIG. 72.

Next, by means of the angular potential calculator 11, the angular potential costs $T_{ij}(28)$ which are shown in FIG. 73 are calculated. Here, the coefficient K has a value of "1".

Figure 74:
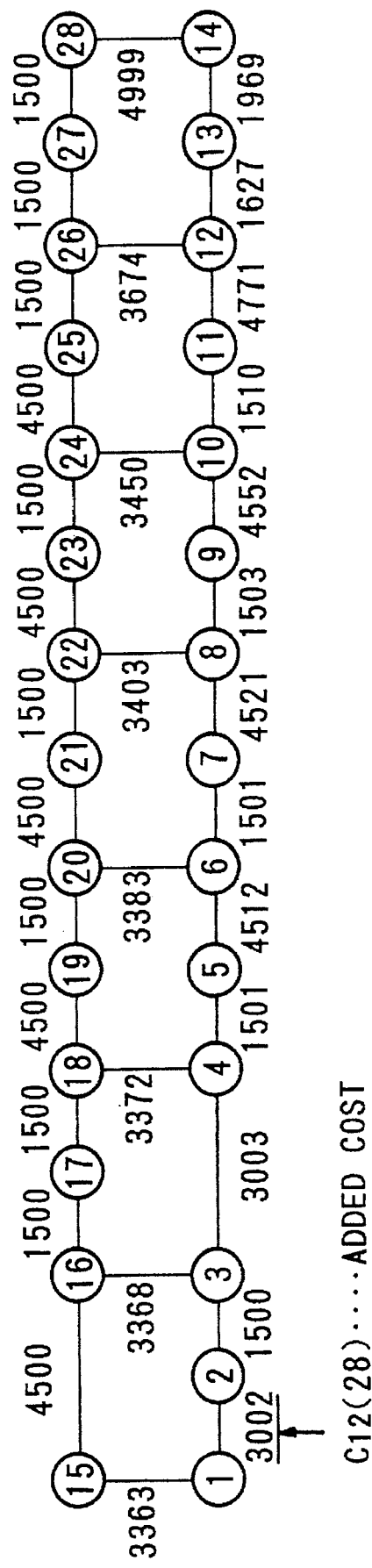
FIGS. 74 and 75 shows calculation results of the costs.

Next, the cost $B_{ij}$ and the angular potential cost $T_{ij}(28)$ are added with respect to each arc, and the result is stored in the search graph data memory 12 as cost $C_{ij}(28)$. The calculation results of the costs $C_{ij}(28)$ are shown in FIG. 74.

By means of this, the "8" shortest routes from node 1 to node 28 which were found in accordance with the conventional method are reduced to the single route "1≧15≧16≧17≧18≧19≧20≧21≧22≧23≧24≧25≧26≧27≧28".

Figure 9:
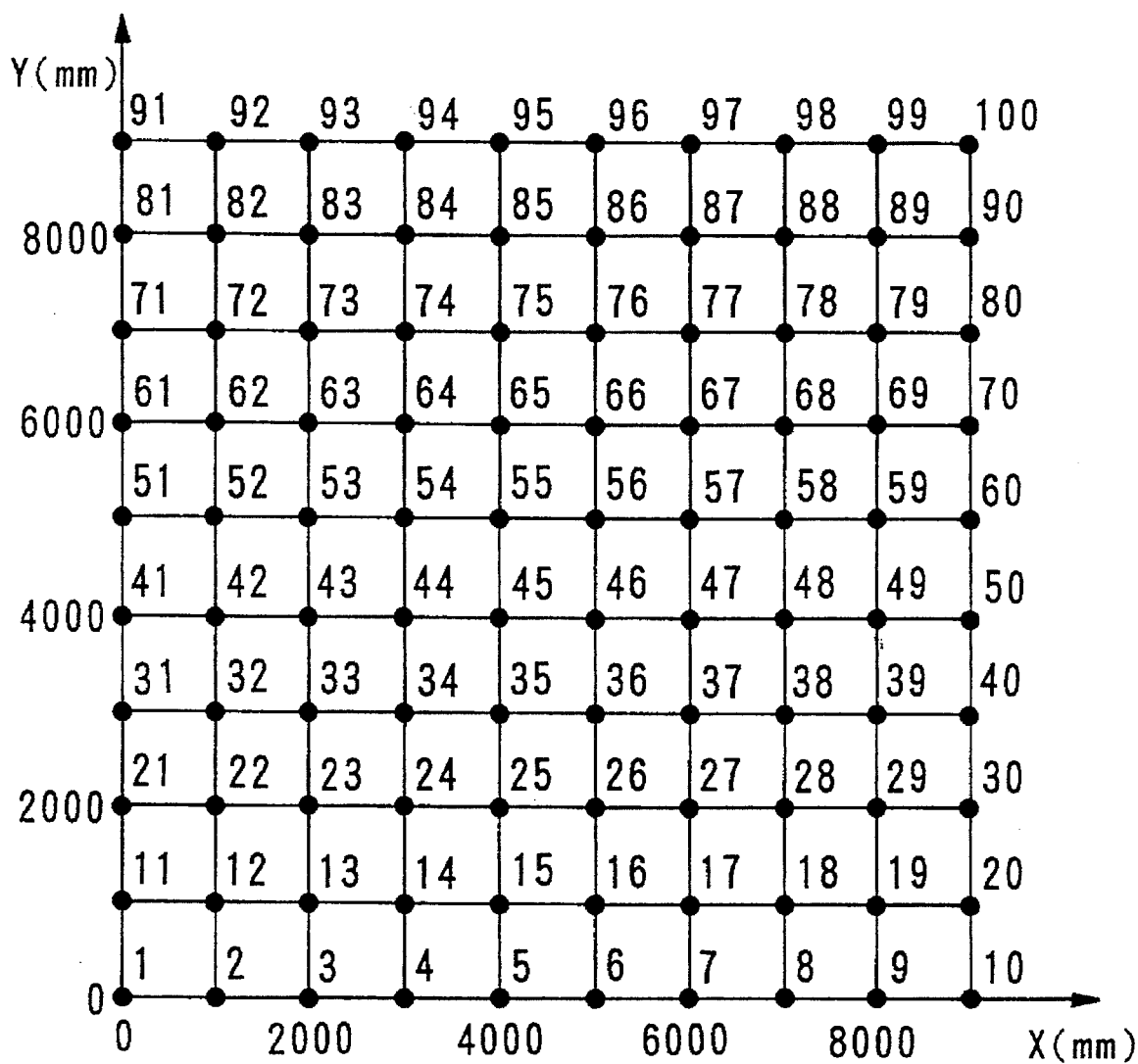
FIG. 9 shows travel grid having square lattice shape.
Figure 75:
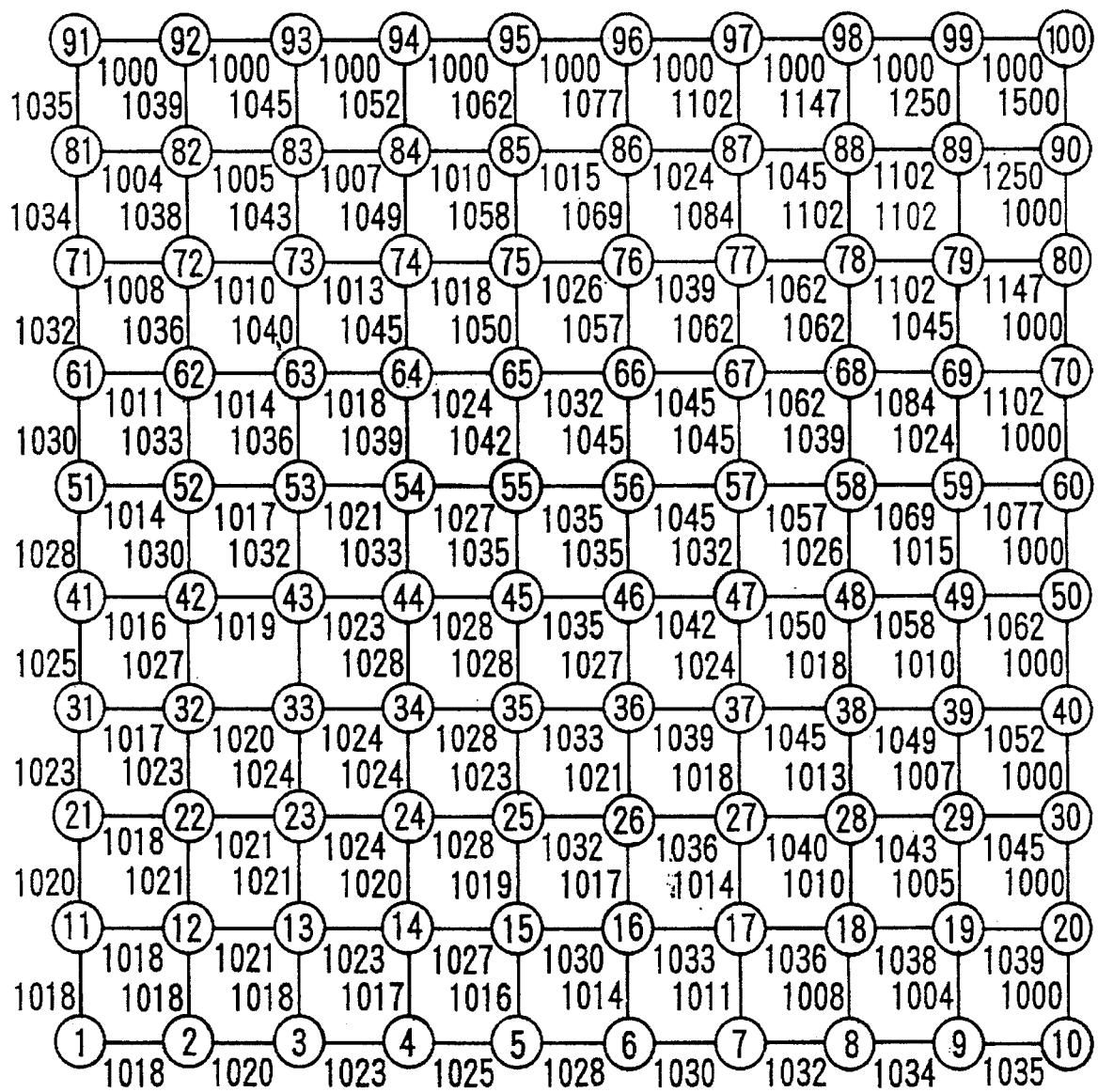

Furthermore, in the ladder-shaped travel grid shown in FIG. 9, the case in which the target node is set to the node labeled "100" will be considered. In this case, as well, the cost $B_{ij}$ and the angular potential cost $T_{ij}(100)$ are calculated in an identical manner to that described above, and the cost $C_{ij}(100)$, representing a summation of these two, is stored in search graph data memory 12. The calculation results of the costs $C_{ij}(100)$ are shown in FIG. 75.

By means of this, the "48,620" shortest routes from node 1 to node 100 which were found according to a conventional method are reduced to the single route "1≧11≧21≧31≧41≧51≧61≧71≧81≧91≧92≧93≧94≧95≧96≧97≧98≧99≧100".

In the ladder-shaped travel grid, the unmanned carrier vehicles mainly travel in the horizontal direction, and furthermore, stations for the unloading of work are disposed in the vertical direction of the travel grid. Furthermore, in the case in which a plurality of unmanned carrier vehicles are traveling along this type of thin and long travel grid, if the vehicles are caused to travel as much as possible along the outer side, the risk of mutual interference is the least.

Furthermore, in the case of unmanned carrier vehicles which travel while measuring the distance from walls in the vertical direction by means of ultrasound, the positioning at the stations is the most accurate if the greatest distance possible is traveled in the horizontal direction prior to the target node.

In the embodiment described above, the shortest routes which were determined all exhibited the tendency to consist of continuous horizontal or vertical arcs. In addition, routes running along the outer side of the travel grid are liable to be selected. This is the result of weighting with an angular potential cost, and accordingly, it is possible to determine shortest routes which will satisfy the desires in the operational environments described above.

The embodiment shown in FIG. 72 can be applied for the transport management control apparatus in order to determine the optimal routes of the unmanned vehicle. In this case, graph generator 8 and optimal route generator 9 shown in FIG. 72 may be employed in route search portion 110 shown in FIG. 15. Data stored in map data memory 16 and unmanned carrier vehicle data memory 18 in FIG. 17 may be stored in unmanned vehicle data memory 105 and travel grid data memory 106 in FIG. 15.

In the above preferred embodiments, the unmanned travel vehicles travel along travel routes which have a grid shape (travel grid). However, the present invention can be applied to the other unmanned travel vehicle systems which use travel routes not having a grid shape.

What is claimed is:

1. A transport management control apparatus which controls the transport of a plurality of unmanned vehicles traveling along travel routes formed by a plurality of connecting routes which connect nodes constituted by stopping positions of vehicles, said transport management control apparatus comprising:

route search means which searches for an optimal travel route which connects a present node to a target node having minimum cost for each unmanned vehicle by calculating costs of travel for possible transport intervals connecting said present node and said target node based on the positions of said nodes and the connections between said nodes; and route arrangement means which, based on the results obtained by said route search means, for each unmanned vehicle, searches for opposite direction intervals which include the travel routes having mutually opposite directions from among said plurality of optimal travel routes, calculates the integral costs for each unmanned vehicle by totaling the costs of the opposite direction intervals of the travel routes of each unmanned vehicle, and then restricts the moving direction of the opposite direction intervals of the travel routes of the unmanned vehicles having the highest integral cost, making said intervals unidirectional;

wherein said route search means and said route arrangement means decide the optimal travel routes without conflicts for the unmanned vehicles by repeating the action of excluding said opposite direction intervals through the ordering of the integral costs of the opposite direction intervals until all of said opposite direction intervals are eliminated.

2. A transport management control apparatus according to claim 1 wherein said route arrangement means controls said route search means by varying the costs of said opposite direction intervals.

3. A transport management control apparatus which controls the transport of a plurality of unmanned vehicles traveling along travel routes formed from a plurality of connecting routes which connect nodes constituting vehicle stopping positions, said transport management control apparatus comprising:

first means which searches for an optimal travel route which connects a present node to a target node having minimum cost for each unmanned vehicle, by calculating costs of travel for possible transport intervals connecting said present node and said target node based on the positions of said nodes and the connections between said nodes, and based on the results, selects a travel interval having a specified moving direction by determining for each unmanned vehicle the travel intervals in which there are conflicts with the travel routes of other unmanned vehicles and totaling the costs of the conflicting intervals, then restricting the moving direction of the conflicting intervals of the unmanned vehicle having the highest cost to a specified direction, to determine the most appropriate travel routes having no conflicts by eliminating said conflicting intervals in the order of the costs of the conflicting intervals with respect to the unmanned vehicles; and second means which simulates the temporal movements of each unmanned vehicle based on the travel routes determined by said first means, and if any of the unmanned vehicles are in a state of deadlock in which it is unable to advance, resolves the deadlock problem of said unmanned vehicle by:

adding a relief route to the travel route of said unmanned vehicle by moving another unmanned vehicle which has already completed its work to a node having the least cost for moving thereto, changing the sequence in which unmanned vehicles pass through nodes by selecting a reservation sequence of nodes, containing unmanned vehicles which are not in a standby state, based on the number of passes which other unmanned vehicles make through the nodes, offering a detour route by selecting an unmanned vehicle which is not in a standby state, prohibiting passage through a portion of the travel route of said unmanned vehicle, searching for a detour route to the next node in the travel route of said unmanned vehicle, and substituting the detour route as a new travel route for said unmanned vehicle to move to said next node, or offering a passing route for temporarily yielding the right of way to an unmanned vehicle which is encountering the deadlock problem by temporarily moving an unmanned vehicle which is not in a standby state to a node having the least cost for moving thereto.

4. A transport management control method for controlling the transport of a plurality of unmanned vehicles traveling over travel routes formed from a plurality of connecting routes which connect nodes constituting stopping positions, said transport management control method comprising the steps of:

a. determining the optimal travel route of each of a plurality of the unmanned vehicles;

b. finding in the plurality of optimal travel routes obtained in step a., opposite direction intervals comprising travel routes having mutually opposite directions;

c. halting processing if opposite direction intervals are not present, and if opposite direction intervals are present, then calculating an integral cost for each unmanned vehicle by totaling the costs of the opposite direction intervals in the travel route of each unmanned vehicle;

d. applying a specified direction to an opposite direction interval on the travel route of the unmanned vehicle having the highest integral cost, so that this interval has one direction;

e. again determining the optimal travel routes of all unmanned vehicles, with the above-mentioned application of a specified direction to the travel routes; and f. determining by the repetition of steps b., c., d. and e. optimal travel routes having no conflict.

5. A transport management control method for controlling the transport of a plurality of unmanned vehicles traveling over travel routes formed from a plurality of connecting routes which connect nodes constituting stopping positions, said transport management control method comprising the steps of:

a. determining the optimal travel route of each of a plurality of unmanned vehicles;

b. finding in the plurality of optimal travel routes obtained in step a. opposite direction intervals comprising travel routes having mutually opposite directions;

c. halting processing if opposite direction intervals are not present, and if opposite direction intervals are present, then calculating an integral cost for each unmanned vehicle by totaling the costs of the opposite direction intervals in the travel route of each unmanned vehicle;

d. applying a specified direction to an opposite direction interval on the travel route of the unmanned vehicle having the highest integral cost, so that this interval has one direction;

e. again determining the optimal travel routes of all unmanned carrier vehicles, with the above-mentioned application of a specified direction to the travel routes; and f. determining by the repetition of steps b., c., d. and e. optimal travel routes having no conflict;

g. simulating the temporal movements of the unmanned vehicles in a travel grid based on said optimal travel routes;

h. if the simulation teaches that an unmanned vehicle has encountered a deadlock problem in which it is unable to advance, then adding a relief route to the travel route of said unmanned vehicle by moving another unmanned vehicle which has already completed its work to a node having the least cost for moving thereto;

i. if the deadlock problems of all unmanned vehicles encountering deadlock are not able to be resolved by the above-described step h., then changing the sequence in which unmanned vehicles pass through nodes by selecting a reservation sequence of nodes containing unmanned vehicles which are not in a standby state, based on the number of passes which other unmanned vehicles make through the nodes;

j. if the deadlock problem is not resolved by the above-described step i., then offering a detour route by selecting an unmanned vehicle which is not in a standby state, prohibiting passage through a portion of the travel route of said unmanned vehicle, searching for a detour route to the next node in the travel route of said unmanned vehicle, and substituting the detour route as a new travel route for said unmanned vehicle to move to said next node, or k. if the deadlock problem is not resolved by the above-described step j., then offering a passing route for temporarily yielding the right of way to an unmanned vehicle which is encountering the deadlock problem, by temporarily moving an unmanned vehicle which is not in a standby state to a node having the least cost for moving thereto.

6. An optimal route determination apparatus comprising:

first cost calculation means, in which, with respect to a set of travel intervals connecting a first and second node which join one another and between which travel is possible, among a plurality of nodes on a travel route, calculates a first cost for each travel interval, based on the distance between the nodes and the movement time;

second cost calculation means, which, when a target node is directed, calculates the angular difference between the direction of the first node, as seen from the target node, and a prespecified direction, and calculates the angular difference between the direction of the second node, as seen from the target node, and prespecified direction, and based on these angular differences, calculates a second cost for each travel interval;

addition means for adding the results of the cost calculation of the first and second cost calculation means for each travel interval; and route generation means, which, based on the added costs calculated by said addition means, selects the case in which the estimated value of the added costs of each travel interval has the smallest value as the optimal route from the departure node to the target node.

* * * * *